US012219242B2

(12) United States Patent
Zhou et al.

(10) Patent No.: US 12,219,242 B2
(45) Date of Patent: Feb. 4, 2025

(54) HIGH-MAGNIFICATION PHOTOGRAPHING METHOD AND ELECTRONIC DEVICE

(71) Applicant: HONOR DEVICE CO., LTD., Shenzhen (CN)

(72) Inventors: Wenyu Zhou, Shenzhen (CN); Qifeng Long, Shenzhen (CN); Dong Guo, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

(21) Appl. No.: 17/909,368

(22) PCT Filed: Jan. 28, 2022

(86) PCT No.: PCT/CN2022/074838
§ 371 (c)(1),
(2) Date: Sep. 3, 2022

(87) PCT Pub. No.: WO2022/242230
PCT Pub. Date: Nov. 24, 2022

(65) Prior Publication Data
US 2024/0196085 A1    Jun. 13, 2024

(30) Foreign Application Priority Data

May 19, 2021    (CN) .......................... 202110548528.2

(51) Int. Cl.
*H04N 23/60* (2023.01)
*H04N 23/63* (2023.01)
*H04N 23/69* (2023.01)

(52) U.S. Cl.
CPC .......... *H04N 23/64* (2023.01); *H04N 23/632* (2023.01); *H04N 23/69* (2023.01)

(58) Field of Classification Search
CPC ....... H04N 23/64; H04N 23/632; H04N 23/69
See application file for complete search history.

(56) References Cited

U.S. PATENT DOCUMENTS

| 10,317,777 | B2  |   | 6/2019 | Qin et al. |            |
|------------|-----|---|--------|------------|------------|
| 10,645,294 | B1  | * | 5/2020 | Manzari    | H04N 23/74 |
| 11,375,120 | B2  | * | 6/2022 | Wang       | H04N 23/64 |
| 2016/0259528 | A1 | * | 9/2016 | Foss       | G06T 13/80 |

(Continued)

FOREIGN PATENT DOCUMENTS

| CN | 101702752 A | 5/2010 |
| CN | 107155059 A | 9/2017 |
| CN | 110445978 A | 11/2019 |

(Continued)

*Primary Examiner* — Twyler L Haskins
*Assistant Examiner* — John H Morehead, III
(74) *Attorney, Agent, or Firm* — WOMBLE BOND DICKINSON (US) LLP

(57) ABSTRACT

In a high-magnification photographing scenario, the electronic device may automatically lock, in response to an operation of the user, a photographing object that requires high-magnification photographing. Then, the electronic device may collect and display a preview image of the photographing object by using a proper zoom ratio, and obtain an initial state and an initial position of the electronic device. In this way, it is unnecessary for the user to manually adjust the zoom ratio, so that jitter caused by the user's manual operation can be reduced.

20 Claims, 38 Drawing Sheets

(56) References Cited

U.S. PATENT DOCUMENTS

2018/0173959 A1    6/2018   Shah et al.

FOREIGN PATENT DOCUMENTS

| CN | 111010506 | A  | 4/2020  |
| CN | 113438410 | A  | 9/2021  |
| JP | 2002252804 | A  | 9/2002  |
| WO | 2016154806 | A1 | 10/2016 |

* cited by examiner

S401'

A mobile phone 100 displays a fourth interface. The fourth interface is a viewfinder interface for photographing by the mobile phone 100, the fourth interface includes a fifth preview image collected by the camera of the mobile phone 100 when the zoom ratio is m, and the fifth preview image includes an image of the target object

S401"

The mobile phone 100 sends second prompt information on the fourth interface in response to a second operation performed by the user on the fourth interface. The second operation is a selection operation performed by the user on the image of the target object in the fourth interface. The second prompt information is used to indicate the user to move the mobile phone 100 so that the image of the target object is at the central position of the viewfinder interface

S401

The mobile phone 100 displays a first interface. The first interface is a viewfinder interface for photographing by the mobile phone 100, the first interface includes a first preview image collected by the camera of the mobile phone 100 when a zoom ratio is m, the first preview image includes an image of a target object, and the image of the target object is at a central position of the first preview image

S402

S402a

The mobile phone 100 determines a to-be-photographed area including the image of the target object from the first preview image in response to the first operation, so as to lock the target object from the first preview image S402b The mobile phone 100 automatically adjusts the zoom ratio to n, displays the second interface that includes the magnified to-be-photographed area, and obtains and saves the initial pose information of the mobile phone 100

S403

The mobile phone 100 obtains real-time pose information of the mobile phone 100, where the real-time pose information is used to indicate a real-time motion state and a real-time position of the mobile phone 100

S404

The mobile phone 100 sends first prompt information based on the real-time pose information and the initial pose information. The first prompt information is used to prompt the user to move the mobile phone 100, so that the mobile phone 100 is in the motion state and at the position indicated by the initial pose information

S405

The mobile phone 100 displays, in response to a photographing operation performed by the user, a third interface including a third preview image and a fourth preview image. The third preview image is an image with a highest image parameter in a plurality of frames of second preview images collected by the camera, and the fourth preview image is an image photographed in response to a photographing operation

S406

The mobile phone 100 saves a preview image selected by the user in response to the user's selection of the third preview image and/or the fourth preview image in the third interface

FIG. 7A

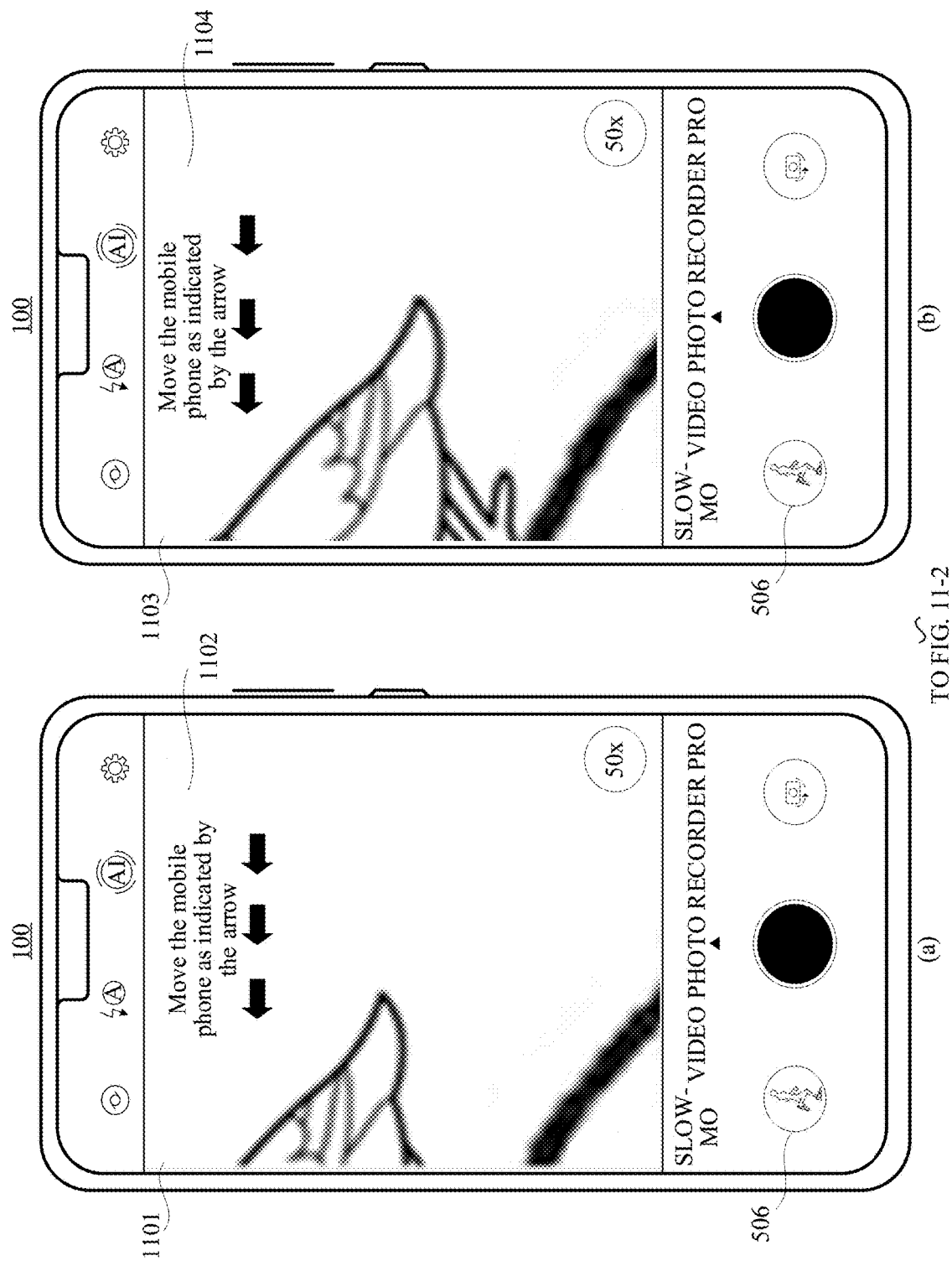

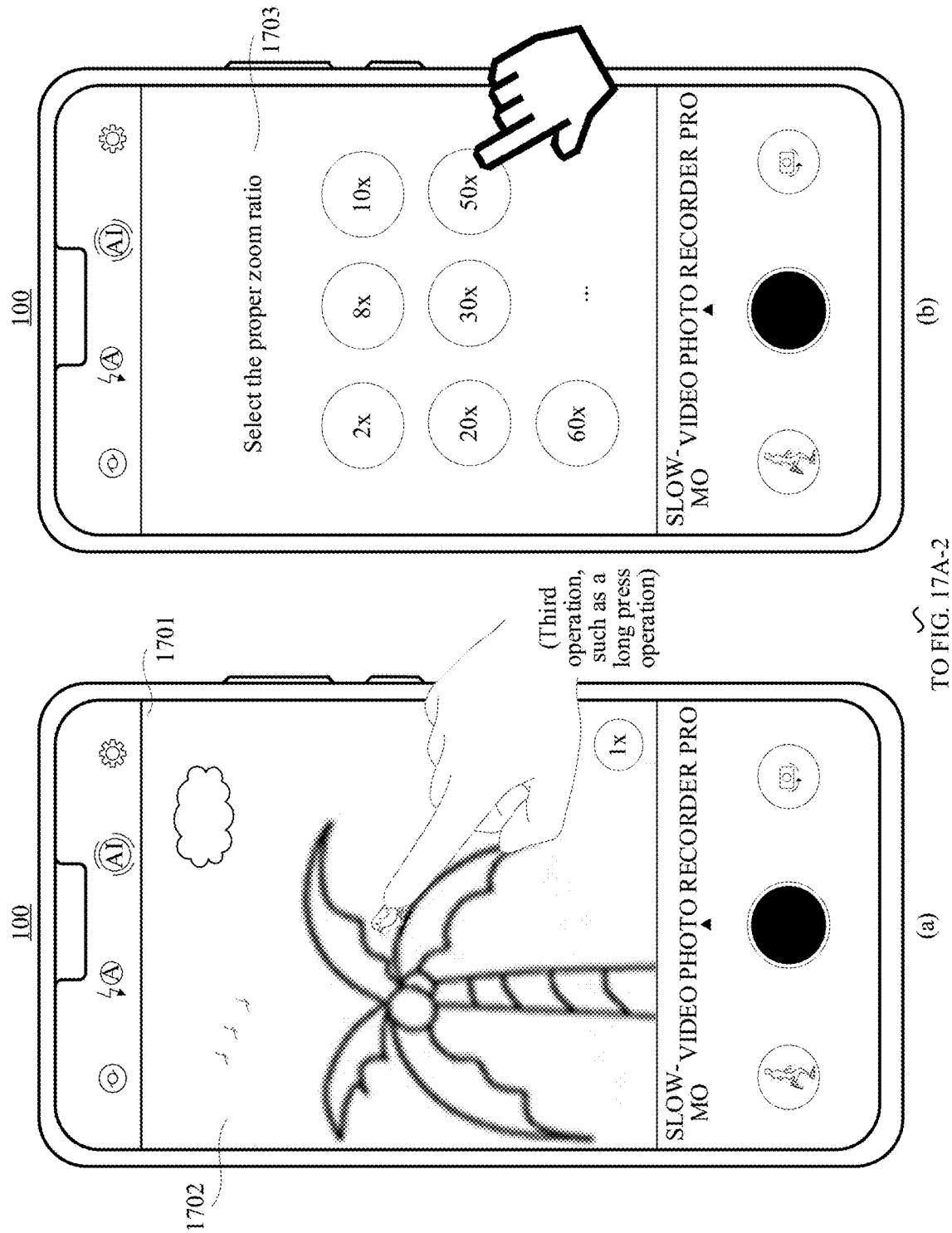

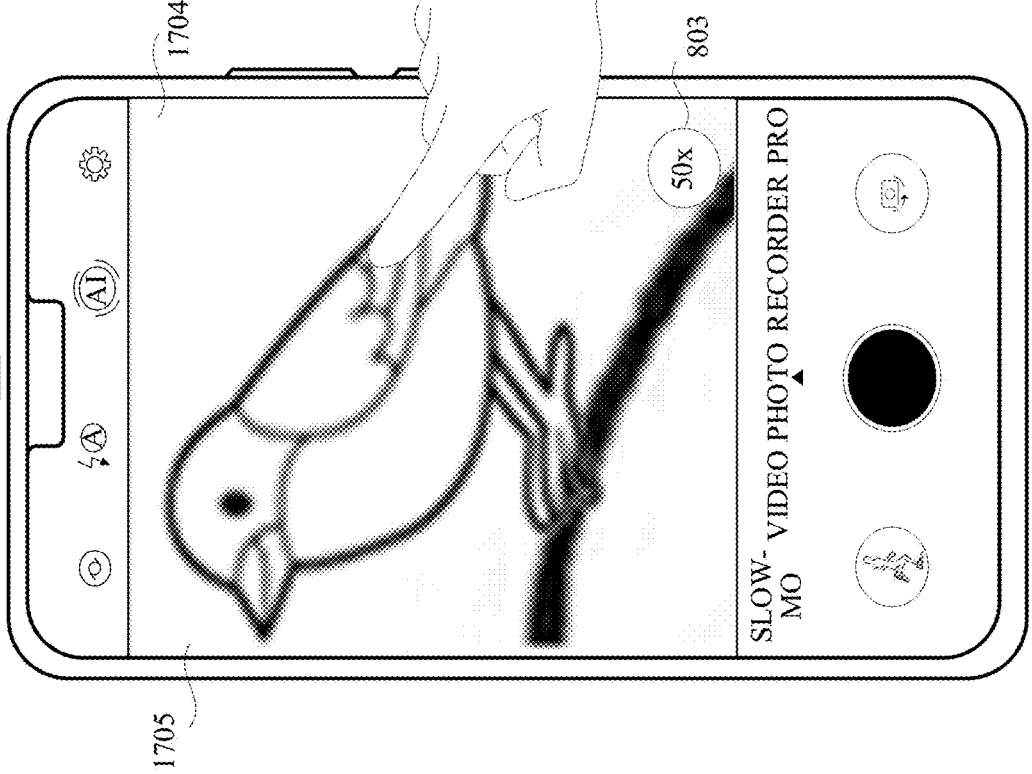

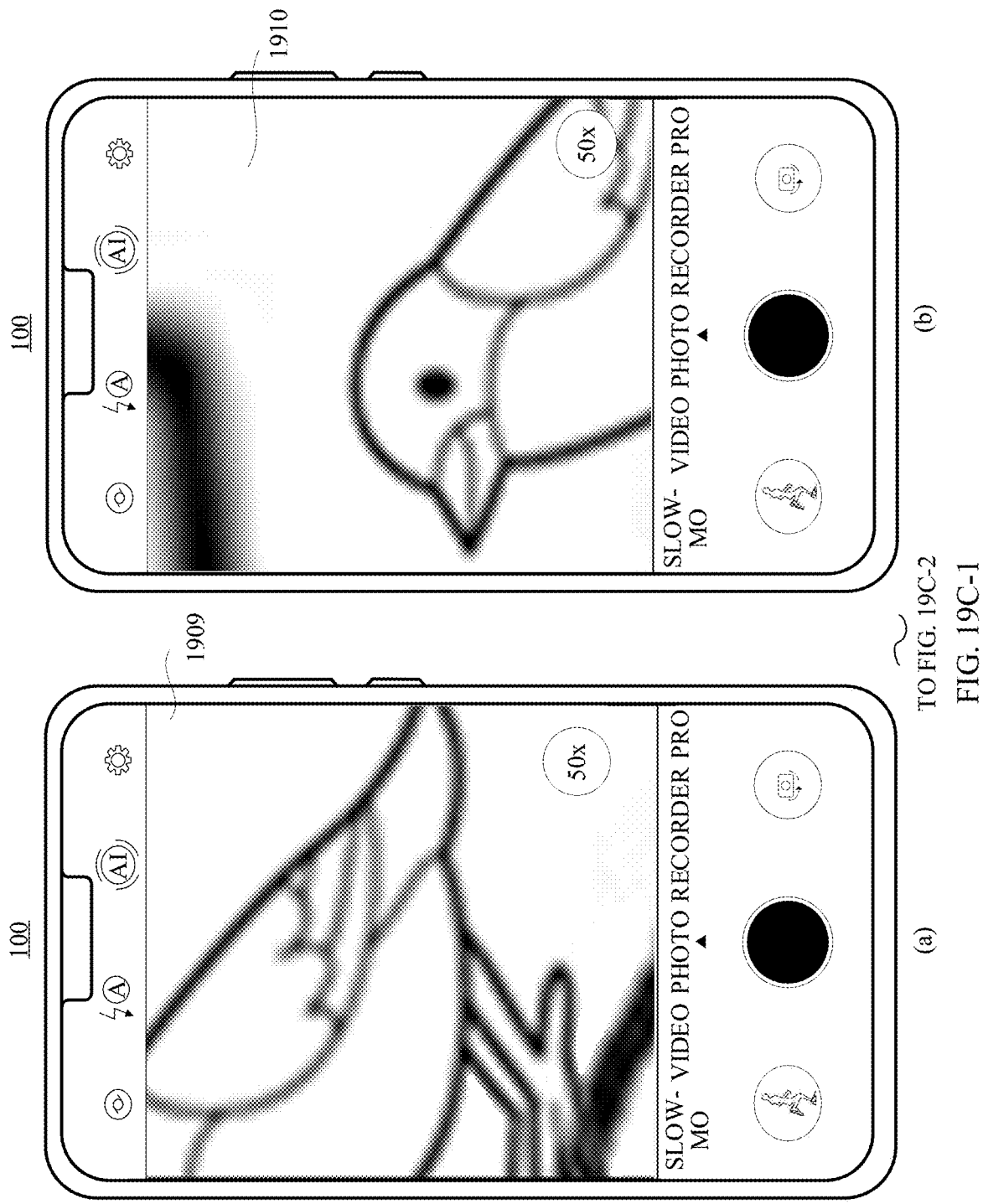

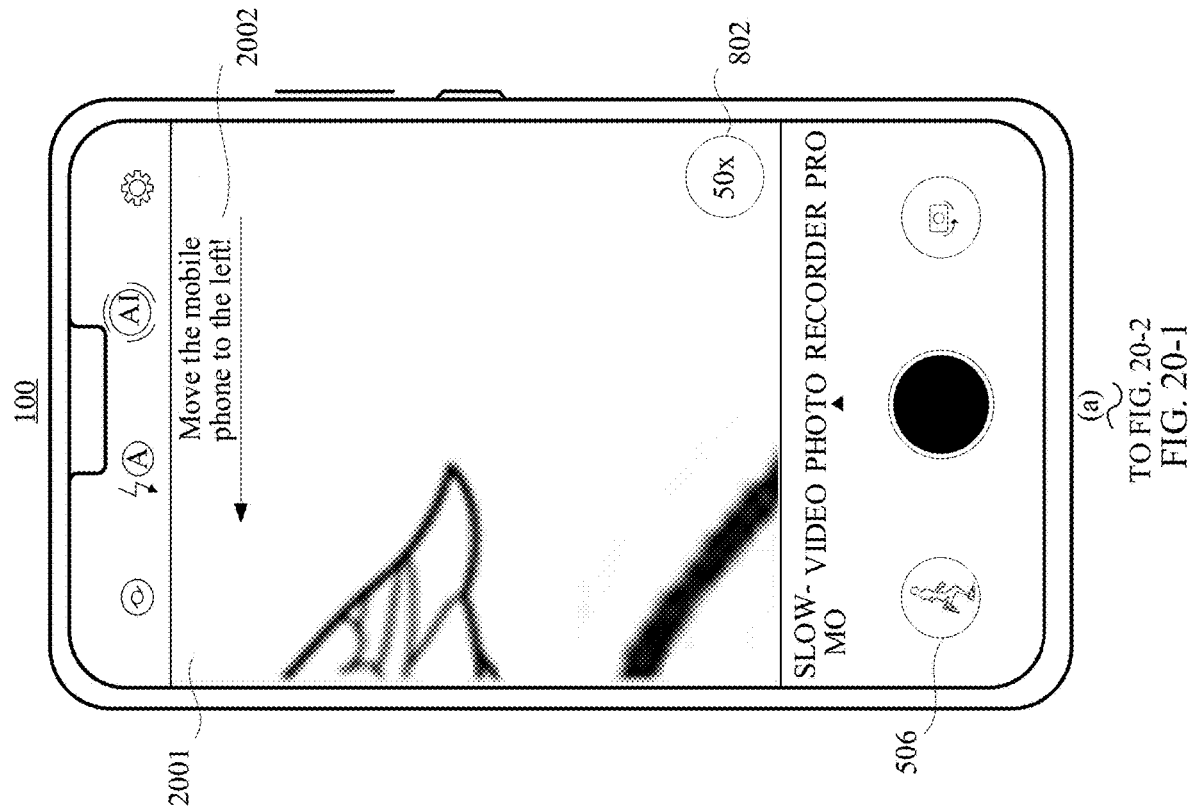

HIGH-MAGNIFICATION PHOTOGRAPHING METHOD AND ELECTRONIC DEVICE

CROSS-REFERENCE TO RELATED APPLICATIONS

This application is a National Stage of International Application No. PCT/CN2022/074838, filed Jan. 28, 2022, which claims priority to Chinese Patent Application No. 202110548528.2, filed May 19, 2021, both of which are hereby incorporated by reference in their entireties.

TECHNICAL FIELD

This application relates to the field of photographing technologies, and in particular, to a high-magnification photographing method and an electronic device.

BACKGROUND

With development of electronic technologies, electronic devices (such as a mobile phone, a tablet computer, or a smart watch) have more and more functions. For example, a camera is installed in most electronic devices, and has a function of photographing an image. Using a mobile phone as an example, the mobile phone includes one or more cameras, configured to collect an image.

When a user photographs a distant scene by using the mobile phone, a zoom ratio of the camera in the mobile phone needs to be magnified to photograph the scene clearly. For example, the mobile phone may adjust the zoom ratio of the camera of the mobile phone in response to a zoom operation performed by the user on a photographing interface. Adjusting the zoom ratio can make the mobile phone photograph the distant scene clearly. For example, as shown in FIG. 1, when a zoom ratio of a camera in a mobile phone 100 is magnified to 50 times, the mobile phone 100 can clearly photograph a bird 200 on a remote tree.

However, when the zoom ratio of the camera is relatively high (for example, 50 times), a slight movement (for example, hand trembling) of a hand of the user may seriously affect a viewfinder range of the camera; thus, the camera of the mobile phone 100 cannot target a scene that needs to be photographed, thereby increasing photographing difficulties. For example, because of hand trembling of the user, the mobile phone 100 cannot target the bird 200 that needs to be photographed; thus, a satisfactory photo cannot be taken. For example, as shown in FIG. 2, the mobile phone 100 may display a preview image shown in FIG. 2, and the preview image shown in FIG. 2 does not include a complete image of the bird 200.

SUMMARY

This application provides a high-magnification photographing method and an electronic device, so as to automatically adjust a zoom ratio and improve photographed image quality.

According to a first aspect, this application provides a high-magnification photographing method, where the method may be applied to an electronic device, and the electronic device includes a camera. The electronic device may display a first interface. The first interface is a viewfinder interface for photographing by the electronic device, and the first interface includes a first preview image collected by a camera when a zoom ratio is m. The first preview image includes an image of a target object, and the image of the target object is at a central position of the first preview image. The electronic device may display a second interface in response to a first operation performed by a user on the first interface, and obtain and save initial pose information of the electronic device. The second interface includes a second preview image collected by the camera when the zoom ratio is n, and the second preview image includes an image of the target object, where n>m. The initial pose information is used to indicate a motion state and a position when the electronic device receives the first operation.

That is, in a high-magnification photographing scenario, the electronic device may automatically lock, in response to an operation of the user, a photographing object that requires high-magnification photographing. Then, the electronic device may collect and display a preview image of the photographing object by using a proper zoom ratio, and obtain an initial state and an initial position of the electronic device. In this way, it is unnecessary for the user to manually adjust the zoom ratio, so that jitter caused by the user's manual operation can be reduced.

The initial state is a motion state (such as a gesture of the electronic device) of the electronic device when the electronic device collects the initial preview image. The initial position is a position of the electronic device when the electronic device collects the initial preview image. The initial state and the initial position may reflect a spatial position and a posture of the electronic device when the electronic device collects the initial preview image.

Then, the electronic device may obtain real-time pose information of the electronic device, where the real-time pose information is used to indicate a real-time motion state and a real-time position of the electronic device. Then, the electronic device may send first prompt information based on the real-time pose information and the initial pose information. The first prompt information is used to prompt the user to move the electronic device, so that the electronic device is in the motion state and at the position indicated by the initial pose information.

That is, the electronic device may obtain the real-time state and the real-time position of the electronic device, and prompt, based on the real-time state and the real-time position, the user to correct the position and pose of the electronic device, so that the electronic device can be maintained in the initial state and at the initial position or in a state near the initial state and initial position. When the electronic device is in different states, photographing areas (that is, viewfinder ranges) of the camera of the electronic device are different. The initial state and the initial position are the state and the position of the electronic device when the electronic device collects the initial preview image of the locked photographing object in response to an operation of the user. In this case, the photographing object locked by the electronic device is an object to be photographed by the user. When the photographing area of the camera deviates from the photographing area corresponding to the initial preview image, the electronic device may prompt the user to correct the position and the pose of the electronic device, so that the electronic device can maintain the position and the pose indicated by the initial state and the initial position, thereby ensuring that the electronic device can photograph a photographing object desired by the user.

Finally, the electronic device may receive a photographing operation of the user. In response to a photographing operation performed by the user, the electronic device may display a third interface. The third interface includes a third preview image and a fourth preview image. The third preview image is an image with a highest image parameter in a plurality of frames of second preview images collected by the camera, and the image parameter includes definition and/or integrity. The fourth preview image is an image photographed in response to the photographing operation. The electronic device may save a preview image selected by the user in response to a selection operation performed by the user on the third preview image and/or the fourth preview image.

That is, the electronic device may simultaneously display, in response to the photographing operation performed by the user, the preview image with the highest image parameter and a preview image manually photographed by the user, and the user selects a desired photo to save. In this way, the electronic device may take a photo that is satisfactory to the user according to a requirement of the user.

In a possible design manner of the first aspect, before the electronic device displays the first interface, the electronic device may display a fourth interface. The fourth interface is a viewfinder interface for photographing by the electronic device, the fourth interface includes a fifth preview image collected by the camera when the zoom ratio is m, and the fifth preview image includes an image of the target object. Then, the electronic device may send second prompt information on the fourth interface in response to a second operation performed by the user on the fourth interface, where the second operation is a selection operation performed by the user on the image of the target object, and the second prompt information is used to indicate the user to move the electronic device, so that the image of the target object is at a central position of the fifth preview image.

By using the method in this design manner, the electronic device may prompt the user to move the electronic device, so as to adjust the viewfinder range of the camera, so that the image of the target object is at the central position of the viewfinder frame (that is, the central position of the fifth preview image).

In another possible design manner of the first aspect, the electronic device further includes an angle adjustment apparatus of the camera, and the angle adjustment apparatus is configured to adjust a photographing angle of the camera, so that the camera rotates within a preset angle range.

Before the electronic device displays the first interface, the electronic device may display a fourth interface, the fourth interface is a viewfinder interface for photographing by the electronic device, the fourth interface includes a fifth preview image collected by the camera when the zoom ratio is 1, and the fifth preview image includes an image of the target object. Then, the electronic device may adjust the photographing angle of the camera in response to a second operation performed by the user on the fourth interface, so that the image of the target object is at a central position of the fifth preview image.

In this design manner, the user does not need to perform a manual operation. After receiving a second operation (for example, a tap operation) performed by the user on the image of the target object, the electronic device may automatically adjust the photographing angle of the camera so that the image of the target object is at a central position of a viewfinder interface, and automatically zoom to adjust the zoom ratio of the camera to n. In this way, jitter caused by the user's operation can be reduced, and impact of the user's operation on image quality of a photo taken by the electronic device can be reduced.

In another possible design manner of the first aspect, before the electronic device displays the first interface, and after the electronic device displays the fourth interface, the electronic device may further send third prompt information.

The third prompt information is used to prompt the user that the image of the target object is already at the central position of the fifth preview image. That is, the electronic device may prompt in time the user when the image of the target object is already at the central position of the fifth preview image.

In another possible design manner of the first aspect, that the electronic device displays a second interface in response to a first operation performed by a user on the first interface, and obtains and saves initial pose information of the electronic device may include: The electronic device determines, in response to the first operation, a to-be-photographed area that includes an image of the target object from the first preview image, so as to lock the target object from the first preview image. The electronic device automatically adjusts the zoom ratio to n, displays the second interface that includes a magnified to-be-photographed area, and obtains and saves the initial pose information of the electronic device.

In another possible design manner of the first aspect, the to-be-photographed area is a rectangular area formed by a preset length and width by using a contact area between the first operation and a touchscreen of the electronic device as a center of a rectangle. Alternatively, the to-be-photographed area is a rectangular area that includes the target object and that is identified by a collection image identification technology.

That the electronic device automatically adjusts the zoom ratio to n, displays the second interface that includes the magnified to-be-photographed area, and obtains and saves the initial pose information of the electronic device includes: The electronic device adapts a size of the touchscreen of the electronic device or a size of a viewfinder frame of the touchscreen, automatically adjusts the zoom ratio to n, and magnifies the image of the target object in the to-be-photographed area, so that the image of the target object fully occupies the viewfinder frame of the touchscreen of the electronic device.

In another possible design manner of the first aspect, the electronic device includes a gyroscope sensor and an acceleration sensor, and the gyroscope sensor and the acceleration sensor are configured to collect the initial pose information and the real-time pose information of the electronic device.

In another possible design manner of the first aspect, after the electronic device sends the first prompt information, and before the electronic device displays the third interface in response to the photographing operation of the user, the electronic device may further send fourth prompt information, where the fourth prompt information is used to indicate that the electronic device has returned to the motion state and the position indicated by the initial pose information. That is, the electronic device may prompt in time the user when the electronic device returns to the motion state and position indicated by the initial pose information.

In another possible design manner of the first aspect, the zoom ratio n may be a zoom ratio that needs to be selected by the user. Specifically, that the electronic device displays a second interface in response to a first operation performed by a user on the first interface may include: The electronic device sends fifth prompt information in response to a third operation performed by the user on the first interface, where the fifth prompt information is used to indicate the user to select the zoom ratio of the camera; the electronic device displays a sixth interface in response to a selection operation performed by the user on the zoom ratio n, where the sixth interface includes a sixth preview image collected by the camera of the electronic device when the zoom ratio is n, and the sixth preview image includes an image of the target object; and the electronic device displays the second interface in response to the first operation performed by the user on the sixth interface.

In another possible design manner of the first aspect, the sixth interface further includes a preset adjustment control, the preset adjustment control is configured to adjust the zoom ratio of the camera, and the preset adjustment control is further configured to indicate a current zoom ratio of the camera.

In another possible design manner of the first aspect, the sending the first prompt information may include: The electronic device displays the first prompt information on the second interface. Certainly, the first prompt information may alternatively be voice prompt information sent by the electronic device, which is not limited in this embodiment of this application.

In another possible design manner of the first aspect, the third preview image may be a second preview image with highest definition and highest integrity that is collected by the camera of the electronic device in a process from displaying the second interface by the mobile phone 100 to receiving the photographing operation by the electronic device. The integrity of the third preview image may be a proportion of the image of the target object included in the third preview image in a complete image of the target object.

For example, after the user locks and magnifies the to-be-photographed area, a preview image may be buffered at an interval of a first preset period, a preview image buffered for the first time is compared with a preview image buffered for the second time, and a preview image with a higher image parameter is retained. Then, the preview image with higher definition is compared with a preview image buffered next time, and a photo with higher definition is still retained. By analogy, a cache of the electronic device always stores a highest preview image.

Specifically, before the electronic device displays the third interface in response to the photographing operation of the user, and the third interface includes the third preview image and the fifth preview image, the method in this embodiment of this application may further include: The electronic device periodically buffers the second preview image collected by the camera until a pth second preview image collected by the camera is buffered, where the second preview image is a preview image displayed on the second interface and the third interface, p≥2, and p is an integer; the electronic device compares a second preview image i buffered at an ith time with an (i−1)th seventh preview image, to obtain and buffer an ith seventh preview image, where i is successively obtained from {1, 2, . . . , p} in ascending order, and i is an integer; the ith seventh preview image is a preview image with a highest image parameter in the second preview image i and the (i−1)th seventh preview image; the image parameter includes definition and/or integrity, and the integrity is a proportion of an image of a target object included in a preview image in a complete image of the target object; and the first seventh preview image is a second preview image 1 buffered for the first time; and the electronic device uses a pth seventh preview image as the third preview image.

According to a second aspect, this application provides a high-magnification photographing method, where the method may be applied to an electronic device, and the electronic device includes a camera. The electronic device may display a first interface, where the first interface is a viewfinder interface for photographing by the electronic device, the first interface includes a first preview image collected by the camera when a zoom ratio is m, and the first preview image includes an image of a target object.

Then, the electronic device may display a second interface in response to a zoom operation performed by a user on the first interface. The second interface includes a second preview image collected by the camera when the zoom ratio is n, and n>m. The zoom operation is used to trigger the electronic device to adjust the zoom ratio of the camera to n. The electronic device may further periodically buffer the second preview image.

If the electronic device receives the zoom operation performed by the user on the first interface, it indicates that the electronic device enters a high-magnification photographing scenario. In this case, the electronic device may automatically lock a photographing object that needs to be photographed at a high magnification, magnify and display a preview image (referred to as an initial preview image) of the photographing object, and obtain an initial state and an initial position of the electronic device. In this way, it is unnecessary for the user to manually adjust the zoom ratio, so that jitter caused by the user's manual operation can be reduced.

Specifically, the electronic device may lock the target object in the following manner: The electronic device periodically buffers the second preview image in real time; and the electronic device displays a third interface, and obtains and saves initial pose information of the electronic device if the second preset images buffered in consecutive K periods include a same photographing area, and integrity of an image of the target object in the same photographing area is greater than a preset integrity threshold. The third interface includes an image that includes the target object and that is collected by the camera when the zoom ratio is m; and the initial pose information is used to indicate that the second preset images buffered in consecutive K periods include a same photographing area, and a motion state and a position of the electronic device when the integrity of the image of the target object is greater than the preset integrity threshold, where K≥2, and K is an integer.

Then, the electronic device may further obtain real-time pose information of the electronic device, where the real-time pose information is used to indicate a real-time motion state and a real-time position of the electronic device. The electronic device may send first prompt information based on the real-time pose information and the initial pose information. The first prompt information is used to prompt the user to move the electronic device, so that the electronic device is in the motion state and at the position indicated by the initial pose information. In this case, the photographing object locked by the electronic device is an object to be photographed by the user. That is, when the photographing area of the camera deviates from the photographing area corresponding to the initial preview image, the electronic device may prompt the user to correct the position and the pose of the electronic device, so that the electronic device can maintain the position and the pose indicated by the initial state and the initial position, thereby ensuring that the electronic device can photograph a photographing object desired by the user.

Finally, the electronic device may display a fourth interface including a third preview image and a fourth preview image in response to a photographing operation of the user. The fourth preview image is an image photographed in response to the photographing operation. The third preview image is an image with a highest image parameter in a plurality of frames of second preview images collected by the camera, and the image parameter includes definition and/or integrity. The electronic device saves a preview image selected by the user in response to the user's selection of the third preview image and/or the fourth preview image in the fourth interface. That is, the electronic device may simultaneously display, in response to the photographing operation performed by the user, the preview image with the highest image parameter and a preview image manually photographed by the user, and the user selects a desired photo to save. In this way, the electronic device may take a photo that is satisfactory to the user according to a requirement of the user.

With reference to the second aspect, in a possible design manner, the sending first prompt information may include: displaying the first prompt information on the third interface. Certainly, the first prompt information may alternatively be voice prompt information sent by the electronic device, which is not limited in this embodiment of this application.

With reference to the second aspect, in another possible design manner, that the electronic device displays a third interface if the second preset images buffered in consecutive K periods include a same photographing area includes the following steps:

The electronic device compares a second preview image j buffered at a jth time with a second preview image j−1 buffered at a (j−1)th time, and determines whether a common grid j−1 exists between the second preview image j and the second preview image j−1. The common grid j−1 is a same photographing area in the second preview image j and the second preview image j−1; and j is an integer, and j is successively obtained from $\{2, \ldots, K\}$ in ascending order.

If the common grid j−1 exists between the second preview image j and the second preview image j−1, the electronic device compares a second preview image j+1 buffered at a (j+1)th time with the common grid j−1, and determines whether a common grid j exists between the second preview image j+1 buffered at the (j+1)th time and the common grid j−1. The common grid j is a same photographing area in the second preview image j+1 and the common grid j−1.

If the common grid j exists between the second preview image j+1 buffered at the (j+1)th time and the common grid j−1, the electronic device compares a second preview image j+2 buffered at the (j+2)th time with the common grid j, and determines whether a common grid j+1 exists between the second preview image j+2 buffered at the (j+2)th time and the common grid j. The common grid j+1 is a same photographing area in the second preview image j+2 and the common grid j.

By analogy, if a common grid K−2 exists between a second preview image K−1 buffered at a (K−1)th time and a common grid K−3, the electronic device compares a second preview image K buffered at a Kth time with the common grid K−2, and determines whether a common grid K−1 exists between the second preview image K and the common grid K−2. The common grid K−1 is a same photographing area in the second preview image K and the common grid K−2.

If the common grid K−1 exists between the second preview image K and the common grid K−2, the electronic device determines a photographing area corresponding to the common grid K−1 as a to-be-photographed area that includes an image of the target object, and displays the third interface. The third interface includes a preview image corresponding to the to-be-photographed area.

With reference to the second aspect, in another possible design manner, that the electronic device compares a second preview image j buffered at a jth time with a second preview image j−1 buffered at a (j−1)th time, and determines whether a common grid j−1 exists between the second preview image j and the second preview image j−1 may include the following steps:

The electronic device divides the second preview image j−1 buffered at the (j−1)th time into Q grid images, and divides the second preview image j buffered at the jth time into Q grid images, where Q≥1, and Q is an integer.

The electronic device obtains an image correlation coefficient between each grid image in the Q grid images of the second preview image j−1 and each grid image in the Q grid images of the second preview image j, where the image correlation coefficient is used to represent a similarity of two grid images, a value range of the image correlation coefficient is [0, 1], a larger image correlation coefficient of the two grid images indicates a higher similarity of the two grid images, and a smaller image correlation coefficient of the two grid images indicates a lower similarity of the two grid images.

The electronic device determines whether at least one of a plurality of image correlation coefficients of the Q grid images of the second preview image j−1 and the Q grid images of the second preview image j is greater than a preset similarity threshold.

If at least one of the plurality of image correlation coefficients of the Q grid images of the second preview image j−1 and the Q grid images of the second preview image j is greater than the preset similarity threshold, it indicates that the common grid j−1 exists between the second preview image j and the second preview image j−1; and if the plurality of image correlation coefficients of the Q grid images of the second preview image j−1 and the Q grid images of the second preview image j are all less than or equal to the preset similarity threshold, it indicates that the common grid j−1 does not exist between the second preview image j and the second preview image j−1.

With reference to the second aspect, in another possible design manner, that the electronic device obtains an image correlation coefficient between each grid image in the Q grid images of the second preview image j−1 and each grid image in the Q grid images of the second preview image j includes: The electronic device obtains histogram data of a first grid image and histogram data of a second grid image, where the first grid image is a grid image in the Q grid images of the second preview image j−1, and the second grid image is a grid image in the Q grid images of the second preview image j; and the electronic device calculates an image correlation coefficient between the first grid image and the second grid image based on the histogram data of the first grid image and the histogram data of the second grid image.

According to a third aspect, this application provides an electronic device, where the electronic device includes a memory, one or more cameras, and one or more processors. The memory, the camera, and the processor are coupled. The memory stores computer program code, and the computer program code includes computer instructions. When the computer instructions are executed by the processor, the electronic device performs the method according to the first aspect or the second aspect and any possible design manner thereof.

According to a fourth aspect, this application provides a computer readable storage medium, where the computer readable storage medium includes computer instructions, and when the computer instructions run on an electronic device, the electronic device performs the method according to the first aspect and any possible design manner thereof.

According to a fifth aspect, this application provides a computer program product. When the computer program product runs on a computer, the computer performs the method according to the first aspect and any possible design manner. The computer may be the foregoing electronic device.

It may be understood that for beneficial effects that can be achieved by the foregoing provided electronic device according to the third aspect and any possible design manner, the computer storage medium according to the fourth aspect, or the computer program product according to the fifth aspect, reference may be made to beneficial effects in the first aspect and any possible design manner, and details are not described herein again.

BRIEF DESCRIPTION OF DRAWINGS

FIG. 6B-1 and FIG. 6B-2 are a schematic diagram of a display interface of another electronic device according to an embodiment of this application;

FIG. 7A is a flowchart of another high-magnification photographing method according to an embodiment of this application;

FIG. 11-1 and FIG. 11-2 are a schematic diagram of a display interface of another electronic device according to an embodiment of this application;

FIG. 17A-1 and FIG. 17A-2 are a schematic diagram of a display interface of another electronic device according to an embodiment of this application;

FIG. 19C-1 and FIG. 19C-2 are a schematic diagram of a display interface of another electronic device according to an embodiment of this application;

FIG. 20-1 and FIG. 20-2 are a schematic diagram of a display interface of another electronic device according to an embodiment of this application.

DESCRIPTION OF EMBODIMENTS

Figure 1:
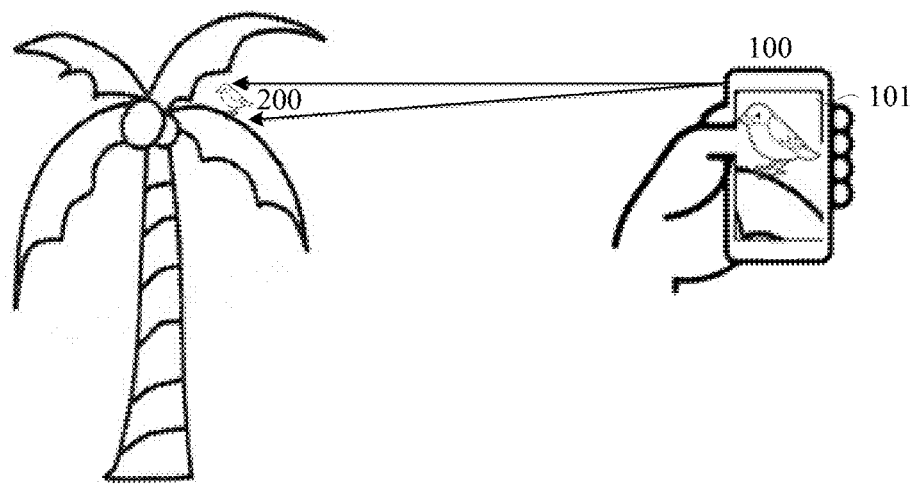
FIG. 1 is a schematic diagram of an application scenario of a high-magnification photographing method according to an embodiment of this application.

The terms "first" and "second" mentioned below are merely intended for a purpose of description, and shall not be understood as an indication or implication of relative importance or implicit indication of the quantity of indicated technical features. Therefore, features defining "first" and "second" may explicitly or implicitly include one or more such features. In the description of this application, unless otherwise stated, "a plurality of" means two or more than two.

An embodiment of this application provides a high-magnification photographing method, and the method may be applied to an electronic device that has a photographing function. In this method, in a high zoom ratio photographing scenario, the electronic device may automatically lock, in response to an operation of a user, a photographing object that requires high zoom ratio photographing. Then, the electronic device may collect and display a preview image (referred to as an initial preview image) of the photographing object by using a proper zoom ratio, and obtain an initial state and an initial position of the electronic device. In this way, it is unnecessary for the user to manually adjust the zoom ratio, so that jitter caused by the user's manual operation can be reduced.

The initial state is a motion state (such as a gesture of the electronic device) of the electronic device when the electronic device collects the initial preview image. The initial position is a position of the electronic device when the electronic device collects the initial preview image. The initial state and the initial position may reflect a spatial position and a posture of the electronic device when the electronic device collects the initial preview image.

Then, the electronic device may obtain the real-time state and the real-time position of the electronic device, and prompt, based on the real-time state and the real-time position, the user to correct the position and pose of the electronic device, so that the electronic device can be maintained in the initial state and at the initial position or in a state near the initial state and initial position. When the electronic device is in different states, photographing areas (that is, viewfinder ranges) of the camera of the electronic device are different. The initial state and the initial position are the state and the position of the electronic device when the electronic device collects the initial preview image of the locked photographing object in response to an operation of the user. In this case, the photographing object locked by the electronic device is an object to be photographed by the user.

That is, when the photographing area of the camera deviates from the photographing area corresponding to the initial preview image, the electronic device may prompt the user to correct the position and the pose of the electronic device, so that the electronic device can maintain the position and the pose indicated by the initial state and the initial position, thereby ensuring that the electronic device can photograph a photographing object desired by the user.

Finally, the electronic device simultaneously displays, in response to the photographing operation performed by the user, the initial preview image and a preview image manually photographed by the user, and the user selects a desired photo to save. In this way, the electronic device may take a photo that is satisfactory to the user according to a requirement of the user.

It should be noted that the zoom ratio may be an optical zoom ratio or a digital zoom ratio. For example, the zoom ratio may be 1×, 8×, 10×, 12×, 50×, or 12.8×. "1×" indicates that the zoom ratio is 1 time. "8×" indicates that the zoom ratio is 8 times. "50×" indicates that the zoom ratio is 50 times. In this embodiment of this application, a zoom ratio higher than a preset magnification threshold may be referred to as a high magnification. The magnification in this embodiment of this application may also be referred to as a multiple. That is, the zoom ratio may also be referred to as a zoom multiple, the preset magnification threshold may be referred to as a preset multiple threshold, and the high magnification may be referred to as a high multiple.

The following describes implementations of the embodiments of this application in detail with reference to the accompanying drawings. By using an example in which the electronic device is a mobile phone, a hardware structure of the electronic device (such as an electronic device 300) is described.

Figure 3:
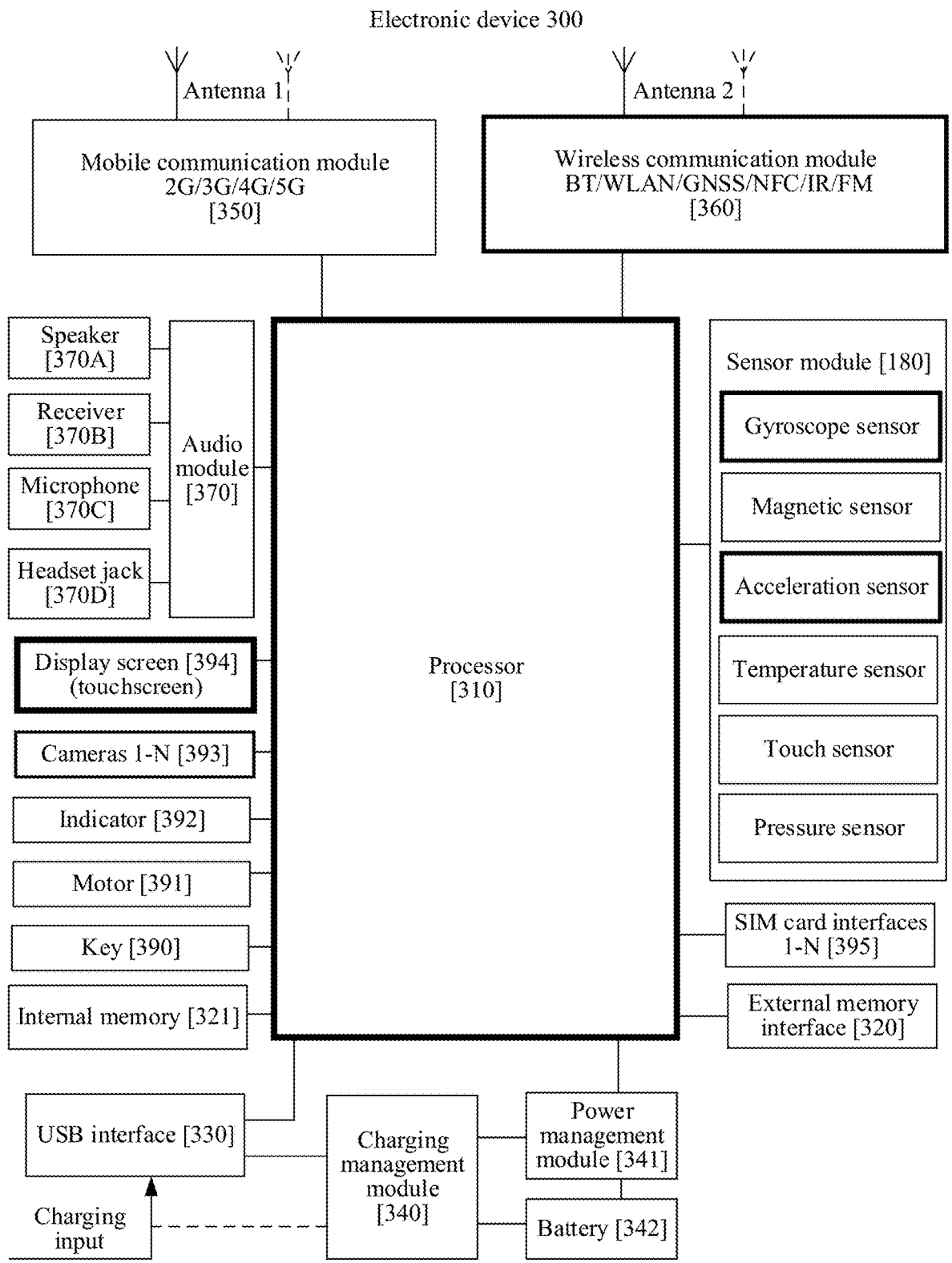
FIG. 3 is a schematic diagram of a hardware structure of an electronic device according to an embodiment of this application.

As shown in FIG. 3, the electronic device 300 may include: a processor 310, an external memory interface 320, an internal memory 321, a universal serial bus (universal serial bus, USB) interface 330, a charging management module 340, a power management module 341, a battery 342, an antenna 1, an antenna 2, a mobile communication module 350, a wireless communication module 360, an audio module 370, a speaker 370A, a phone receiver 370B, a microphone 370C, a headset jack 370D, a sensor module 380, a key 390, a motor 391, an indicator 392, a camera 393, a display screen 394, a subscriber identity module (subscriber identification module, SIM) card interface 395, and the like.

The sensor module 380 may include sensors, for example, a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that the schematic structure in this embodiment constitutes no specific limitation on the electronic device 300. In some other embodiments, the electronic device 300 may include more or fewer components than those shown in the figure, or some components may be combined, or some components may be split, or components are arranged in different manners. The components shown in the figure may be implemented by hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 300. The controller may generate an operating control signal according to an instruction operation code and a sequence signal, to complete control of fetching and executing an instruction.

A memory may be further configured in the processor 310, to store an instruction and data. In some embodiments, the memory in the processor 310 is a cache memory. The memory may store an instruction or data that is recently used or cyclically used by the processor 310. If the processor 310 needs to use the instruction or the data again, the processor 310 may directly invoke the instruction or the data from the memory, to avoid repeated access and reduce a waiting time of the processor 310, thereby improving system efficiency. In some embodiments, the processor 310 may include one or more interfaces.

It may be understood that a schematic interface connection relationship between the modules in this embodiment is merely an example for description, and constitutes no limitation on the structure of the electronic device 300. In some other embodiments, the electronic device 300 may alternatively use an interface connection manner different from that in the foregoing embodiment, or use a combination of a plurality of interface connection manners.

The charging management module 340 is configured to receive a charging input from a charger. The charger may be a wireless charger or a wired charger. The charging management module 340 may supply power to the electronic device by using the power management module 341 while charging the battery 342.

The power management module 341 is configured to connect to the battery 342, the charging management module 340, and the processor 310. The power management module 341 receives an input of the battery 342 and/or the charging management module 340, to supply power to the processor 310, the internal memory 321, an external memory, the display screen 394, the camera 393, the wireless communications module 360, and the like.

A wireless communication function of the electronic device 300 may be implemented by using the antenna 1, the antenna 2, the mobile communication module 350, the wireless communication module 360, the modem processor, the baseband processor, and the like.

The antenna 1 and the antenna 2 are configured to transmit or receive an electromagnetic wave signal. Each antenna in the electronic device 300 may be configured to cover one or more communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 350 may provide a solution to wireless communication such as 2G/3G/4G/5G applied to the electronic device 300. The mobile communication module 350 may include at least one filter, a switch, a power amplifier, a low noise amplifier (low noise amplifier, LNA), and the like. The mobile communication module 350 may receive an electromagnetic wave through the antenna 1, perform processing such as filtering and amplification on the received electromagnetic wave, and transmit a processed electromagnetic wave to the modem processor for demodulation. The mobile communication module 350 may further amplify a signal modulated by the modem processor, and convert the signal into an electromagnetic wave for radiation through the antenna 1.

The wireless communication module 360 may provide a solution for wireless communication including a wireless local area network (wireless local area network, WLAN) (such as a wireless fidelity (wireless fidelity, Wi-Fi) network), Bluetooth (blue tooth, BT), and a global navigation satellite system (global navigation satellite system, GNSS), frequency modulation (frequency modulation, FM), a near field communication (near field communication, NFC) technology, an infrared (infrared, IR) technology, and the like to be applied to the electronic device 300.

In some embodiments, the antenna 1 and the mobile communication module 350 of the electronic device 300 are coupled, and the antenna 2 and the wireless communication module 360 of the electronic device 300 are coupled, so that the electronic device 300 can communicate with a network and another device by using a wireless communication technology.

The electronic device 300 implements a display function by using the GPU, the display screen 394, the application processor, and the like. The GPU is a microprocessor for image processing, and is connected to the display screen 394 and the AP. The GPU is configured to perform mathematical and geometric calculation, and is configured to render graphics. The processor 310 may include one or more GPUs, and execute program instructions to generate or change display information.

The display screen 394 is configured to display an image, a video, and the like. The display screen 394 includes a display panel. For example, the display screen 394 may be a touchscreen.

The electronic device 300 can implement a photographing function by using the ISP, the camera 393, the video codec, the GPU, the display screen 394, the application processor, and the like.

The external memory interface 320 may be configured to connect to an external storage card, for example, a micro SD card, to expand a storage capability of the electronic device 300. The external storage card communicates with the processor 310 by using the external memory interface 320, to implement a data storage function, for example, storing a file such as a music or a video in the external storage card.

The internal memory 321 may be configured to store computer executable program code, and the executable program code includes instructions. The processor 310 runs the instruction stored in the internal memory 321, to perform various function applications and data processing of the electronic device 300. For example, in this embodiment of this application, the processor 310 may perform the instructions stored in the internal memory 321, and the internal memory 321 may include a program storage area and a data storage area. The program storage area may store an operating system, an application required by at least one function (for example, a sound playing function or an image playing function), and the like. The data storage area may store data (for example, audio data and an address book) and the like created when the electronic device 300 is used.

The electronic device 300 may implement an audio function such as music playing or recording by using the audio module 370, the speaker 370A, the phone receiver 370B, the microphone 370C, the headset jack 370D, the application processor, and the like.

The touch sensor is also referred to as a "touch panel". The touch sensor may be disposed on the display screen 394. The touch sensor and the display screen 394 form a touch-screen, which is also referred to as a "touchscreen". The touch sensor is configured to detect a touch operation performed on or near the touch sensor. The touch sensor may transmit the detected touch operation to the application processor, to determine a touch event type. The touch sensor may provide a visual output related to the touch operation by using the display screen 394. In some other embodiments, the touch sensor may alternatively be disposed on a surface of the electronic device 300, and is located on a position different from that of the display screen 394.

In this embodiment of this application, the electronic device 300 may detect a touch operation input by the user on the touch screen through the touch sensor, and collect one or more of a touch position and a touch time of the touch operation on the touch screen. In some embodiments, the electronic device 300 may determine the touch position of the touch operation on the touch screen by combining the touch sensor and the pressure sensor.

The key 390 includes a power key, a volume key, and the like. The key 390 may be a mechanical key, or a touch-type key. The electronic device 300 may receive a key input, and generate a key signal input related to user setting and function control of the electronic device 300.

The motor 391 may generate a vibration prompt. The motor 391 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different areas of the display screen 394, the motor 391 may also correspond to different vibration feedback effects. Different application scenarios (for example, a time prompt, information receiving, an alarm clock, and a game) may also correspond to different vibration feedback effects. A touch vibration feedback effect may be further customized.

The indicator 392 may be an indicator light, and may be configured to indicate a charging state or a battery change, or may be further configured to indicate a message, a missed call, a notification, or the like. The SIM card interface 395 is configured to connect to a SIM card. The SIM card may be inserted into the SIM card interface 395 or plugged from the SIM card interface 395, to come into contact with or be separated from the electronic device 300. The electronic device 300 may support one or N SIM card interfaces. N is a positive integer greater than 1. The SIM card interface 395 may support a Nano SIM card, a Micro SIM card, a SIM card, and the like.

The gyroscope sensor may be a three-axis gyroscope for tracking state changes of the electronic device 300 in six directions. The acceleration sensor is configured to detect a motion speed, a direction, and a displacement of the electronic device 300. In this embodiment of this application, the electronic device 300 may detect a state and a position of the electronic device 300 by using a gyroscope sensor and an acceleration sensor. When the state and the position of the electronic device 300 greatly change compared with the initial position and the initial state, the electronic device 300 may prompt, in real time on the display screen 394, the user to correct the state and the position of the electronic device 300 in a timely manner.

Methods in the following embodiments may all be implemented in the electronic device 300 having the foregoing hardware structure.

Figure 4A:
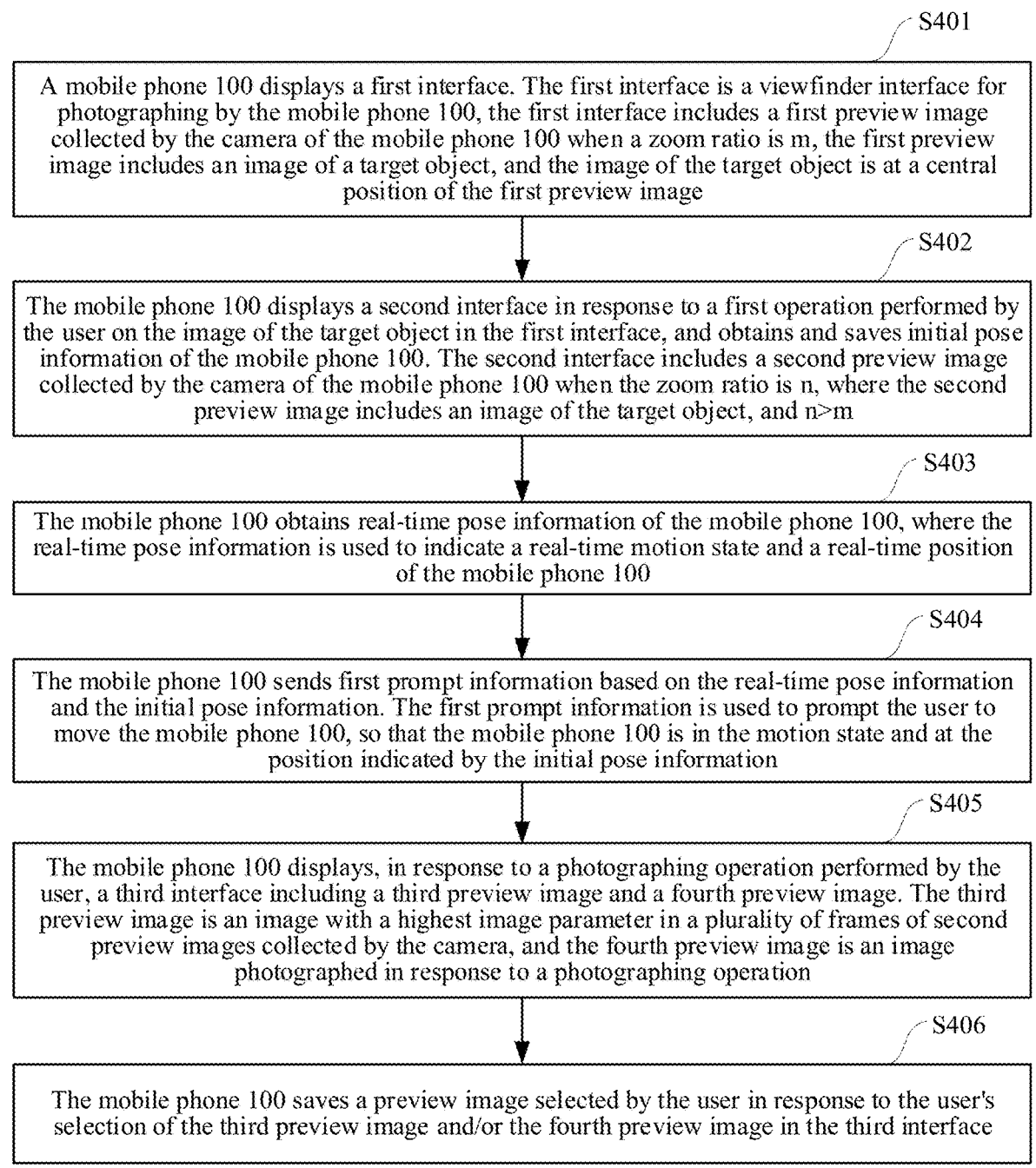
FIG. 4A is a flowchart of a high-magnification photographing method according to an embodiment of this application.

An embodiment of this application provides a high-magnification photographing method, and the method may be applied to the foregoing electronic device 300. In the following embodiment, that the electronic device 300 is the mobile phone 100 shown in FIG. 1 is used as an example to describe the method in this embodiment of this application. As shown in FIG. 4A, the high-magnification photographing method may include S401-S406.

S401. The mobile phone 100 displays a first interface. The first interface is a viewfinder interface for photographing by the mobile phone 100, the first interface includes a first preview image collected by the camera of the mobile phone 100 when a zoom ratio is m, the first preview image includes an image of a target object, and the image of the target object is at a central position of the first preview image.

Figure 4B:
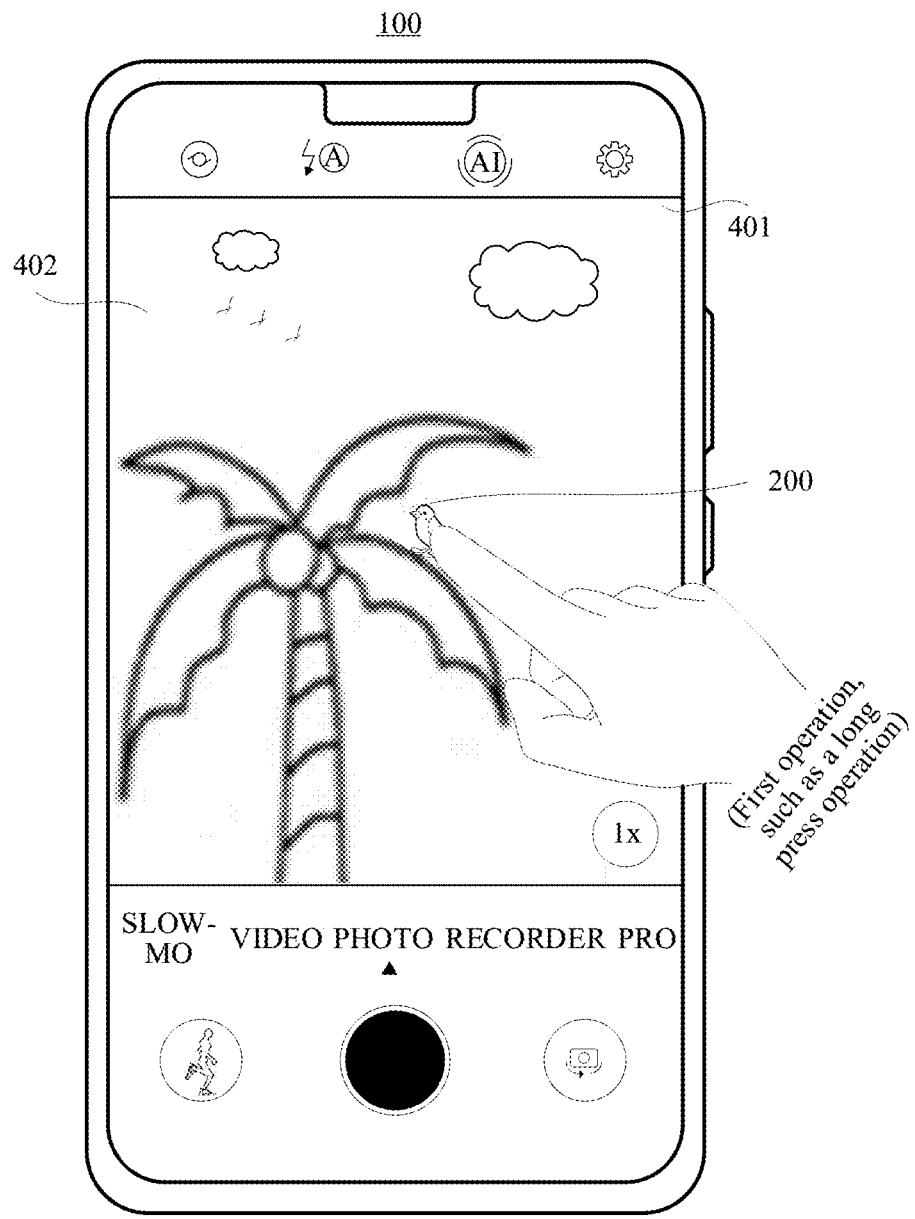
FIG. 4B is a schematic diagram of a display interface of another electronic device according to an embodiment of this application.

For example, the mobile phone 100 may display a first interface 401 shown in FIG. 4B, where the first interface 401 includes a first preview image 402, and the first preview image 402 includes an image of a target object "bird" 200. m=1 is used as an example. As shown in FIG. 4B, the first interface 401 further includes a zoom ratio identifier 403 "1×", indicating an optical magnification of 1 time.

Figure 4C:
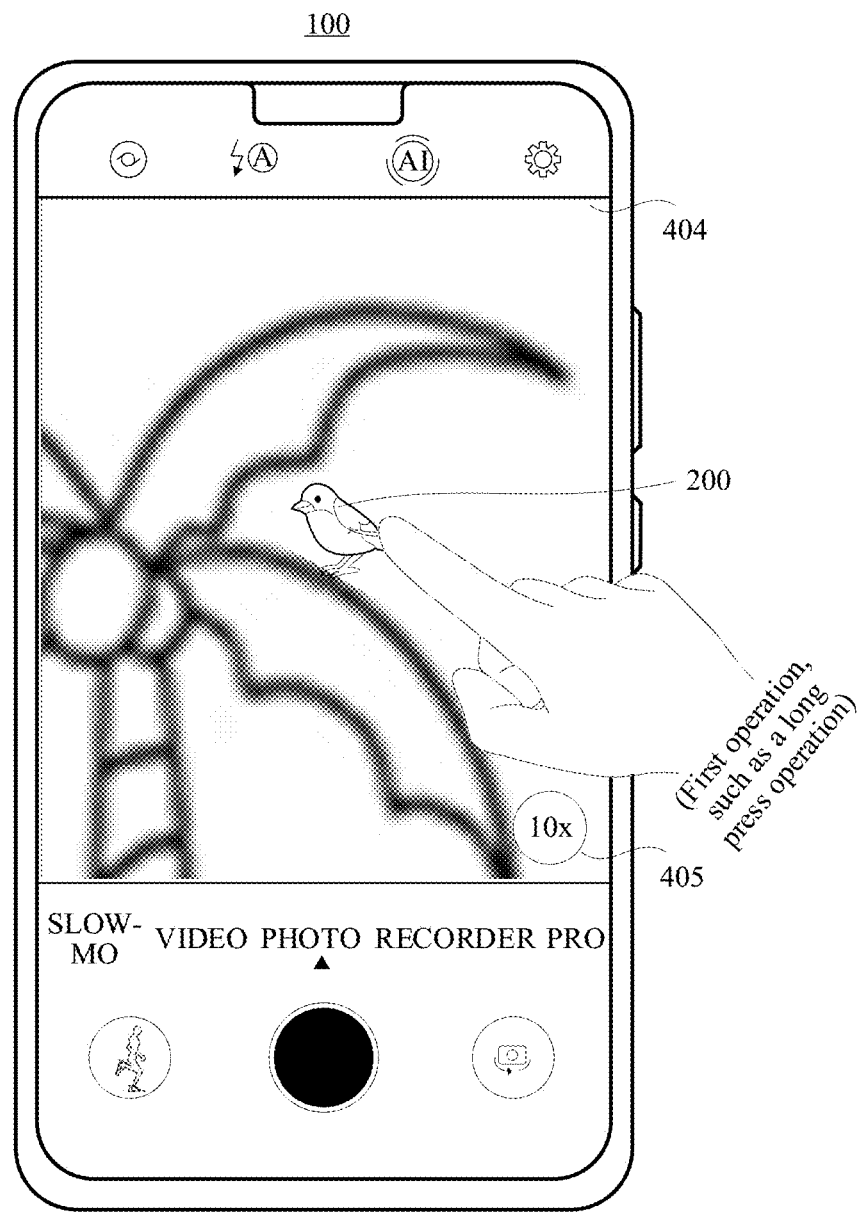
FIG. 4C is a schematic diagram of a display interface of another electronic device according to an embodiment of this application.

Certainly, m may alternatively be another value. For example, as shown in FIG. 4C, a first interface 404 includes a zoom ratio identifier 405 "10×", indicating an optical magnification of 10 times. In the following embodiments, m=1 is used as an example to describe the method in the embodiments of this application.

Figure 4D:
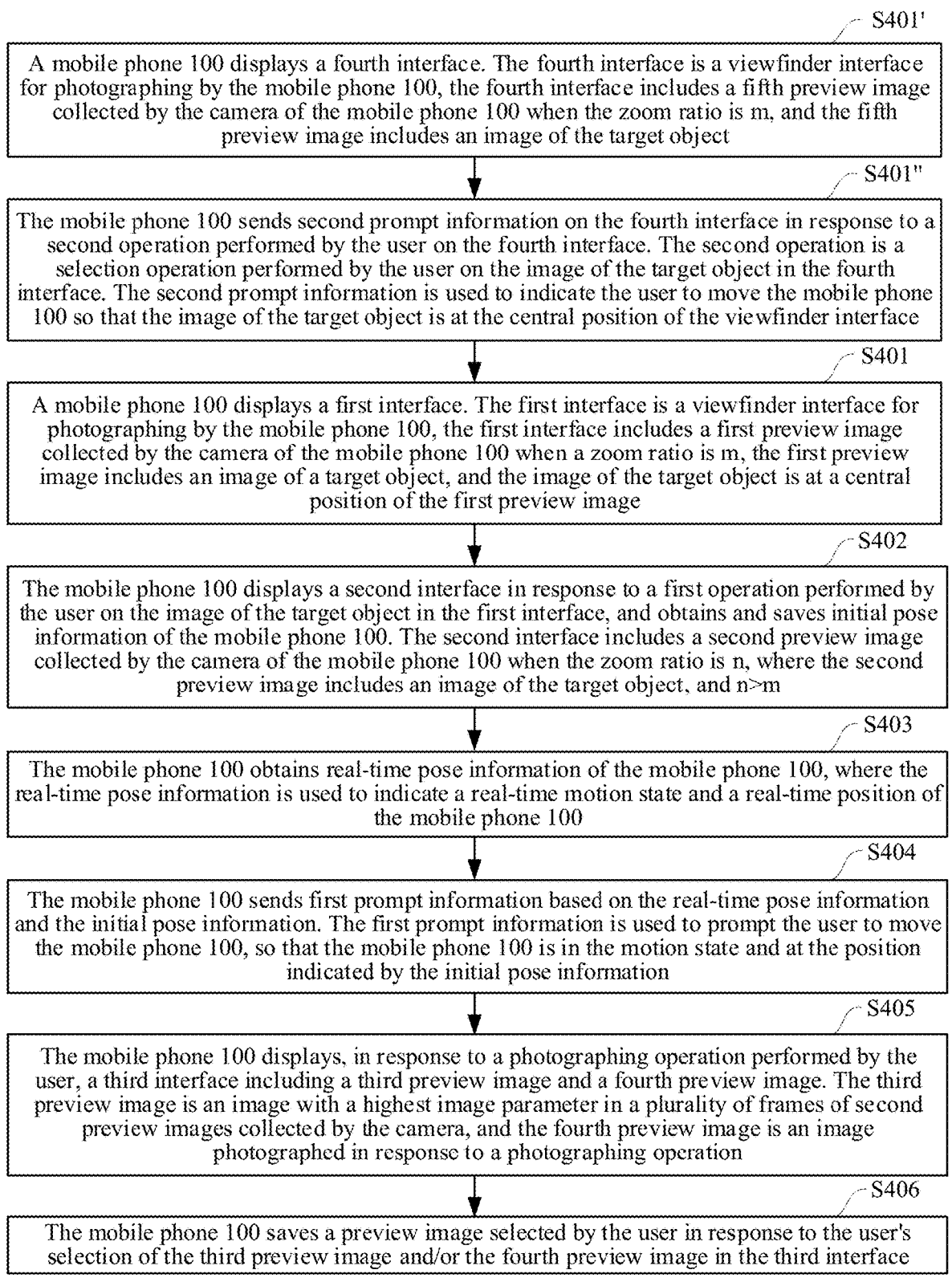
FIG. 4D is a flowchart of another high-magnification photographing method according to an embodiment of this application.

In some embodiments, the image of the target object may not be at a central position of a viewfinder frame of the mobile phone in a viewfinder interface displayed when the mobile phone starts a camera application. In this case, the mobile phone may guide the user to adjust a viewfinder range of the mobile phone, so that the image of the target object is at the central position of the viewfinder frame of the mobile phone. In this embodiment, as shown in FIG. 4D, before S401, the method in this embodiment of this application may further include S401' and S401".

S401'. The mobile phone 100 displays a fourth interface. The fourth interface is a viewfinder interface for photographing by the mobile phone 100, the fourth interface includes a fifth preview image collected by the camera of the mobile phone 100 when the zoom ratio is m, and the fifth preview image includes an image of the target object.

The mobile phone 100 may display the fourth interface in response to a tap operation performed by the user on an icon of the camera application. The fourth interface is a preview interface of the mobile phone 100 in a photographing mode.

Figure 5:
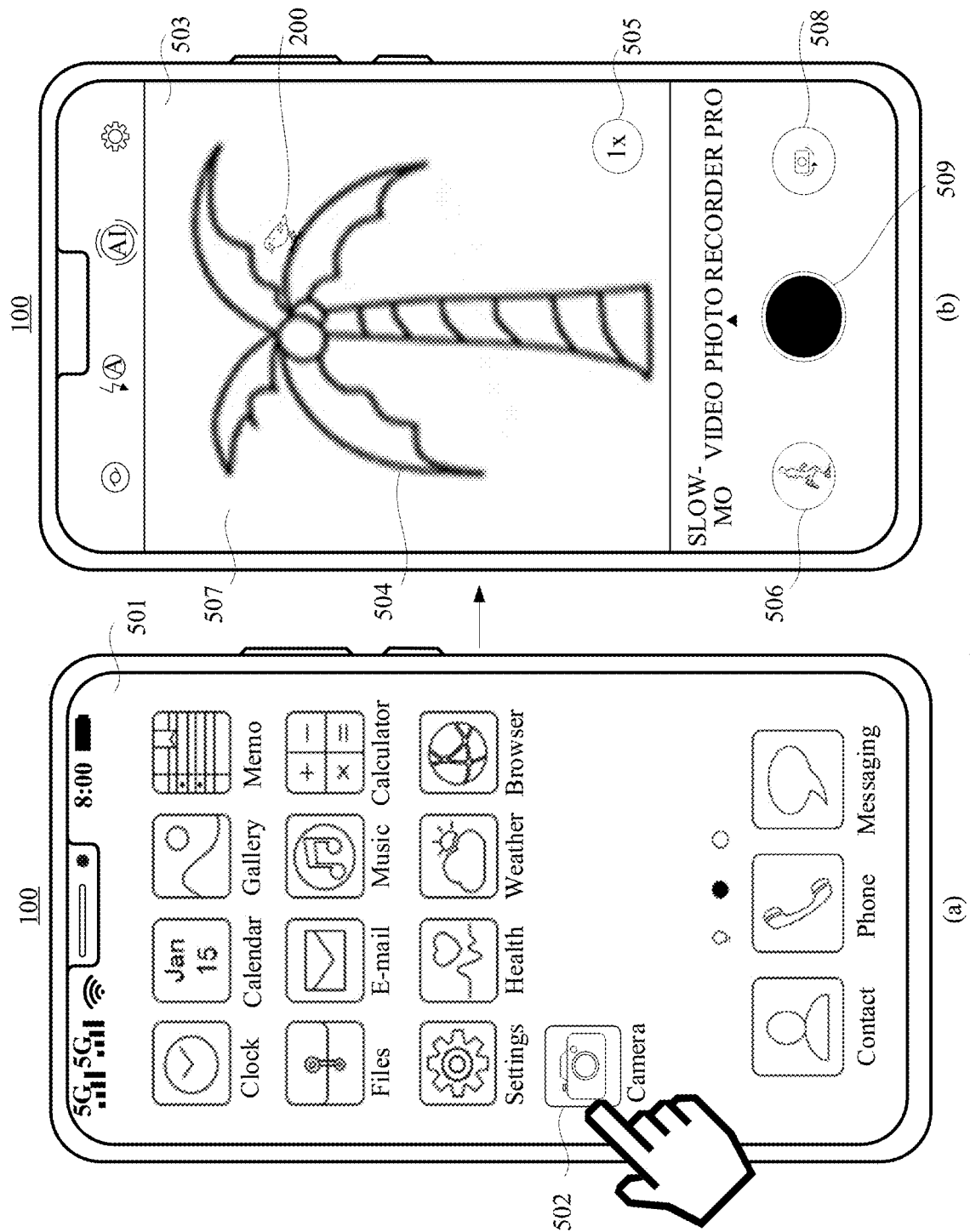
FIG. 5 is a schematic diagram of a display interface of another electronic device according to an embodiment of this application.

For example, the mobile phone 100 may display a main interface 501 shown in (a) of FIG. 5. The main interface 501 includes icons of a plurality of applications, such as an icon 502 of a camera application, an icon of a clock application, an icon of a calendar application, and an icon of a settings application. In response to a tap operation (for example, a single tap operation) performed by the user on the icon 502 of the camera application, the mobile phone 100 may display a fourth interface 503 shown in (b) of FIG. 5. The fourth interface 503 is a preview interface of the mobile phone 100 in a photographing mode, and the fourth interface 503 includes a fifth preview image 507.

The fourth interface 503 further includes an album key 506, a camera switch key 508, a photographing key 509, and the like. The album key 506 is configured to trigger the mobile phone 100 to display an album of the mobile phone 100. The album key 506 displays a most recent photo taken by the mobile phone 100. For example, as shown in (b) of FIG. 5, a photo of user exercise is displayed on the album key 506. The camera switch key 508 is configured to trigger the mobile phone 100 to switch the camera, for example, switch between front and rear cameras. The photographing key 509 is configured to trigger the mobile phone 100 to save a preview image collected by the camera Using m=1 as an example, a zoom ratio identifier 505 is used to indicate a zoom ratio of the camera of the mobile phone 100. For example, the zoom ratio identifier 505 "1×" indicates that the optical magnification is 1 time.

Generally, after the camera application is enabled on the mobile phone 100, the zoom ratio of the camera of the mobile phone 100 is 1. For example, as shown in (b) of FIG. 5, the fourth interface 503 further includes the zoom ratio identifier 505, and the zoom ratio identifier 505 is used to indicate that the zoom ratio of the camera is "1×", that is, 1 time zooming. Certainly, m may alternatively be another value. In a case of m>1, the fourth interface may be a preview interface of photographing displayed on the mobile phone after the zoom ratio of the camera is adjusted in response to a zoom operation of the mobile phone.

The preview image (for example, the fifth preview image 507) collected by the mobile phone 100 may include an image of one or more photographing objects. For example, the fifth preview image 507 shown in (b) of FIG. 5 includes an image of a photographing object "tree" 504 and an image of a photographing object "bird" 200.

It should be understood that in a low magnification scenario (that is, a scenario in which the zoom ratio of the camera of the mobile phone 100 is relatively low), the camera of the mobile phone 100 often cannot clearly photograph a relatively small scene in a distance. For example, the photographing object "bird" 200 is relatively far from the mobile phone 100 and the photographing object "bird" 200 is relatively small. As shown in (b) of FIG. 5, an image of the photographing object "bird" 200 (that is, the target object) in the fifth preview image 507 collected by the mobile phone 100 is not clear enough.

To clearly photograph a distant scene (that is, the target object), the mobile phone 100 may adjust the zoom ratio of the camera. In this way, the mobile phone 100 can clearly photograph a distant scene. In the method in this embodiment of this application, the mobile phone 100 may automatically increase the zoom ratio of the camera in response to an operation of selecting a photographing object (that is, the target object) on a photographing preview interface by the user. This can avoid a case that the mobile phone 100 cannot target the bird 200 that needs to be photographed because of hand trembling in a process in which the user manually increases the zoom ratio, and thus a satisfactory photo cannot be photographed. Specifically, after S401', the method in this embodiment of this application may further include S401".

S401". The mobile phone 100 sends second prompt information on the fourth interface in response to a second operation performed by the user on the fourth interface. The second operation is a selection operation performed by the user on the image of the target object in the fourth interface. The second prompt information is used to indicate the user to move the mobile phone 100 so that the image of the target object is at the central position of the viewfinder interface.

Figure 6A:
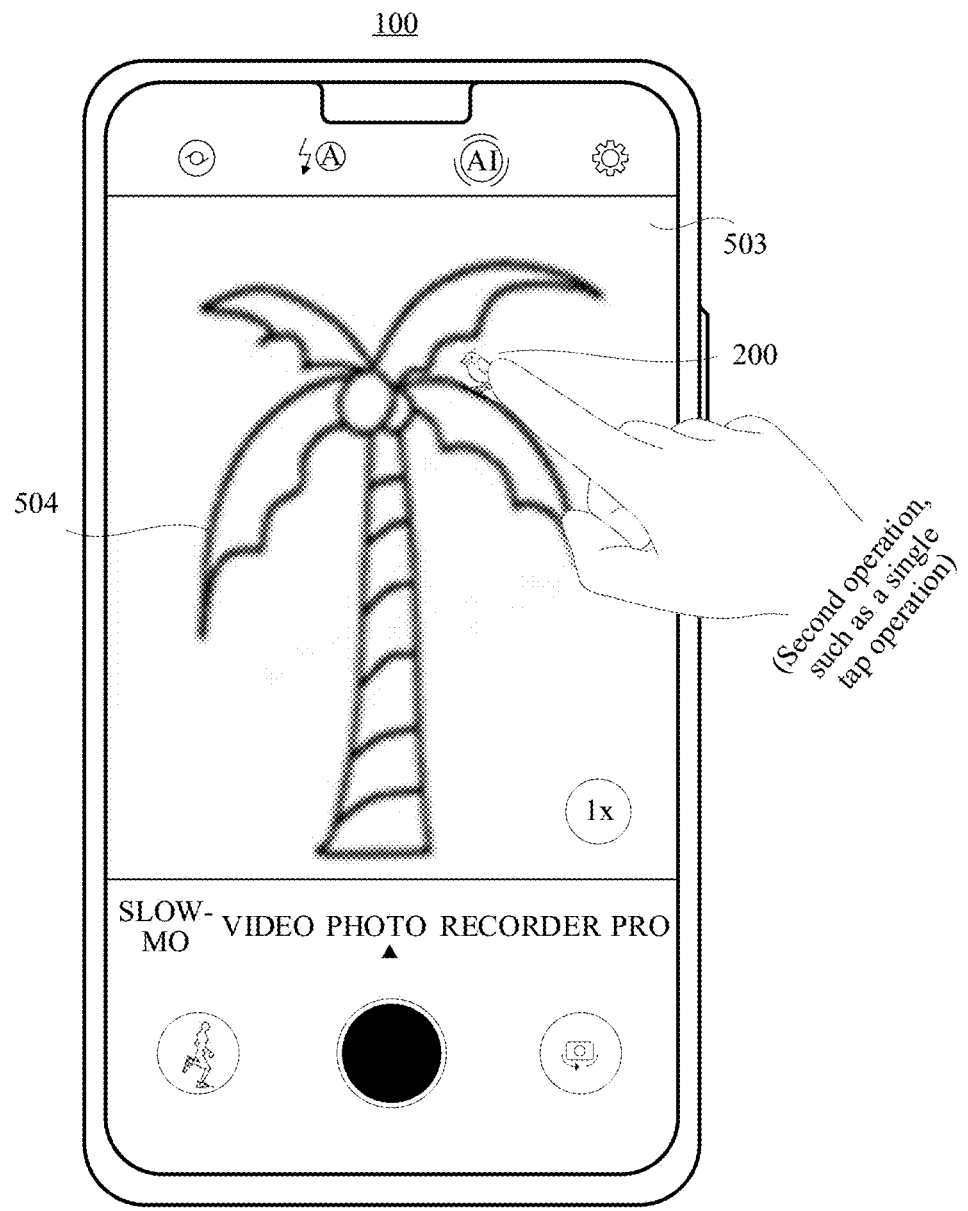
FIG. 6A is a schematic diagram of a display interface of another electronic device according to an embodiment of this application.

For example, the target object is the photographing object "bird" 200 shown in FIG. 6A. As shown in FIG. 6A, the mobile phone 100 may receive a second operation performed by the user on the image of the target object "bird" 200 in the fifth preview image 507. For example, the second operation may be a tap operation or double-tap operation performed by the user on a position of the image of the target object "bird" 200 in the fifth preview image 507.

Figures 1, 6B:
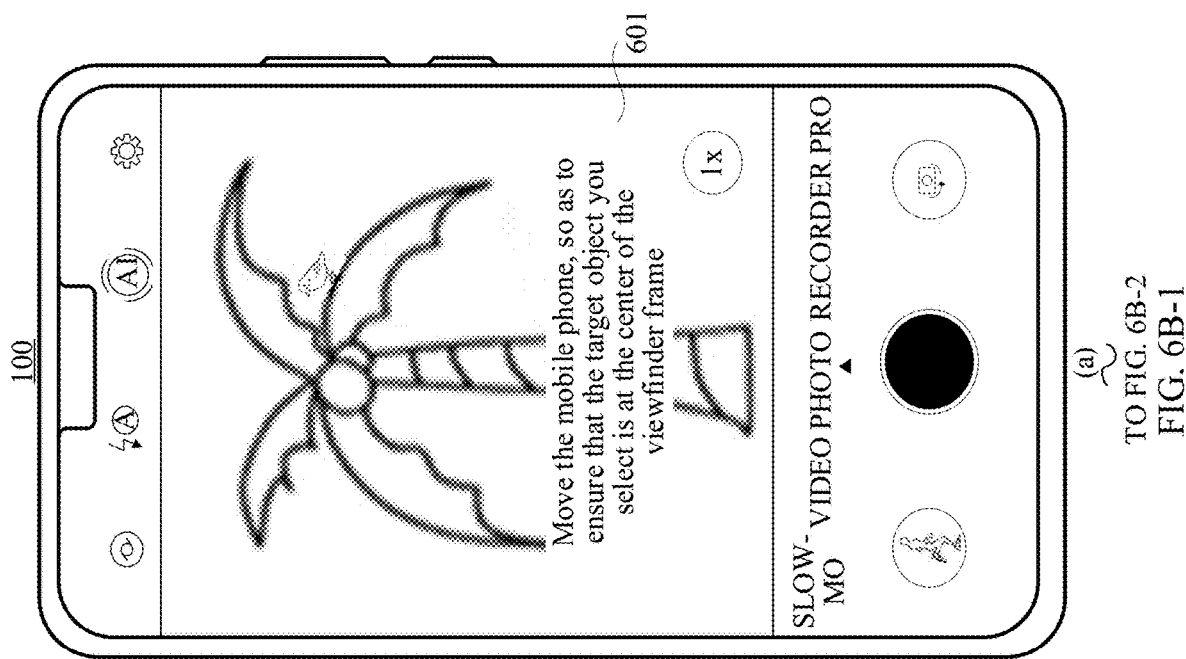
Figures 2, 6B:
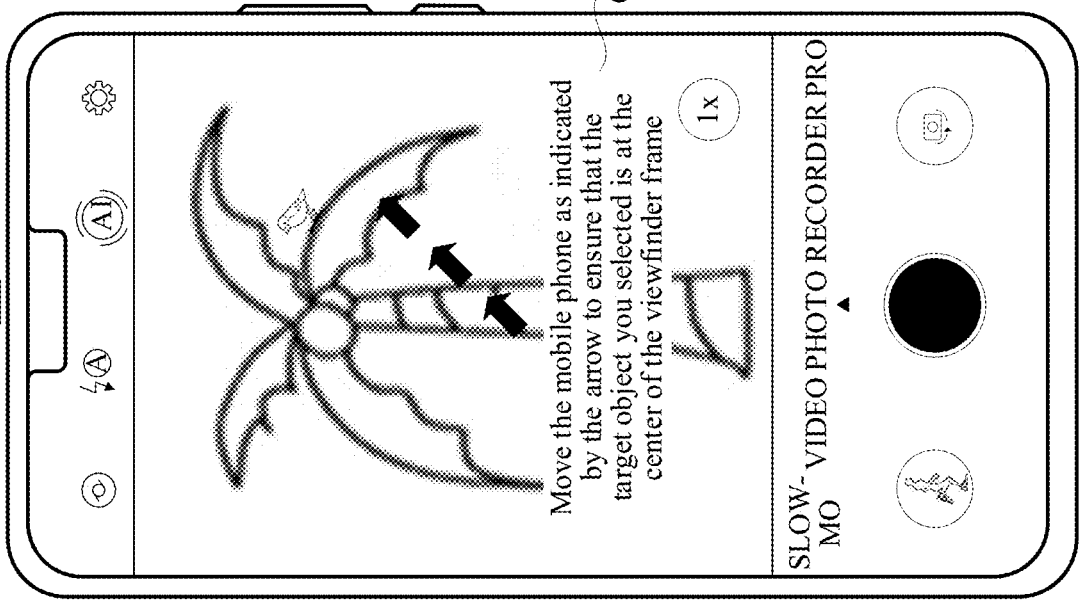

In response to the second operation performed by the user on the position of the image of the target object "bird" 200 in FIG. 6A, the mobile phone 100 may display second prompt information 601 shown in (a) of FIG. 6B-1. The second prompt information is used to indicate the user to move the mobile phone 100 so that the image of the target object is at the central position of the viewfinder interface. For example, the second prompt information 601 may be "Move the mobile phone, so as to ensure that the target object you select is at the center of the viewfinder frame".

In some other embodiments, the second prompt information may be further used to prompt the user of the position of the mobile phone. For example, in response to the second operation performed by the user on the position of the image of the target object "bird" 200 in FIG. 6A, the mobile phone 100 may display the second prompt information 602 shown in (b) of FIG. 6B-2, for example, "Move the mobile phone to the upper right to ensure that the target object you select is at the center of the viewfinder frame."

In some other embodiments, the second prompt information may further include a directional icon, such as a direction arrow, used to prompt the user to move the mobile phone. For example, in response to the second operation performed by the user on the position of the image of the target object "bird" 200 in FIG. 6A, the mobile phone 100 may display the second prompt information 603 shown in (c) of FIG. 6B-2, for example, "Move the mobile phone in the direction indicated by the arrow, so as to ensure that the target object you select is at the center of the viewfinder frame" and the direction arrow.

It should be noted that after the mobile phone 100 sends the second prompt information, the user may move the mobile phone based on the second prompt information. As the mobile phone moves, a viewfinder range of the mobile phone 100 may change. The user moves the mobile phone 100 as prompted by the second prompt information. When the image of the target object (such as the "bird" 200) is at the central position of the viewfinder interface, the user may stop moving the mobile phone 100. In this case, the mobile phone 100 may display the first interface 401 shown in FIG. 4B. The first interface 401 includes a first preview image 702, and the first preview image 702 includes an image of a target object "bird" 200. In addition, as shown in FIG. 4B, the image of the target object "bird" 200 is at the central position of the first preview image 702.

Figure 6C:
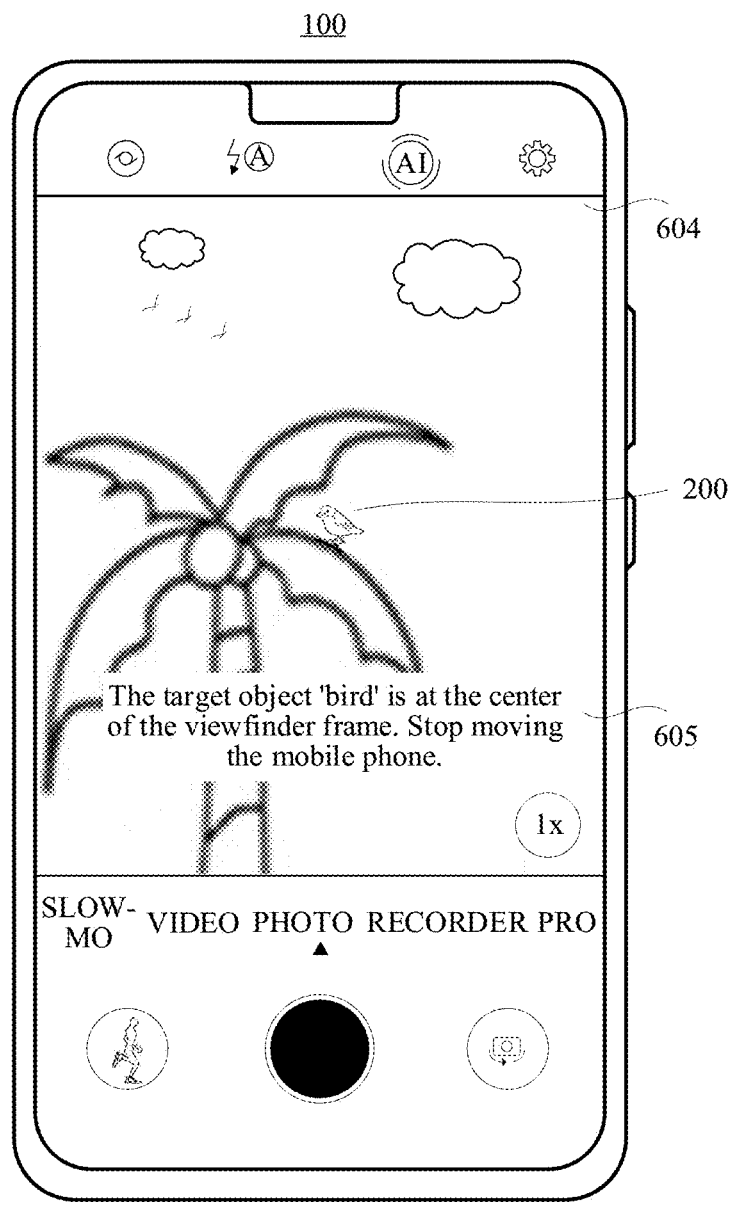
FIG. 6C is a schematic diagram of a display interface of another electronic device according to an embodiment of this application.

In some embodiments, the mobile phone 100 may detect, in real time, the position of the image of the target object (such as the "bird" 200) in the preview image (such as the first preview image). When the image of the target object is at a central position of a preview image (for example, the first preview image), the mobile phone 100 may send third prompt information. The third prompt information is used to prompt the user that the image of the target object is at the central position of the preview interface, and the mobile phone 100 may be stopped from moving. For example, the mobile phone 100 may display a first interface 604 shown in FIG. 6C. The first interface 604 includes third prompt information 605, for example, "The target object 'bird' is at the center of the viewfinder frame. Stop moving the mobile phone". As shown in FIG. 6C, the image of the target object "bird" 200 is at the central position of the first preview image 604. In other embodiments, the mobile phone 100 may display the third prompt information 605 within preset duration. After the preset duration is expired, the mobile phone 100 may perform S401 to display the first interface 401 shown in FIG. 4B.

For example, the method for identifying, by the mobile phone 100, that the image of the target object is at the central position of the first preview image may include: The mobile phone 100 determines whether the image of the target object is in a preset central area of the viewfinder frame of the mobile phone 100. The preset central area is at the central position of the viewfinder frame of the mobile phone 100.

Figure 6D:
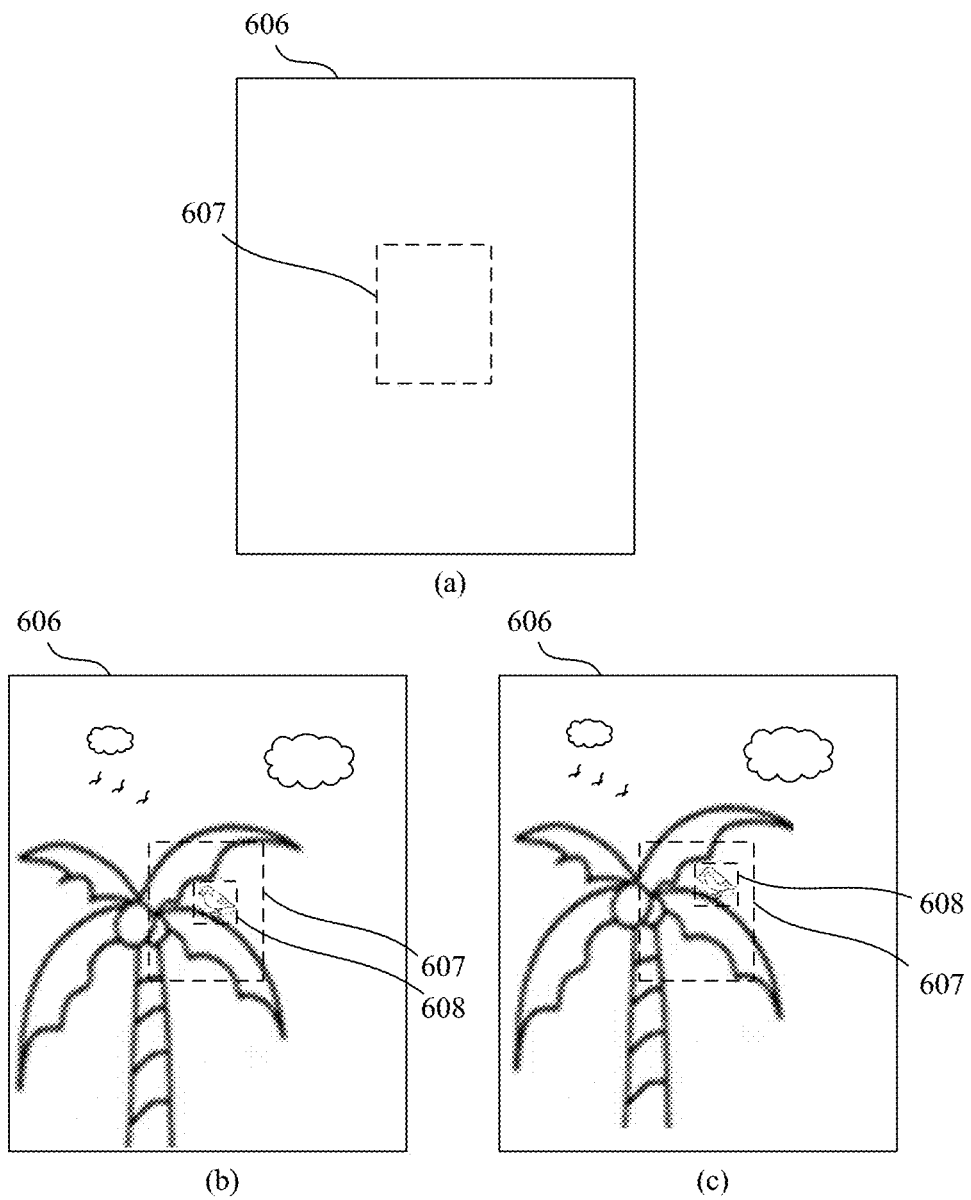
FIG. 6D is a schematic diagram of a preview image according to an embodiment of this application.

If the image of the target object is in the preset central area of the viewfinder frame of the mobile phone 100, it indicates that the image of the target object is at the central position of the first preview image. For example, as shown in (a) of FIG. 6D, a preset central area 607 is at a central position of a viewfinder frame 606 of the mobile phone 100 in the photographing mode. As shown in (b) of FIG. 6D or (c) of FIG. 6D, an image 608 of the target object "bird" is in the preset central area 607. If the image of the target object is outside the preset central area of the viewfinder frame of the mobile phone 100, it indicates that the image of the target object is at the central position of the first preview image.

It should be noted that, that the image of the target object is in the preset central area of the viewfinder frame of the mobile phone 100 specifically means that the entire image of the target object is in the preset central area of the viewfinder frame of the mobile phone 100. That the image of the target object is outside the preset central area of the viewfinder frame of the mobile phone 100 specifically means that a part of or the entire image of the target object is outside the preset central area of the viewfinder frame of the mobile phone 100.

S402. The mobile phone 100 displays a second interface in response to a first operation performed by the user on the image of the target object in the first interface, and obtains and saves initial pose information of the mobile phone 100. The second interface includes a second preview image collected by the camera of the mobile phone 100 when the zoom ratio is n, and the second preview image includes an image of the target object, where n>m.

The first operation is used to trigger the mobile phone 100 to increase the zoom ratio, so as to display a first preview image that includes the image of the target object. For example, the first operation may be a long press operation performed by the user on the image of the target object in the second preview image.

Figure 8:
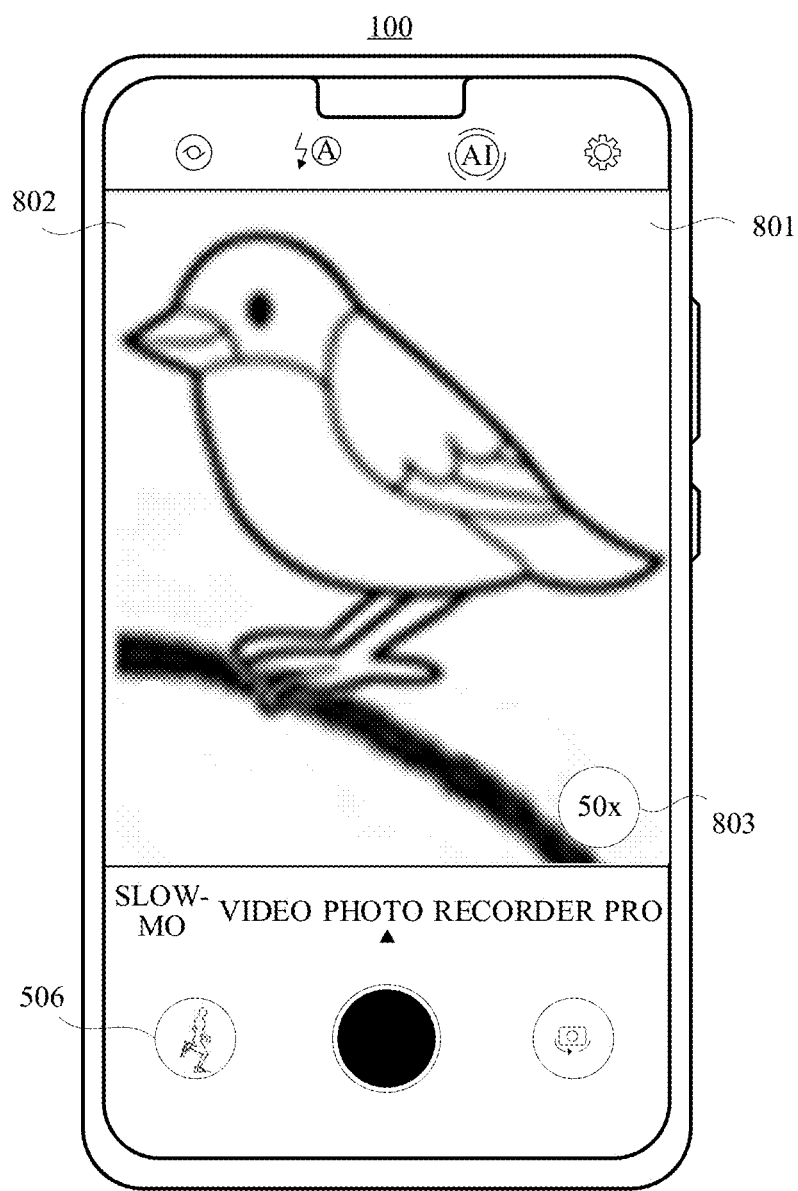
FIG. 8 is a schematic diagram of a display interface of another electronic device according to an embodiment of this application.

For example, the mobile phone 100 may receive a first operation (such as a long press operation) that is entered by the user on the first interface 401 shown in FIG. 4B or the first interface 404 shown in FIG. 4C. In response to the first operation, the mobile phone 100 may display a second interface 801 shown in FIG. 8. The second interface 801 includes a second preview image 802. The second preview image 802 is collected by the camera of the mobile phone 100 when the zoom ratio is 50, that is, n=50. As shown in FIG. 8, the second interface 801 further includes a zoom ratio identifier 803, and the zoom ratio identifier 803 is used to indicate that the zoom ratio of the camera is "50×", that is, 50 time zooming.

The initial pose information of the mobile phone 100 may include initial state information and initial position information of the mobile phone 100. The initial state information is used to indicate a motion state (referred to as an initial state) of the mobile phone 100 when the mobile phone 100 receives the first operation. The initial position information of the mobile phone 100 is used to indicate a position (referred to as an initial position) of the mobile phone 100. It should be understood that, when the mobile phone 100 receives the first operation, the image of the target object is at the central position of the viewfinder frame. When the mobile phone 100 maintains this pose (that is, the pose indicated by the initial pose information), after increasing the zoom ratio, the mobile phone 100 has a relatively high probability of photographing the complete target object. Therefore, the initial state and the initial position may be used to correct the state and the position of the mobile phone 100 adjusted by the user, so that the mobile phone 100 can photograph the complete target object.

For example, the mobile phone 100 includes a gyroscope sensor and an acceleration sensor. In some embodiments, the mobile phone 100 may obtain the initial pose information of the mobile phone 100 by using the gyroscope sensor and the acceleration sensor when the mobile phone 100 displays the second interface.

In some embodiments, to avoid misoperation of the user, causing the mobile phone 100 to display a preview image collected by the camera when the zoom ratio is n, the first operation may be a long press operation in which pressing duration entered by the user on the first interface is greater than or equal to a preset duration threshold. For example, the preset duration threshold may be any duration such as 2.5 seconds (s) or 2 s.

In this embodiment, if the mobile phone 100 receives a press operation that is entered by the user on the first interface and whose press duration is less than or equal to the preset duration threshold, the mobile phone 100 may not perform S402.

Figure 7B:
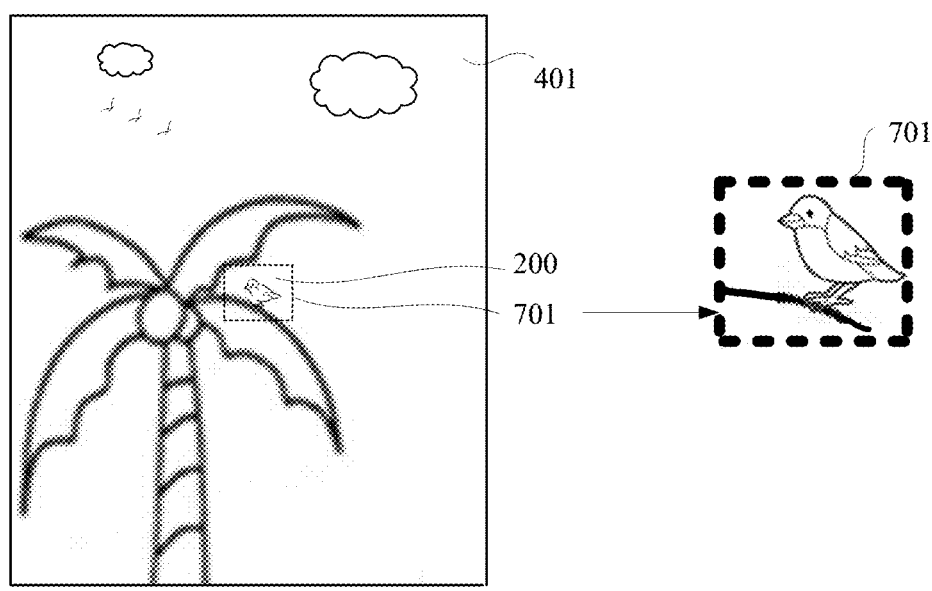
FIG. 7B is a schematic diagram of another preview image according to an embodiment of this application.

In some other embodiments, after receiving the first operation, the mobile phone 100 may determine, in response to the first operation, a photographing area (referred to as a to-be-photographed area) in which the image of the target object is located from the first preview image. For example, as shown in FIG. 7B, the mobile phone 100 may determine, from the first preview image 401, a to-be-photographed area 701 in which the image of the target object "bird" is located, that is, lock the to-be-photographed target object "bird". Then, the mobile phone 100 may adjust the zoom ratio of the camera to n based on the to-be-photographed area 701, and display a second preview image that includes the image of the target object (such as the "bird").

In this embodiment, the mobile phone 100 may obtain the initial pose information of the mobile phone 100 when the mobile phone 100 determines the to-be-photographed area 701 (that is, locks the to-be-photographed target object).

For example, in S402 described herein in this embodiment of this application, the mobile phone 100 displays, in response to the first operation, the second interface including the second preview image, and obtains and stores the initial state information and the initial position information of the mobile phone 100. For example, as shown in FIG. 7A, S402 may include S402a-S402b.

S402a. The mobile phone 100 determines a to-be-photographed area including the image of the target object from the first preview image in response to the first operation, so as to lock the target object from the first preview image.

For example, the first operation is the long press operation shown in FIG. 4B. The mobile phone 100 may receive a long press operation performed by the user on the image of the target object "bird" 200 shown in FIG. 4B. The mobile phone 100 may determine, based on the long press operation collected by a touch sensor on the touchscreen, an area corresponding to the long press operation of the user (that is, the to-be-photographed area that includes the image of the target object).

Specifically, the to-be-photographed area including the image of the target object may be a rectangular area in which a center of a touch area between the first operation (for example, the long press operation) and the touchscreen is used as a center of a rectangle, and a preset length and a preset width are a cm (cm) and b cm respectively. For example, the rectangle may be a square, and the to-be-photographed area may be a square area whose side length is L cm and whose center is the center of the contact area between the first operation and the touchscreen. That is, a=b=L. For example, L=2 cm.

For example, after recognizing the long-press operation, the touchscreen of the mobile phone 100 may send, to a processor of the mobile phone 100, an instruction that includes the long press operation and coordinate position information that is of the long press operation and that is applied to the touchscreen. After receiving the instruction and the coordinate position information, the processor of the mobile phone 100 may obtain the first preview image collected by the camera. Then, the to-be-photographed area is determined based on the coordinate position indicated by the coordinate position information in the foregoing manner.

For example, FIG. 7B shows the first preview image 401 shown in FIG. 4B. As shown in FIG. 7B, an area 701 in which the image of the target object "bird" 200 in the first preview image 401 is located (that is, an area corresponding to a dashed line box shown in FIG. 7B) is the to-be-photographed area. That is, the mobile phone 100 may lock the area 701 in which the image of the target object "bird" 200 in the first preview image 401 is located as the to-be-photographed area. The to-be-photographed area 701 includes the image of the target object "bird" 200.

In some embodiments, in response to the first operation, when determining a to-be-photographed area that includes an image of the target object from the first preview image, the mobile phone 100 further needs to consider image integrity of the target object. That is, the mobile phone 100 needs to include a complete image of the target object in response to the to-be-photographed area determined by the first operation.

For example, in response to the first operation, the mobile phone 100 may identify, by using an image recognition technology, the target object (such as the bird or the moon)

in the photographing area locked by the first operation. Then, the mobile phone 100 may identify a complete image of the target object in the first preview image by using the image recognition technology. Finally, the mobile phone 100 may determine the photographing area that includes the complete image of the target object as the to-be-photographed area.

S402b. The mobile phone 100 automatically adjusts the zoom ratio to n, displays the second interface that includes the magnified to-be-photographed area, and obtains and saves the initial pose information of the mobile phone 100.

For example, after locking the to-be-photographed area, the mobile phone 100 may automatically adjust the zoom ratio of the camera, magnify the image of the target object in the to-be-photographed area, and fully occupy a display screen (such as the touchscreen) or a viewfinder frame of the display screen of the mobile phone 100. The mobile phone 100 may adapt to a size of the display screen of the mobile phone 100 or a size of the viewfinder frame of the display screen, and determine the zoom ratio n, so that the image of the target object in the to-be-photographed area fully occupies the display screen or the viewfinder frame of the display screen of the mobile phone 100.

For example, after the mobile phone 100 locks the to-be-photographed area 701 shown in FIG. 7B, the to-be-photographed area 701 is a square with a side length of 2 cm. For the 7-inch mobile phone 100, if the aspect ratio of the display screen of the mobile phone 100 is 16:9, a length and a width of the mobile phone 100 are about 15.5 cm and 8.7 cm respectively. In this case, the zoom ratio is n=8.7/2=4.35.

After the zoom ratio n is determined, the display screen of the mobile phone 100 is a rectangle. Therefore, an amplification multiple may be determined by using a shortest display width of the mobile phone 100. For example, after the square to-be-photographed area 701 is magnified by 4.35 times, the display screen is exactly filled in the width direction. A picture is automatically complemented from the first preview image in the length direction.

For example, n=50. The mobile phone 100 may display the second interface 801 shown in FIG. 8. As shown in FIG. 8, the second interface 801 includes a second preview image 802, and the second preview image 802 includes an image of the target object "bird". The second interface 801 further includes a zoom ratio identifier 803, and the zoom ratio identifier 803 is used to indicate that the zoom ratio is 50.

In some other embodiments, the mobile phone 100 may automatically identify, by using the image recognition technology, a to-be-photographed area that includes a complete image of the target object. In this case, the mobile phone 100 may first determine a length X cm and a width Y cm of a to-be-photographed area that include a complete image of the target object. Assuming that the display screen of the mobile phone 100 is 7 inches, the zoom ratio is n=Min(15.5/X, 8.7/Y). Min(15.5/X, 8.7/Y) represents the smaller value in 15.5/X and 8.7/Y. After determining the zoom ratio n, the mobile phone 100 may fill the display screen in a smaller direction in the length direction and the width direction of the to-be-photographed area. A picture is automatically complemented from the first preview image in the other direction.

S403. The mobile phone 100 obtains real-time pose information of the mobile phone 100, where the real-time pose information is used to indicate a real-time motion state and a real-time position of the mobile phone 100.

It should be understood that, after S402, in a process of taking a photo by the user's handheld mobile phone 100, the viewfinder range of the camera may change due to movement of the hand of the user, and the camera cannot collect an image of the target object. Thus, the preview image displayed on the mobile phone 100 does not include the image of the target object. That is, the image of the target object cannot or cannot be completely displayed on the preview interface of the mobile phone 100.

Based on this, in this embodiment of this application, the mobile phone 100 may detect a state and a position of the mobile phone 100 by using a gyroscope sensor and an acceleration sensor. When the state and the position of the mobile phone 100 greatly change compared with the initial position and the initial state, the mobile phone 100 may prompt, in real time on the display screen, the user to correct the state and the position of the mobile phone 100 in a timely manner, so that the mobile phone 100 can collect a complete image of the target object, and further display the complete image of the target object on the preview interface.

The real-time state information of the mobile phone 100 is used to indicate a real-time motion state of the mobile phone 100. The real-time position information of the mobile phone 100 is used to indicate a real-time position of the mobile phone 100. The mobile phone 100 includes the gyroscope sensor and the acceleration sensor. The mobile phone 100 may obtain state information (that is, the real-time state information) and position information (that is, the real-time position information) of the mobile phone 100 in real time by using the gyroscope sensor and the acceleration sensor. For example, the gyroscope sensor may be a three-axis gyroscope, and is configured to track a state change of the mobile phone 100 in six directions. The acceleration sensor is configured to detect a motion speed, a direction, and a displacement of the mobile phone 100.

S404. The mobile phone 100 sends first prompt information based on the real-time pose information and the initial pose information. The first prompt information is used to prompt the user to move the mobile phone 100, so that the mobile phone 100 is in the motion state and at the position indicated by the initial pose information.

For example, it is assumed that the initial pose information indicates that the initial motion state of the mobile phone 100 is an initial state W0, and the initial position of the mobile phone 100 is an initial position S0. The real-time pose information indicates that the motion state of the mobile phone 100 is a real-time state W1, and the real-time position of the mobile phone 100 is a real-time position S1. The mobile phone 100 may compare the real-time state W1 with the initial state W0, compare the real-time position S1 with the initial position S0, and determine how the mobile phone 100 can move back to the initial state W0 and the initial position S0. Then, the mobile phone 100 may send the first prompt information to prompt the user to move the mobile phone 100, so that the mobile phone 100 is in the motion state and at the position indicated by the initial pose information. In some embodiments, the first prompt information sent by the mobile phone may be voice prompt information. In some other embodiments, the mobile phone may display the first prompt information on the second interface. In this embodiment of this application, an example in which the electronic device displays the first prompt information on the second interface is used to describe the method in this embodiment of this application.

Figure 9:
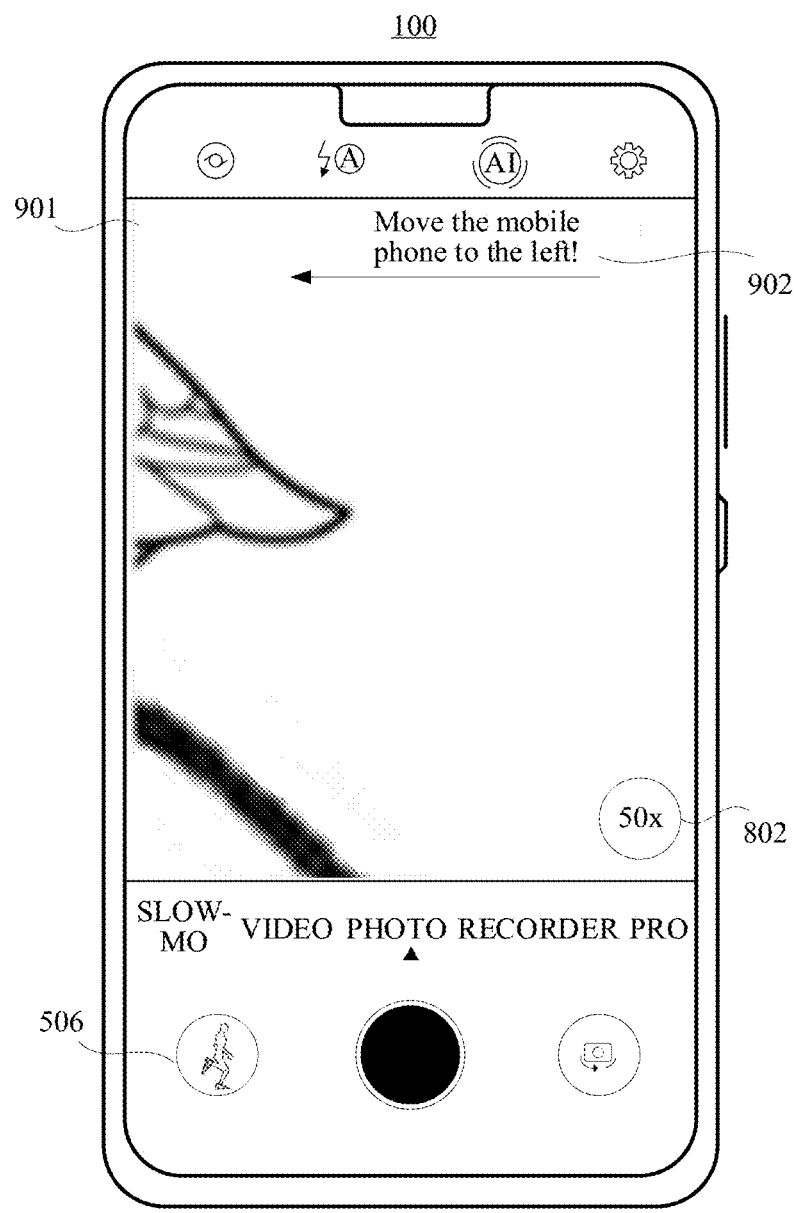
FIG. 9 is a schematic diagram of a display interface of another electronic device according to an embodiment of this application.

For example, it is assumed that the user moves the mobile phone 100 to the right in a process of photographing the target object "bird" by using the mobile phone 100. In this case, the mobile phone 100 may detect, by using the gyroscope sensor and the acceleration sensor, that the mobile phone 100 moves to the right. In this case, the mobile phone 100 may display a second interface 901 shown in FIG. 9, and the second interface 901 includes only a part of an image of the target object "bird". The second interface 901 further displays first prompt information 902, such as "Move the mobile phone to the right!".

Figure 10:
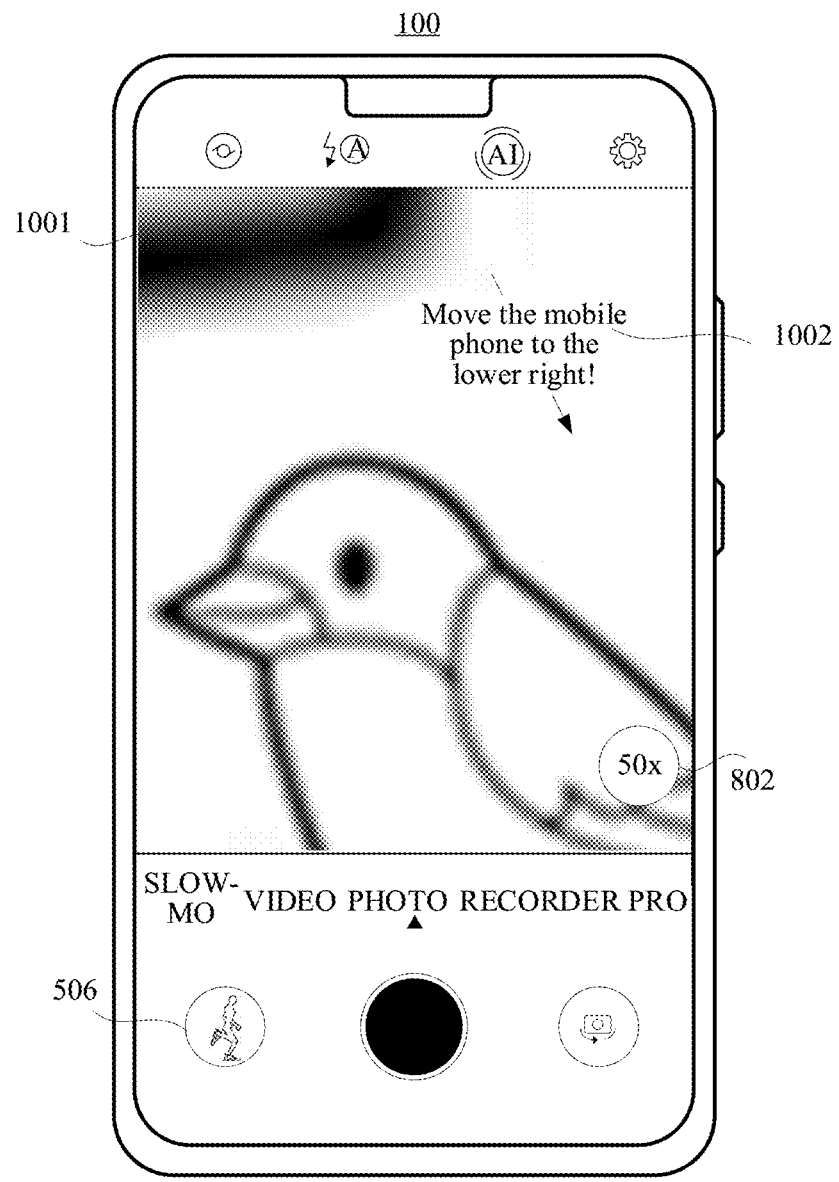
FIG. 10 is a flowchart of a high-magnification photographing method according to an embodiment of this application.

For another example, it is assumed that the user moves the mobile phone 100 to the upper left in a process of photographing the target object "bird" by using the mobile phone 100. In this case, the mobile phone 100 may detect, by using the gyroscope sensor and the acceleration sensor, that the mobile phone 100 moves to the upper left. In this case, the mobile phone 100 may display a second interface 1001 shown in FIG. 10, and the second interface 1001 includes only a part of an image of the target object "bird". The second interface 1001 may further display first prompt information 1002, for example, "Move the mobile phone to the lower right!".

For another example, it is assumed that the user rotates the mobile phone 100 counterclockwise in a process of photographing the target object "bird" by using the mobile phone 100. In this case, the mobile phone 100 may detect, by using the gyroscope sensor and the acceleration sensor, that the mobile phone 100 rotates counterclockwise. In this case, the mobile phone 100 may send first prompt information that is used to prompt the user to clockwise rotate the mobile phone 100.

In some other embodiments, the first prompt information may prompt the user to move the mobile phone 100 in a text and a moving identifier manner, so that the mobile phone 100 is in the motion state and at the position indicated by the initial pose information.

Figures 2, 11:
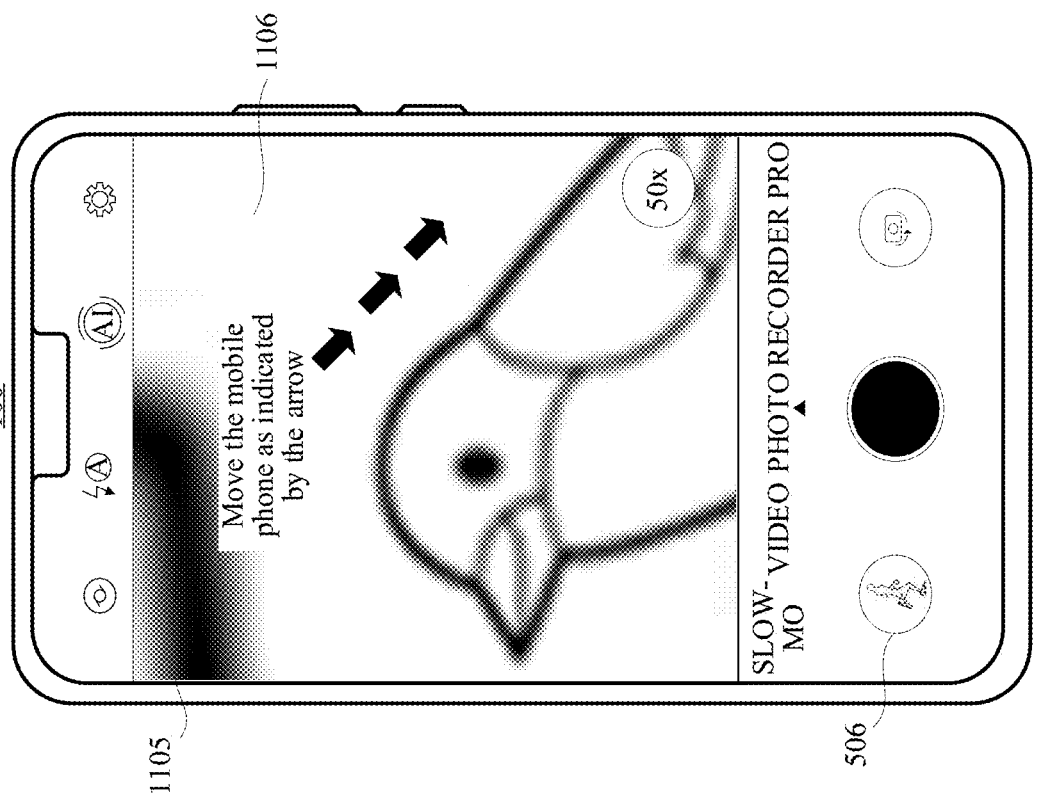

For example, the mobile phone 100 may display a second interface 1101 shown in (a) of FIG. 11-1, and the second interface 1101 includes first prompt information 1102. For another example, the mobile phone 100 may display a second interface 1103 shown in (b) of FIG. 11-1, and the second interface 1103 may display first prompt information 1104. For another example, the mobile phone 100 may display a second interface 1105 shown in (c) of FIG. 11-2, and the second interface 1105 includes first prompt information 1106. The first prompt information 1102, the first prompt information 1104, and the first prompt information 1106 all include a text "Move the mobile phone in an arrow indication direction" and a moving icon (for example, a direction indication arrow).

It should be understood that, after the user moves the mobile phone 100 as prompted by the first prompt information, the real-time pose (that is, the real-time state and the real-time position) of the mobile phone 100 may return to the initial pose (that is, the initial state and the initial position). In this way, the mobile phone 100 may display, on the viewfinder interface, a relatively complete image that includes the target object collected by the camera when the zoom ratio is n. For example, the mobile phone 100 may display a preview interface 1201 shown in FIG. 12.

In some other embodiments, the mobile phone 100 may send fourth prompt information when the mobile phone 100 returns to the motion state and position indicated by the initial pose information. The fourth prompt information is used to prompt the user to stop the mobile phone 100 and start photographing. For example, the mobile phone 100 may send fourth prompt information 1202 shown in FIG. 12, for example, "Keep the mobile phone still, and tap the photographing shutter to take a photo". It should be noted that the fourth prompt information is optional.

In some embodiments, that "the mobile phone 100 is in the motion state and at the position indicated by the initial pose information" described in S404 may be specifically: A difference between the motion state indicated by the real-time pose information of the mobile phone 100 and the motion state indicated by the initial pose information is less than a first difference threshold; and a difference between the position indicated by the real-time pose information of the mobile phone 100 and the position indicated by the initial pose information is less than a second difference threshold.

S405. The mobile phone 100 displays, in response to a photographing operation performed by the user, a third interface including a third preview image and a fourth preview image. The third preview image is an image with a highest image parameter in a plurality of frames of second preview images collected by the camera, and the fourth preview image is an image photographed in response to a photographing operation.

In a process in which the mobile phone 100 performs S402 to the mobile phone 100 receives the photographing operation described in S405, the camera of the mobile phone 100 may collect a plurality of preview images. The third preview image may be a preview image with highest definition and highest integrity that is collected by the camera of the mobile phone 100 in the process in which the mobile phone 100 performs S402 to the mobile phone 100 receives the photographing operation in S405. The integrity of the third preview image may be a proportion of the image of the target object included in the third preview image in a complete image of the target object.

For example, after the user locks and magnifies the to-be-photographed area, a preview image may be buffered at an interval of a first preset period, a preview image buffered for the first time is compared with a preview image buffered for the second time, and a preview image with a higher image parameter is retained. Then, the preview image with higher definition is compared with a preview image buffered next time, and a photo with higher definition is still retained. By analogy, a cache of the mobile phone 100 always stores a highest preview image.

Specifically, in the process in which the mobile phone 100 performs S402 to the mobile phone 100 receives the photographing operation in S405, the mobile phone 100 may periodically buffer, based on a preset period (for example, a first preset period), a second preview image collected by the camera at that time. The mobile phone 100 buffers a second preview image i in an ith first preset period. After the mobile phone 100 buffers the second preview image i in the ith first preset period, the mobile phone may compare the second preview image i with an (i−1)th seventh preview image to obtain and buffer an ith seventh preview image. The ith seventh preview image is a preview image with a higher image parameter in the second preview image i and the (i−1)th seventh preview image. The image parameter includes definition and/or integrity. The integrity of the preview image may be a proportion of the image of the target object included in the preview image in a complete image of the target object. It is assumed that when the mobile phone 100 receives the photographing operation, the mobile phone 100 obtains a pth seventh preview image, and the pth seventh preview image is the third preview image. Certainly, the mobile phone 100 may further delete a preview image with a relatively low image parameter. i is an integer, i is successively obtained from $\{2, \ldots, p\}$ in ascending order, $p \geq 2$, and p is an integer.

When i=1, the ith seventh preview image is a second preview image 1 obtained in the first preset period by the mobile phone 100.

When i≥2, the ith seventh preview image is a preview image with a higher image parameter in the second preview image i and the (i−1)th seventh preview image. For example, a time length of the first preset period may be any one of 0.5 second (s) or 1s.

For example, assuming p=5, and the first preset period is 0.5 s, that is, starting from S402 performed by the mobile phone 100, in a time period from 2.5 s to 3.0 s, the mobile phone 100 receives the photographing operation in the S405. The following describes a specific process of determining the third preview image by the mobile phone 100 in this example.

(1) The mobile phone 100 buffers a second preview image 1 in the 1st first preset period, that is, i=1. As shown in Table 1, the first seventh preview image is the second preview image 1.

(2) The mobile phone 100 buffers a second preview image 2 in the 2nd first preset period, that is, i=2. The mobile phone 100 may compare the second preview image 2 with the first seventh preview image (that is, the second preview image 1) to obtain the second seventh preview image. Because an image parameter (such as integrity) of the second preview image 2 is higher than an image parameter of the first seventh preview image (that is, the second preview image 1), as shown in Table 1, the second seventh preview image is the second preview image 2.

(3) The mobile phone 100 buffers a second preview image 3 in the 3rd first preset period, that is, i=3. The mobile phone 100 may compare the second preview image 3 with the second seventh preview image (that is, the second preview image 2) to obtain the third seventh preview image. Because an image parameter (for example, integrity) of the second seventh preview image (that is, the second preview image 2) is higher than an image parameter of the second preview image 3, as shown in Table 1, the third seventh preview image is the second preview image 2.

(4) The mobile phone 100 buffers a second preview image 4 in the 4th first preset period, that is, i=4. The mobile phone 100 may compare the second preview image 4 with the third seventh preview image (that is, the second preview image 2) to obtain the fourth seventh preview image. Because an image parameter of the second preview image 4 is higher than an image parameter (such as integrity) of the third seventh preview image (that is, the second preview image 2), as shown in Table 1, the fourth seventh preview image is the second preview image 4.

(5) The mobile phone 100 buffers a second preview image 5 in the 5th first preset period, that is, i=5. The mobile phone 100 may compare the second preview image 5 with the fourth seventh preview image (that is, the second preview image 4) to obtain the fifth seventh preview image. Because an image parameter (for example, integrity) of the fourth seventh preview image (that is, the second preview image 4) is higher than an image parameter of the second preview image 5, as shown in Table 1, the fifth seventh preview image is the second preview image 4.

Therefore, the pth seventh preview image (that is, the fifth seventh preview image, that is, the second preview image 4) is the third preview image.

TABLE 1

| i | (i − 1)th seventh preview image | Second preview image i | ith seventh preview image |
|---|---|---|---|
| i = 1 | Second preview image 1 | Second preview image 1 | Second preview image 1 |
| i = 2 | Second preview image 1 | Second preview image 2 | Second preview image 2 |
| i = 3 | Second preview image 2 | Second preview image 3 | Second preview image 2 |
| i = 4 | Second preview image 2 | Second preview image 4 | Second preview image 4 |
| i = 5 | Second preview image 4 | Second preview image 5 | Second preview image 4 |

In this embodiment, the mobile phone 100 may always buffer a preview image with a relatively high image parameter as the third preview image. In this way, the mobile phone 100 may simultaneously present a fourth preview image and a third preview image with a highest image parameter for the user on the third interface. In this way, a high-quality photo can be taken and selected by the user.

It should be understood that the mobile phone 100 may receive a photographing operation of the user when the real-time pose information is equal to or close to the initial pose information. For example, the mobile phone 100 may receive the photographing operation shown in FIG. 12, such as a tap operation performed by the user on the "photographing shutter".

Generally, in response to the photographing operation performed by the user, the mobile phone 100 may save a preview image collected by the camera in real time. For example, in response to the photographing operation shown in FIG. 12, the mobile phone 100 may display a preview interface shown in FIG. 13. Compared with FIG. 12, an album key in the preview interface is updated from the album key 506 to an album key 1302. The album key 1302 displays a preview image in the preview interface shown in FIG. 12. That is, the mobile phone 100 has saved a preview image corresponding to the mobile phone 100.

However, in this embodiment of this application, the mobile phone 100 does not directly save a preview image, but displays the third interface that includes the third preview image and the fourth preview image. The user selects any preview image in the third interface to save. In this way, it can be ensured that the mobile phone 100 can save a preview image desired by the user.

Figure 12:
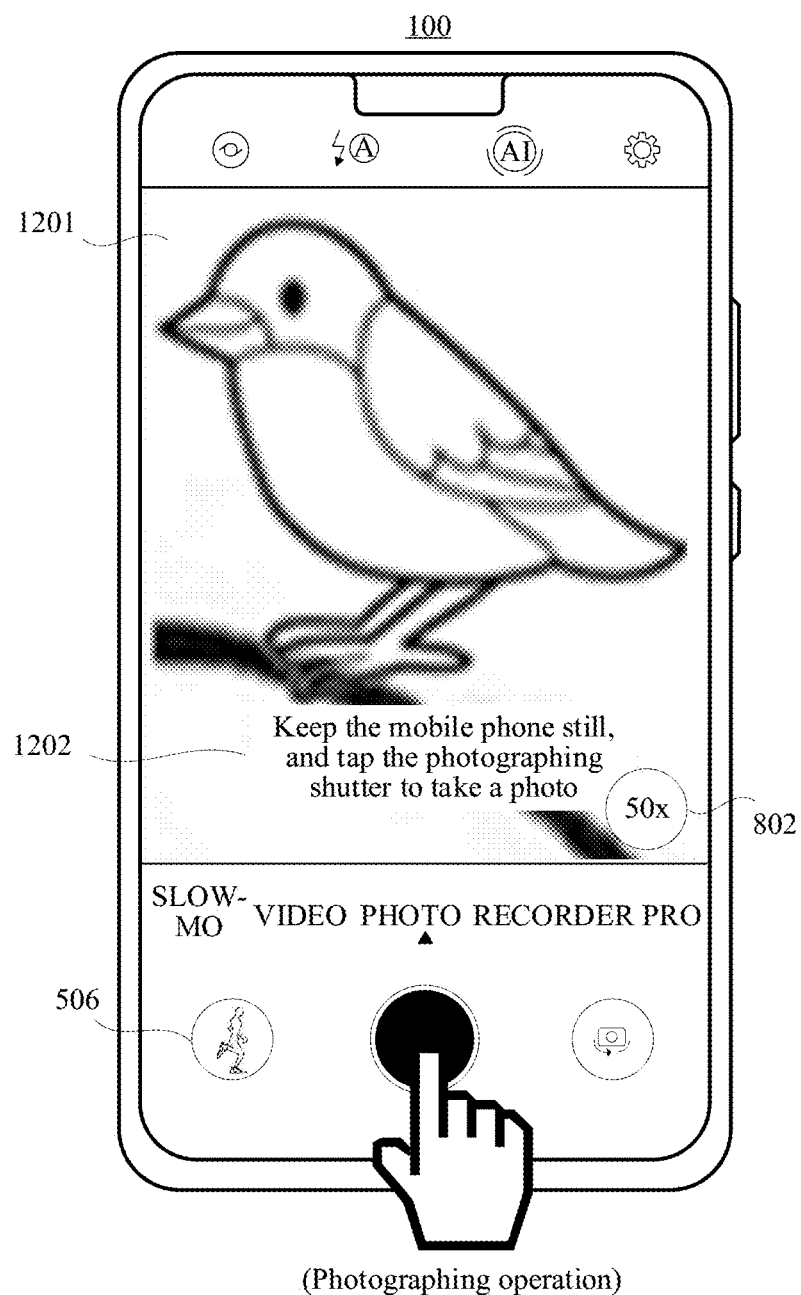
FIG. 12 is a schematic diagram of a display interface of another electronic device according to an embodiment of this application.
Figure 13:
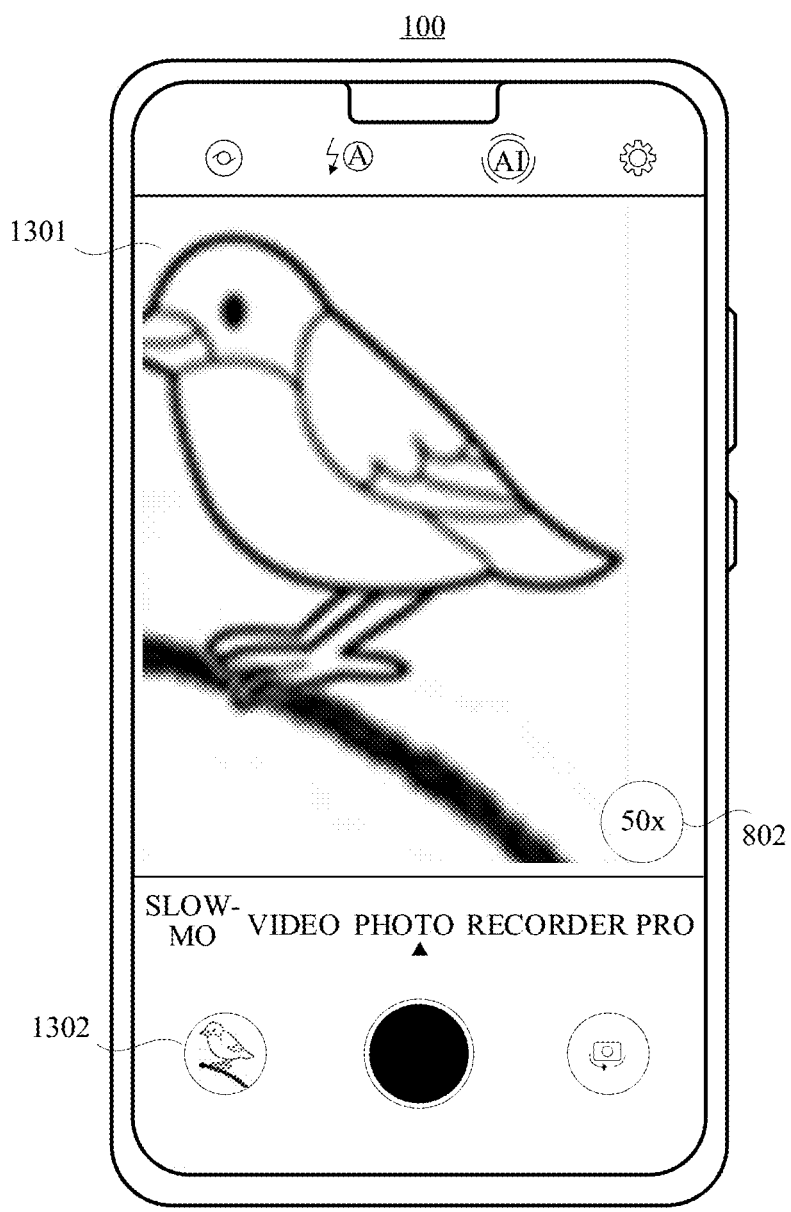
FIG. 13 is a schematic diagram of a display interface of another electronic device according to an embodiment of this application.
Figure 14:
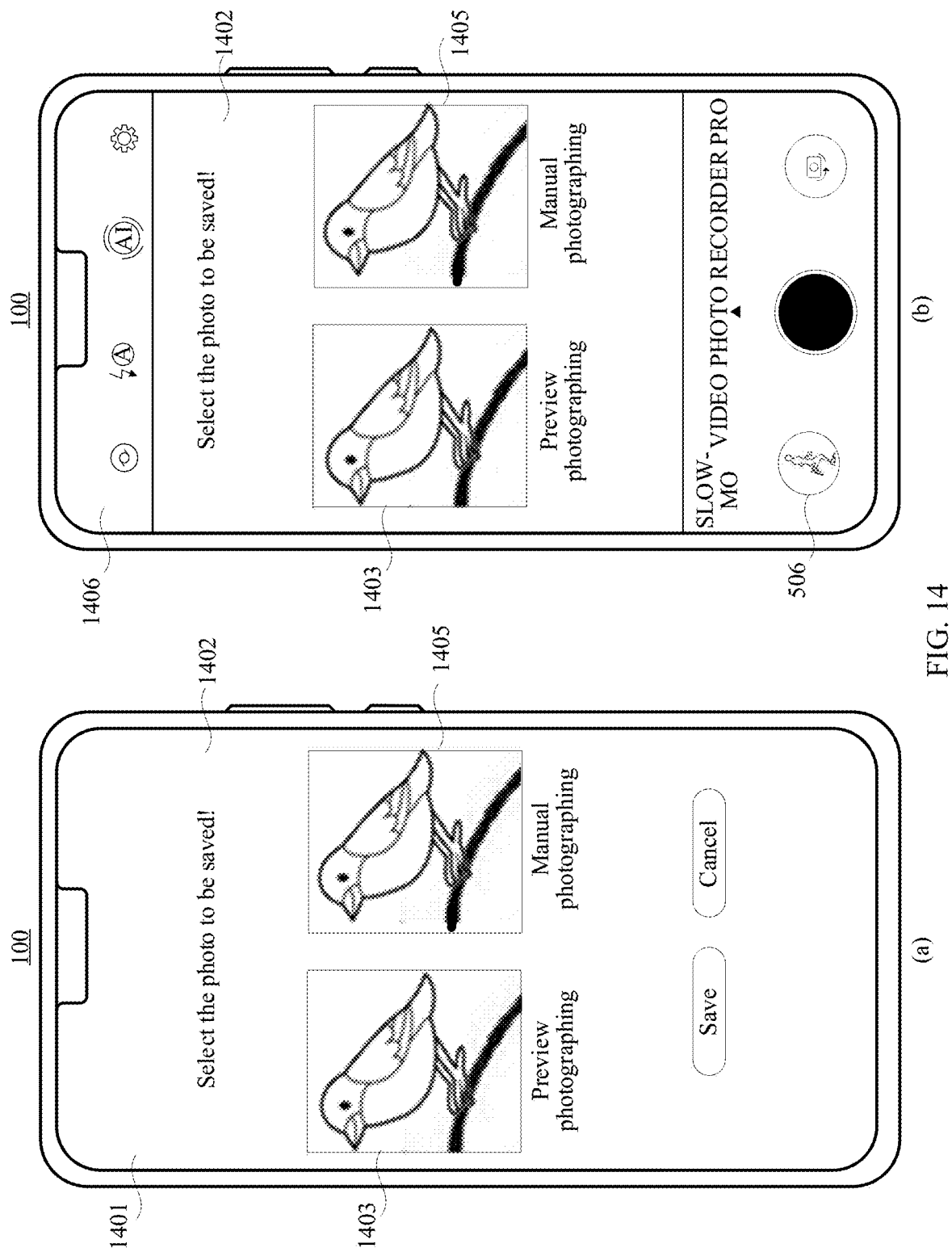
FIG. 14 is a schematic diagram of a display interface of another electronic device according to an embodiment of this application.
Figure 15:
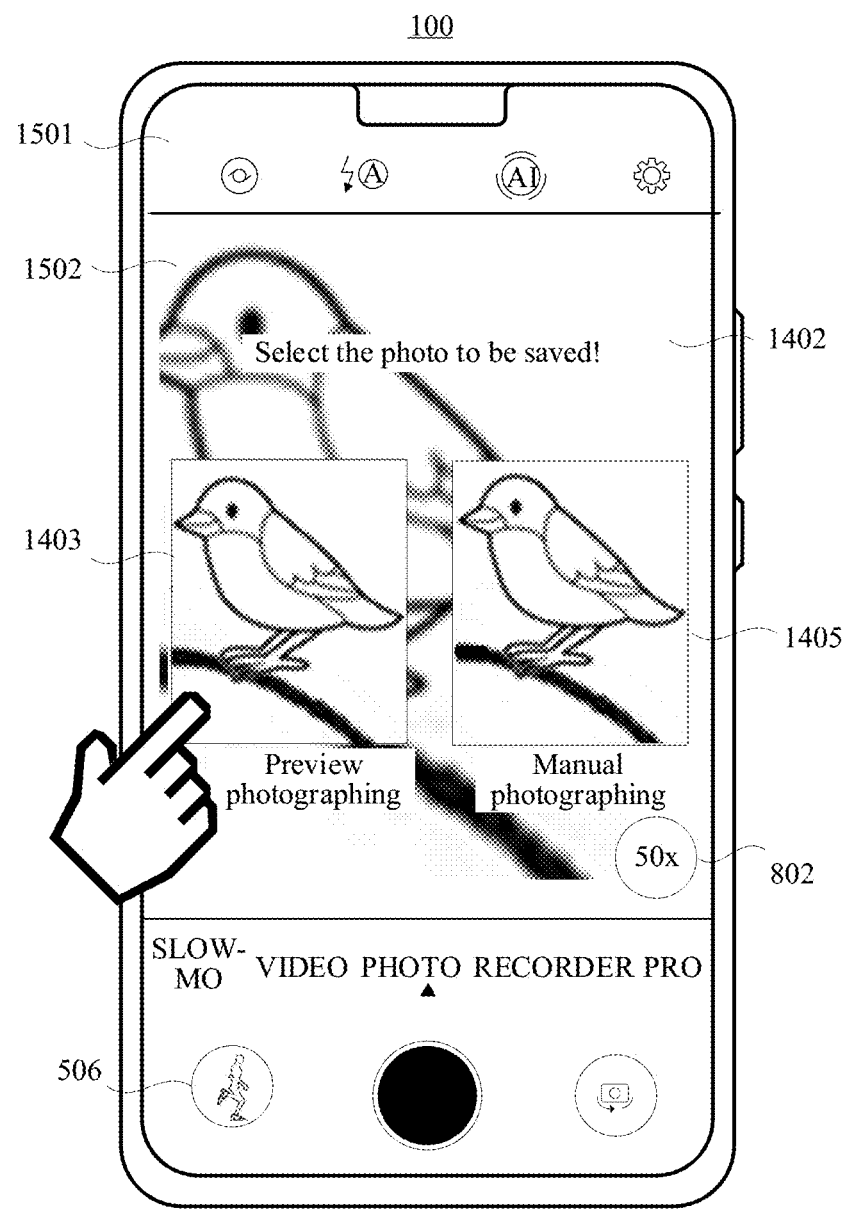
FIG. 15 is a schematic diagram of a display interface of another electronic device according to an embodiment of this application.

For example, in response to the photographing operation shown in FIG. 12, the mobile phone 100 may display a third interface 1401 shown in (a) of FIG. 14, a third interface 1406 shown in (b) of FIG. 14, or a third interface 1501 shown in FIG. 15. The third interface 1401, the third interface 1406, and the third interface 1501 each include a third preview image 1403 and a fourth preview image 1405. The third interface 1401, the third interface 1406, and the third interface 1501 are further used to prompt the user to select a photo to be saved. For example, the third interface 1401, the third interface 1406, and the third interface 1501 further include prompt information 1402, for example, "Select a photo that needs to be saved!".

It should be noted that, compared with the third interface 1401, the third interface 1406 and the third interface 1501 display the third preview image 1403 and the fourth preview image 1405 on the preview interface of the photographing photo of the mobile phone 100. It may be learned from comparison between the third interface 1406 and the third interface 1501 that the third interface 1406 does not display the preview image collected in real time by the camera, and the third interface 1501 displays the preview image 1502 collected in real time by the camera. The third interface 1406 and the third interface 1501 further include the album key 506. It may be learned from the album key 506 shown in (b) of FIG. 14 or FIG. 15 that the mobile phone 100 does not save a new photo in response to the photographing operation.

S406. The mobile phone 100 saves a preview image selected by the user in response to the user's selection of the third preview image and/or the fourth preview image in the third interface.

The mobile phone 100 may receive a selection operation performed by the user on at least one of the third preview image and the fourth preview image in the third interface. In response to the selection operation of the user, the mobile phone 100 may save the preview image selected by the user. For example, as shown in FIG. 15, the mobile phone 100 may receive the selection operation performed by the user on the third preview image 1403. In response to the selection operation performed by the user on the third preview image 1403 shown in FIG. 15, the mobile phone 100 may display the preview interface shown in FIG. 13.

An embodiment of this application provides a high-magnification photographing method. The mobile phone 100 may automatically lock, in a high-magnification photographing scenario, a photographing object that requires high-magnification photographing in response to an operation performed by a user. Then, the mobile phone 100 may collect and display a preview image (referred to as an initial preview image) of the photographing object by using a proper zoom ratio, and obtain an initial state and an initial position of the mobile phone 100. In this way, it is unnecessary for the user to manually adjust the zoom ratio, so that jitter caused by the user's manual operation can be reduced.

Then, the mobile phone 100 may obtain the real-time state and the real-time position of the mobile phone 100, and prompt, based on the real-time state and the real-time position, the user to correct the position and pose of the mobile phone 100, so that the mobile phone 100 can be maintained in the initial state and at the initial position or in a state near the initial state and initial position. In this case, the photographing object locked by the mobile phone 100 is an object to be photographed by the user. That is, when the photographing area of the camera deviates from the photographing area corresponding to the initial preview image, the mobile phone 100 may prompt the user to correct the position and the pose of the mobile phone 100, so that the mobile phone 100 can maintain the position and the pose indicated by the initial state and the initial position, thereby ensuring that the mobile phone 100 can photograph a photographing object desired by the user.

Finally, the mobile phone 100 simultaneously displays, in response to the photographing operation performed by the user, the initial preview image and a preview image manually photographed by the user, and the user selects a desired photo to save. In this way, the mobile phone 100 may take a photo that is satisfactory to the user according to a requirement of the user.

Figure 16A:
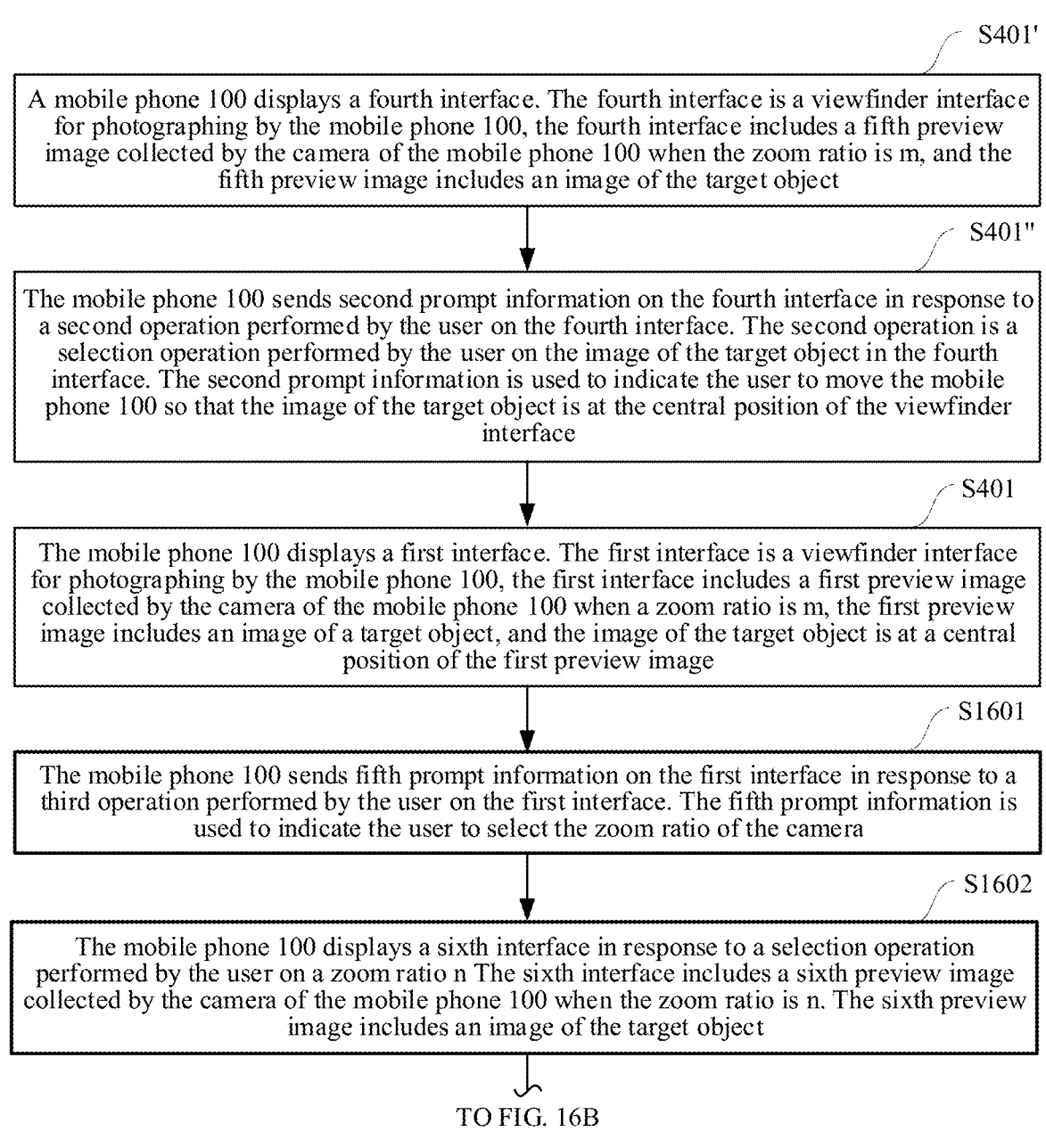
FIG. 16A and FIG. 16B are a flowchart of a high-magnification photographing method according to an embodiment of this application.
Figure 16B:
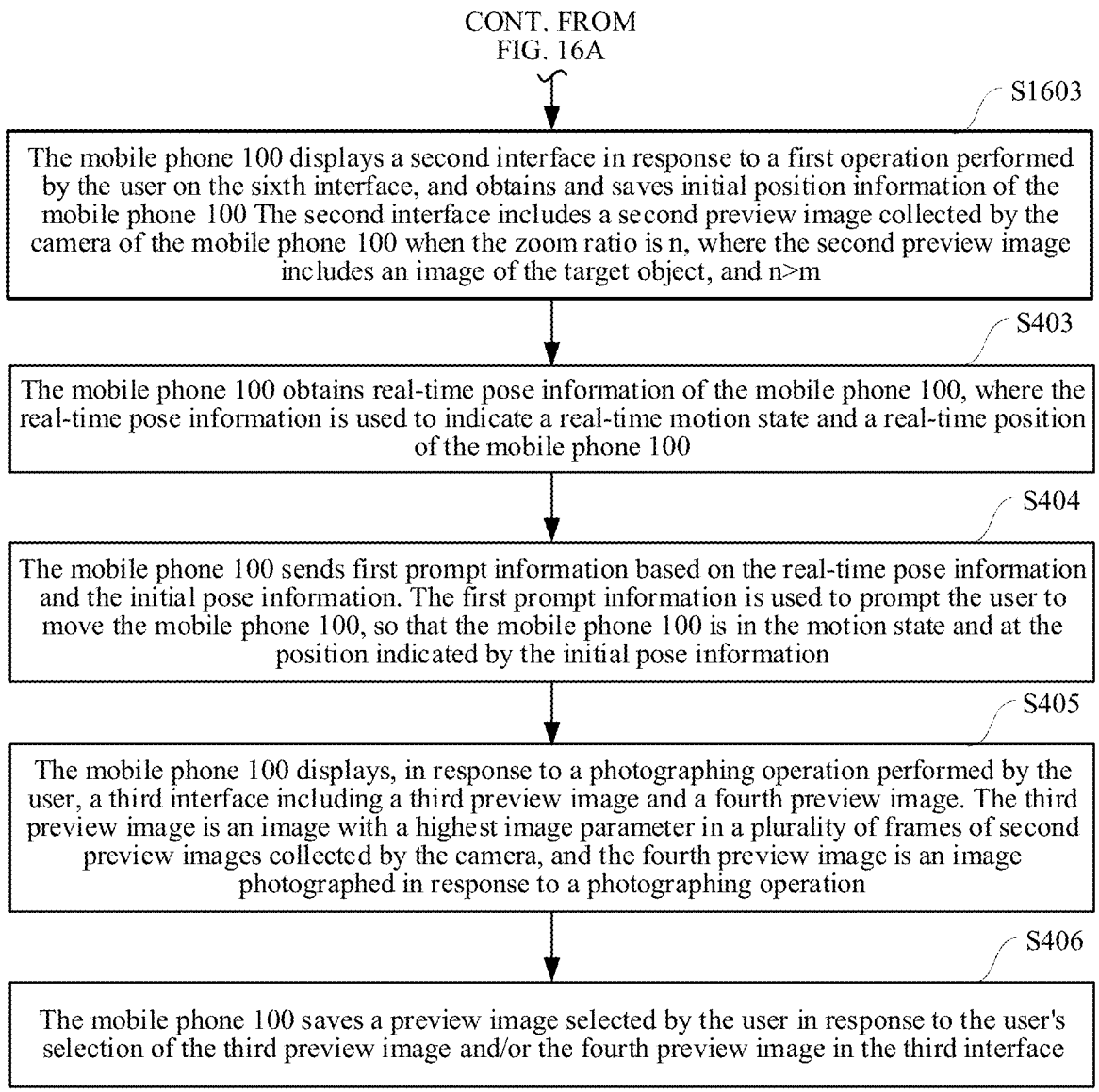

In some embodiments, the zoom ratio n may be a zoom ratio selected by the user. Specifically, as shown in FIG. 16A and FIG. 16B, after S401, the method in this embodiment of this application may further include S1601-S1602, and S402 may be replaced with S1603.

S1601. The mobile phone 100 sends fifth prompt information on the first interface in response to a third operation performed by the user on the first interface. The fifth prompt information is used to indicate the user to select the zoom ratio of the camera.

For example, the third operation may be a long press operation. The third operation may be a long press operation performed by the user on the image of the target object, or may be a long press operation performed by the user on any position of the first preview image. The third operation and the second operation may be different, or may be the same. In this embodiment, when the mobile phone 100 first receives the long press operation performed by the user on the first preview image, S402 may not be performed, but S1601 is performed.

Figure 17B:
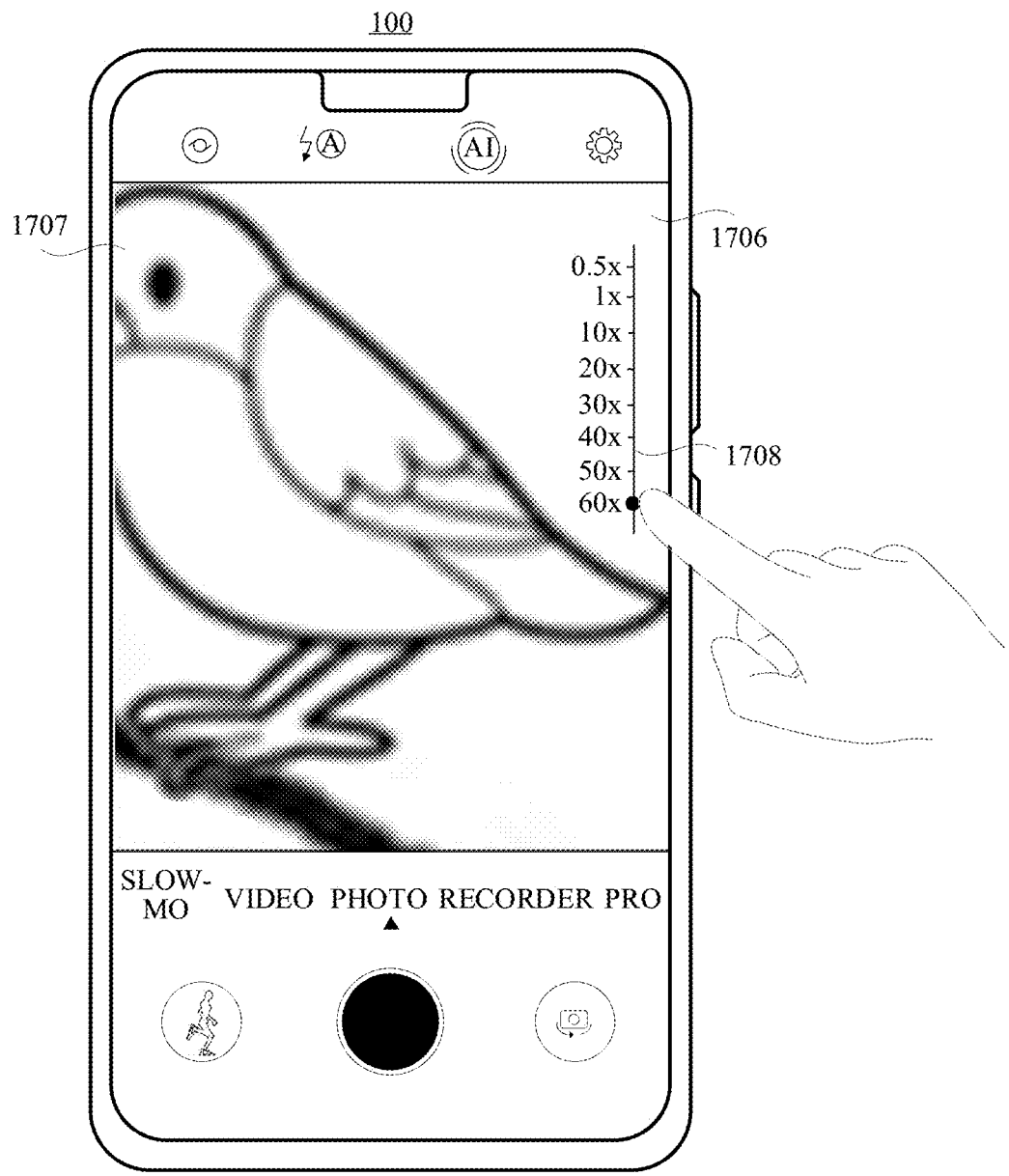
FIG. 17B is a schematic diagram of a display interface of another electronic device according to an embodiment of this application.

For example, the mobile phone 100 may display a first interface 1701 shown in (a) of FIG. 17A-1, and the first interface 1701 includes a first preview image 1702. The mobile phone 100 may receive the third operation (such as a long press operation) of the user on the first interface 1701. In response to the third operation performed by the user on the first interface 1701, the mobile phone 100 may send fifth prompt information 1703 shown in (b) of FIG. 17A-1. The fifth prompt information 1703 may include a plurality of zoom ratio options, such as a "2×" option, an "8×" option, a "10×" option, a "20×" option, a "30×" option, and a "50×" option.

S1602. The mobile phone 100 displays a sixth interface in response to a selection operation performed by the user on a zoom ratio n. The sixth interface includes a sixth preview image collected by the camera of the mobile phone 100 when the zoom ratio is n. The sixth preview image includes an image of the target object.

For example, the zoom ratio n is 50×. As shown in (b) of FIG. 17A-1, the mobile phone 100 may receive the user's selection operation for the "50×" option. In response to the user's selection operation on the "50×" option, the mobile phone 100 may display a sixth interface 1704 shown in (c) of FIG. 17A-2. The sixth interface 1704 includes a sixth preview image 1705 collected by the camera of the mobile phone 100 when the zoom ratio is 50×. The sixth preview image 1705 includes an image of the target object "bird".

S1603. The mobile phone 100 displays a second interface in response to a first operation performed by the user on the sixth interface, and obtains and saves initial position information of the mobile phone 100. The second interface includes a second preview image collected by the camera of the mobile phone 100 when the zoom ratio is n, where the second preview image includes an image of the target object, and n>m.

For example, the mobile phone 100 may receive the first operation of the user on the sixth interface 1705. For detailed description of S1603, refer to the introduction to S402 in the foregoing embodiment. Details are not described herein again in this embodiment of this application.

In this embodiment, the mobile phone 100 may zoom in two phases to lock the to-be-photographed area. Specifically, in response to the first long press operation performed by the user on the first interface, the mobile phone 100 may prompt the user to select a proper zoom ratio. In response to the second long press operation of the user, the mobile phone 100 may magnify the preview image by using the zoom ratio selected by the user, and lock the to-be-photographed area that includes the image of the target object.

In some embodiments, although the mobile phone may receive the user's selection operation for the zoom ratio, the zoom ratio selected by the user may not be proper. For example, it is assumed that the user selects the zoom ratio 60× shown in (b) of FIG. 17A-1. The mobile phone may display a sixth interface 1706 shown in FIG. 17B in response to the user's selection operation on the zoom ratio 60× shown in (b) of FIG. 17A-1. The sixth interface 1706 includes a sixth preview image 1707. The sixth preview image 1707 shown in FIG. 17B does not include a complete image of the target object. In this case, the mobile phone further needs to adjust the zoom ratio, so that the camera can collect a complete image of the target object. Therefore, the sixth interface may further include a preset adjustment control, for example, a preset adjustment control 1708 shown in FIG. 17B. The preset adjustment control 1708 is configured to adjust the zoom ratio of the camera. The preset adjustment control 1708 is further configured to indicate that a current zoom ratio of the camera is 60×.

Figure 17C:
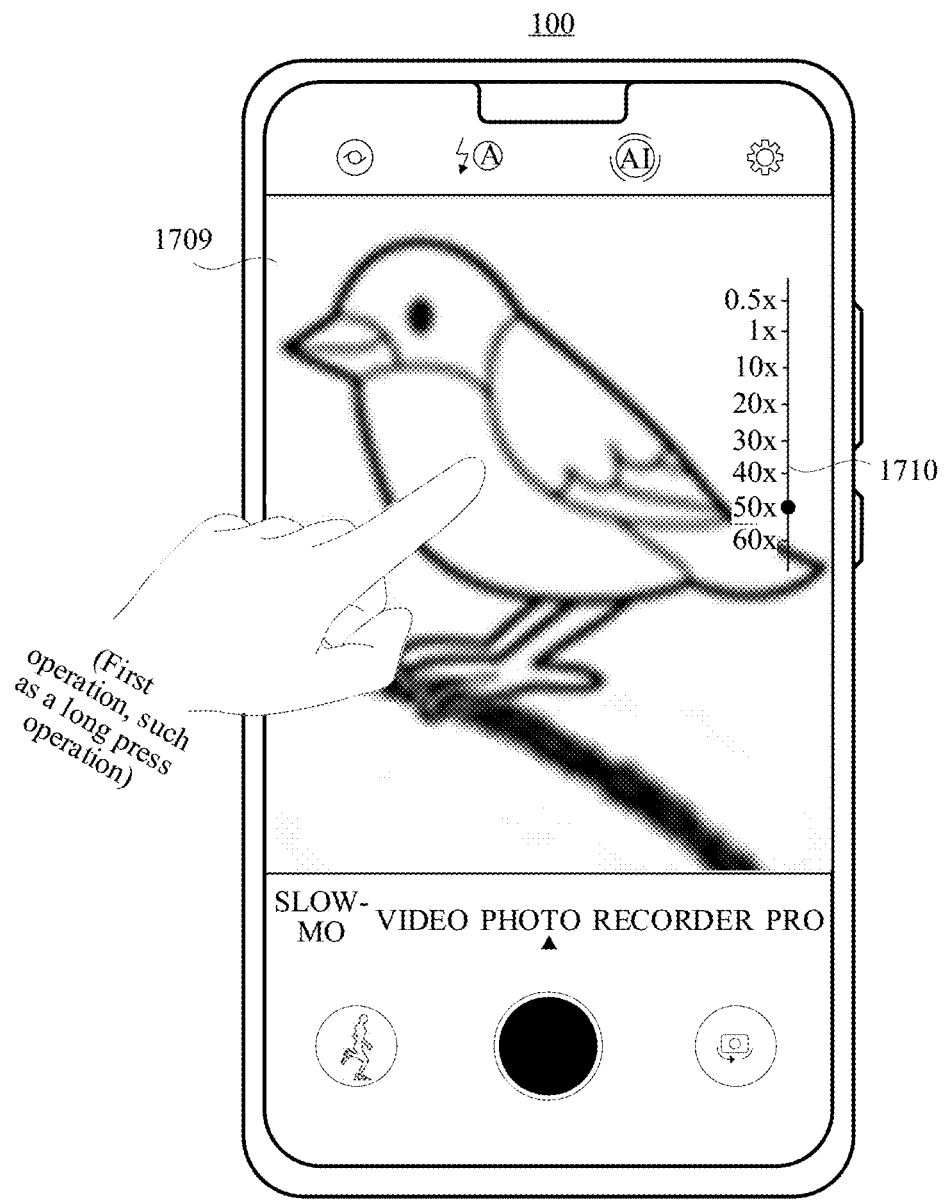
FIG. 17C is a schematic diagram of a display interface of another electronic device according to an embodiment of this application.

For example, after the zoom ratio is adjusted from 60× to 50× in response to the user's upward slide operation on the preset adjustment control 1708, the mobile phone may display a sixth interface 1709 shown in FIG. 17C. The sixth interface 1709 includes a preset adjustment control 1710, and the preset adjustment control 1710 is configured to adjust the zoom ratio of the camera. The preset adjustment control 1708 is further configured to indicate that the current zoom ratio of the camera is 50×. The mobile phone 100 may receive a first operation performed by the user on the sixth interface 1709.

In some other embodiments, the camera may rotate within a preset angle range. For example, the mobile phone 100 may include an angle adjustment apparatus of the camera, and the angle adjustment apparatus is connected to the processor of the mobile phone 100. The angle adjustment apparatus may include a linkage apparatus (such as a motor) configured to drive the camera to rotate within the preset angle range. The angle adjustment apparatus may receive an angle adjustment instruction from the processor, and drive, according to the angle adjustment instruction, the camera to rotate within the preset angle range. For example, the preset angle range may be a range for implementing 0°-180° adjustment in at least two mutually perpendicular directions. In this embodiment, S401" may be replaced with S401*. That is, the method in this embodiment of this application may include S401', S401*, and S401-S406.

S401*. The mobile phone 100 adjusts a photographing angle of the camera in response to a second operation performed by the user on the sixth interface, so that an image of the target object is at a central position of a viewfinder interface of the mobile phone 100.

For the second operation, refer to the description in the foregoing embodiment. Details are not described herein again. In this embodiment, the mobile phone 100 may further focus the target object in an object (that is, the target object) tracking-based focusing mode, and adjust the photographing angle of the camera, so that the target object is at a central position of a field of view range of the camera. In this way, a preview image in which the image of the target object is at a central position thereof can be collected.

In some other embodiments, the mobile phone 100 may not only automatically adjust the photographing angle of the camera, so that the image of the target object is at the central position of the viewfinder interface of the mobile phone 100. The mobile phone 100 may further automatically zoom, and adjust the zoom ratio of the camera to n. In this embodiment, S401" may be replaced with S401 #, and S401-S402 may be replaced with S402'. That is, the method in this embodiment of this application may include S401', S401 #, S402', and S403-S406.

S401 #. The mobile phone 100 adjusts a photographing angle of the camera in response to a second operation performed by the user on the sixth interface, so that an image of the target object is at a central position of a viewfinder interface of the mobile phone 100, and adjusts the zoom ratio of the camera to n by means of automatic zooming.

For a method for determining the zoom ratio n by the mobile phone 100, refer to the detailed description in the foregoing embodiment. Details are not described herein again. For a specific method in which the mobile phone 100 adjusts the photographing angle of the camera so that the image of the target object is at the central position of the viewfinder interface of the mobile phone 100, and adjusts the zoom ratio of the camera to n by means of automatic zooming, refer to detailed descriptions in a conventional technology. Details are not described herein again.

S402'. The mobile phone 100 displays a second interface, and obtains and saves the initial pose information of the mobile phone 100. The second interface includes a second preview image collected by the camera of the mobile phone 100 when the zoom ratio is n, and the second preview image includes an image of the target object.

It should be noted that for detailed description of S402', refer to related description of S402 in the foregoing embodiment. Details are not described herein again in this embodiment of this application.

In this embodiment, the first operation does not need to be manually entered by the user. After receiving a second operation (for example, a tap operation) performed by the user on the image of the target object, the mobile phone 100 may automatically adjust the photographing angle of the camera so that the image of the target object is at the central position of the viewfinder interface, and automatically zoom to adjust the zoom ratio of the camera to n. In this way, the mobile phone 100 may display the second interface described in S402'. In this way, jitter caused by the user's operation can be reduced, and impact of the user's operation on image quality of a photo taken by the mobile phone 100 can be reduced.

Figure 18:
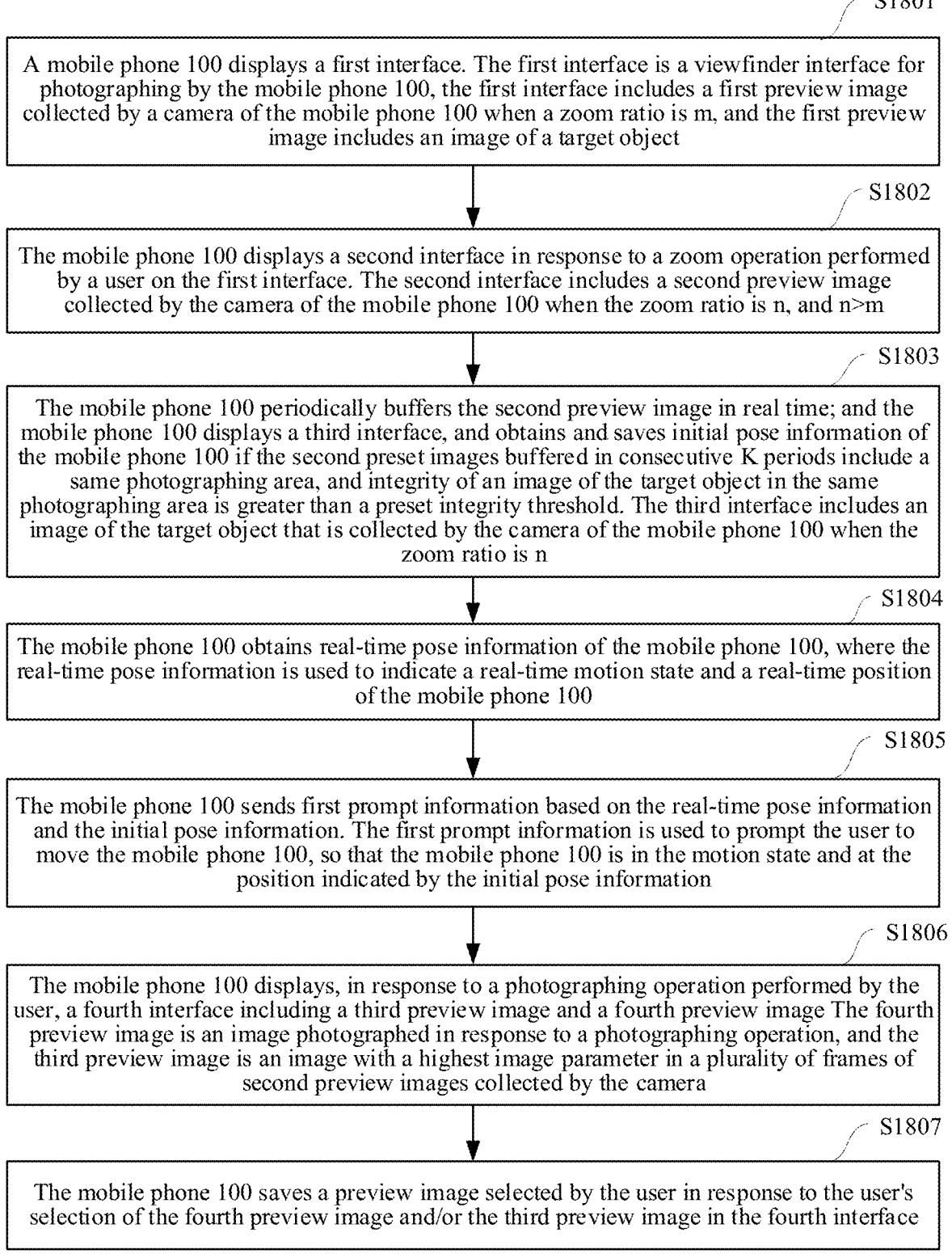
FIG. 18 is a flowchart of a high-magnification photographing method according to an embodiment of this application.

Another embodiment of this application provides a high-magnification photographing method, and the method may be applied to the foregoing electronic device 300. In the following embodiment, that the electronic device 300 is the mobile phone 100 shown in FIG. 1 is used as an example to describe the method in this embodiment of this application. As shown in FIG. 18, the high-magnification photographing method may include S1801-S1807.

S1801. The mobile phone 100 displays a first interface. The first interface is a viewfinder interface for photographing by the mobile phone 100, the first interface includes a first preview image collected by a camera of the mobile phone 100 when a zoom ratio is m, and the first preview image includes an image of a target object.

The first interface of S1801 is equivalent to the fourth interface of S401. For detailed description of S1801, refer to related description of S401" in the foregoing embodiment. Details are not described in this embodiment of this application.

S1802. The mobile phone 100 displays a second interface in response to a zoom operation performed by a user on the first interface. The second interface includes a second preview image collected by the camera of the mobile phone 100 when the zoom ratio is n, and n>m.

For example, the zoom operation is used to trigger the mobile phone 100 to adjust the zoom ratio of the camera, for example, adjust the zoom ratio from m to n. For example, in response to the zoom operation, the mobile phone may enable a long-focus camera, and the long-focus camera may collect an image.

It may be understood that a lens of the camera in the mobile phone 100 is generally a fixed-focus lens, and a focal length adjustable range is very small. When the mobile phone photographs an image, zooming may be implemented by switching cameras of different focal lengths. Alternatively, when the mobile phone photographs an image, zooming may be implemented by adjusting a focal length of the camera.

The zoom operation may be used to trigger a high-magnification camera (such as a long-focus camera) of the mobile phone 100 to collect an image. That is, in response to the zoom operation, a preview camera of the mobile phone may be switched from a low-magnification camera (that is, a camera with a relatively small focal length, for example, a primary camera) to a high-magnification camera (that is, a camera with a relatively large focal length, for example, a long-focus camera). The zoom operation may be used to trigger the mobile phone 100 to enable the long-focus camera, and change the focal length of the camera (such as the long-focus camera) from 1× of the default camera (such as the primary camera) to any optical magnification such as 2×, 3×, 5×, 10×, 15×, or 20× of the default camera (such as the primary camera).

In this embodiment of this application, that the zoom ratio triggered by the zoom operation is 50 times (that is, 50×) is used as an example to describe the method in this embodiment of this application. Certainly, the zoom ratio of the zooming triggered by the zoom operation may also be 10× or other data. A specific value of the zoom ratio is not limited in this embodiment of this application.

The zoom operation may be an operation that is used to control camera zooming of the mobile phone and that is entered on a photographing preview interface when the mobile phone displays the photographing preview interface.

In an application scenario, the image of the target object is at a central position of the first interface. In this application scenario, the zoom operation may be a double-finger pinch out operation that is entered by the user on the first interface by using an image of a target object as a center.

Figure 19A:
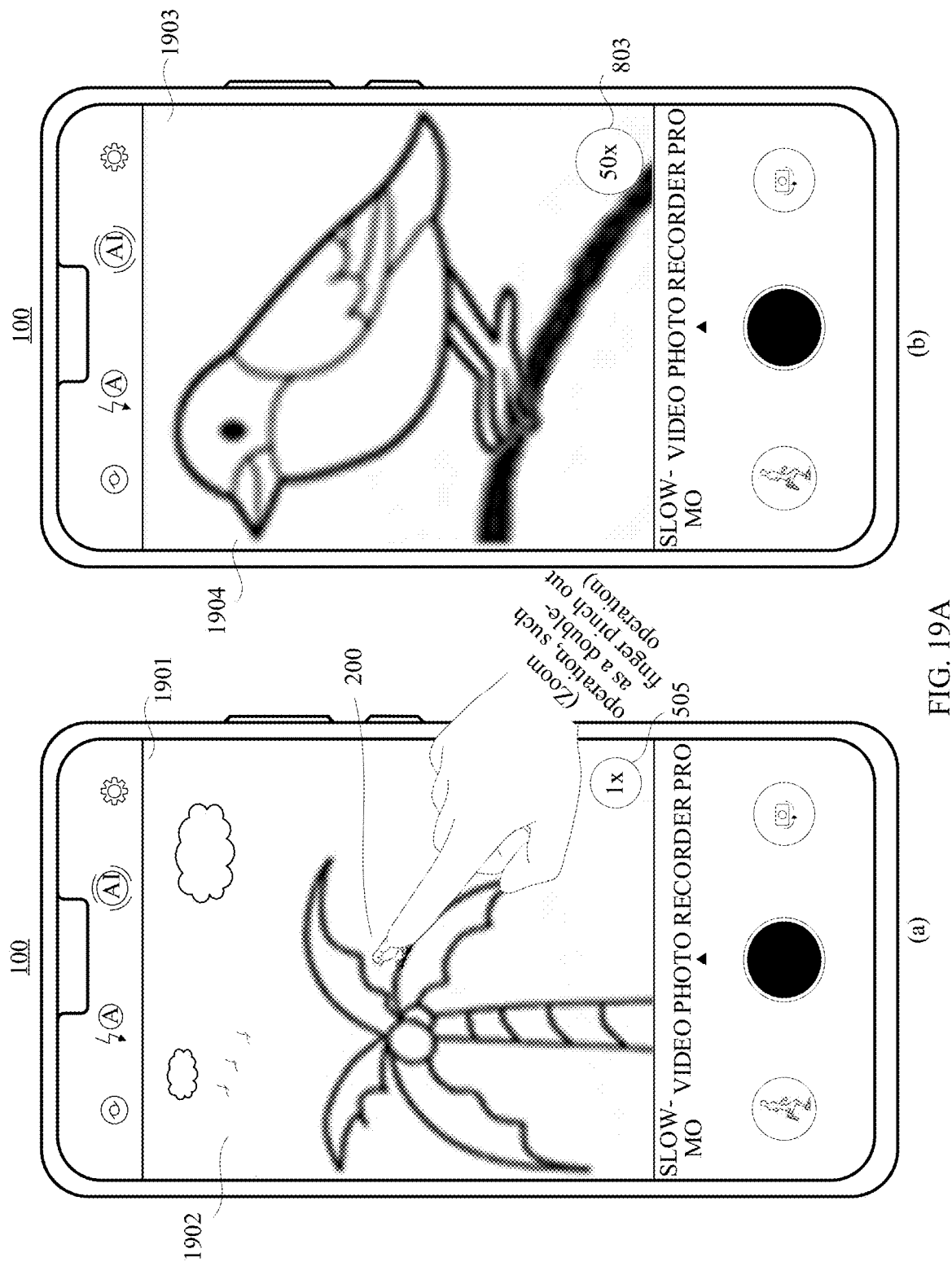
FIG. 19A is a schematic diagram of a display interface of another electronic device according to an embodiment of this application.

For example, the mobile phone 100 may display a first interface 1901 shown in (a) of FIG. 19A. The first interface 1901 includes a first preview image 1902. The first preview image 1902 includes an image of a target object "bird" 200, and the image of the target object "bird" 200 is at a central position of the first preview image 1902.

The mobile phone 100 may receive a zoom operation (for example, two-finger pinch out operation) performed by the user on the image of the target object "bird" 200 shown in (a) of FIG. 19A. In response to the zoom operation, the mobile phone 100 may display a second interface 1903 shown in (b) of FIG. 19A. The second interface 1903 includes a second preview image collected by the camera of the mobile phone 100 when the zoom ratio is 50×, that is, n=50. A value of n is determined based on the zoom operation.

Figure 19B:
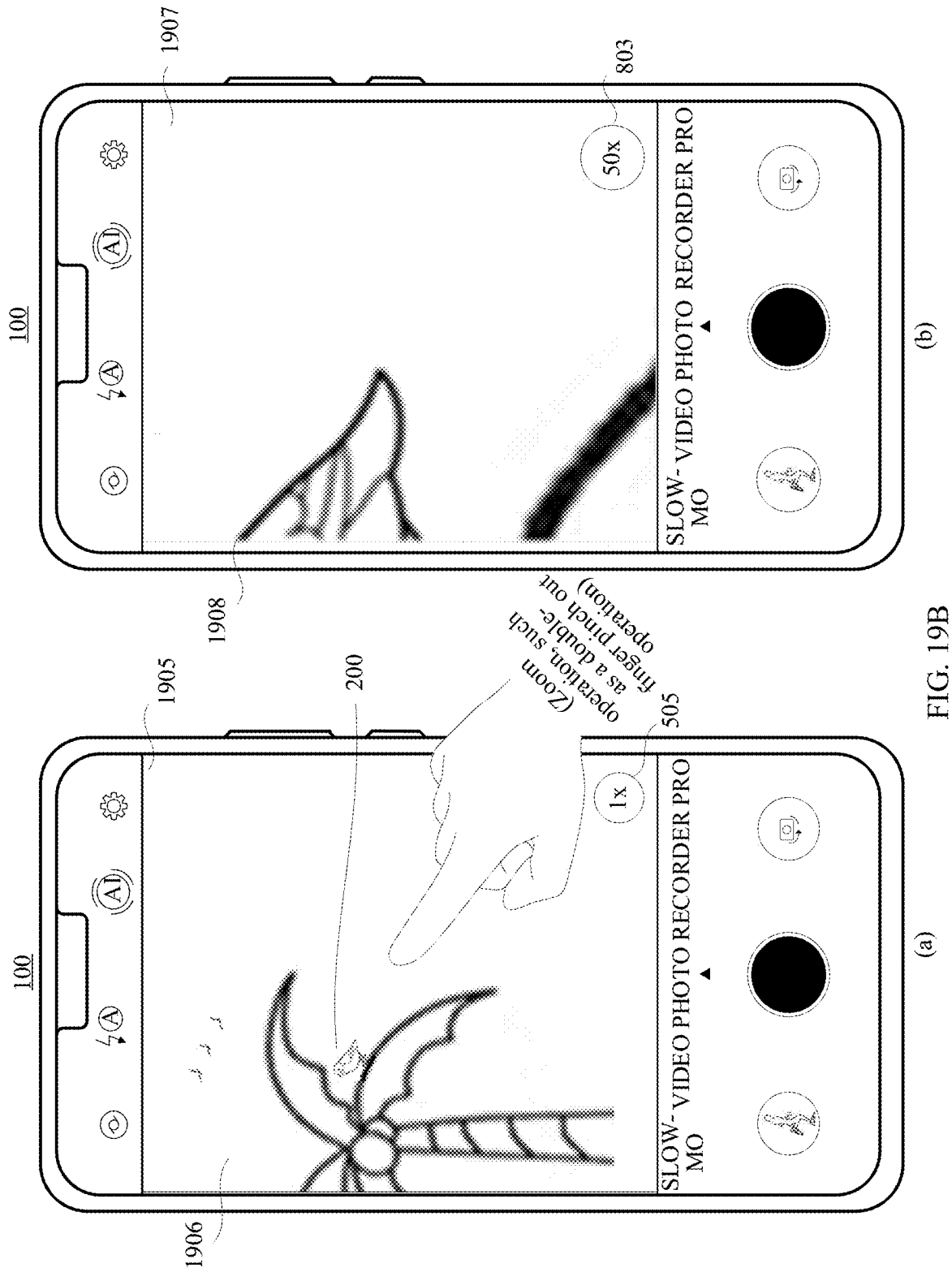
FIG. 19B is a schematic diagram of a display interface of another electronic device according to an embodiment of this application.

In another application scenario, the image of the target object may not be at the central position of the first interface. For example, the mobile phone 100 may display a first interface 1905 shown in (a) of FIG. 19B. The first interface 1905 includes a first preview image 1906, and the first preview image 1906 includes an image of the target object "bird" 200. The image of the target object "bird" 200 is not at a central position of the first interface 1905. As shown in (a) of FIG. 19B, the mobile phone 100 may receive a zoom operation (for example, a double-finger pinch out operation) performed by the user. In response to the zoom operation, the mobile phone 100 may display a second interface 1903 shown in (b) of FIG. 19B. The second interface 1907 includes a second preview image 1908 that is collected by the camera of the mobile phone 100 when the zoom ratio is 50×. Because the image of the target object "bird" 200 in (a) of FIG. 19B is not at the central position of the first interface 1905, the second interface 1907 displayed in response to the zoom operation may not include a complete image of the target object "bird" 200. Therefore, the user may move the mobile phone 100 to adjust a viewfinder range of the camera, so that the camera can collect a complete image of the target object.

S1803. The mobile phone 100 periodically buffers the second preview image in real time; and the mobile phone 100 displays a third interface, and obtains and saves initial pose information of the mobile phone 100 if the second preset images buffered in consecutive K periods include a same photographing area, and integrity of an image of the target object in the same photographing area is greater than a preset integrity threshold. The third interface includes an image of the target object that is collected by the camera of the mobile phone 100 when the zoom ratio is n.

For example, the preset integrity threshold may be any integrity threshold such as 60%, 75%, 70%, 75%, 80%, or 85%. The initial position information is used to indicate a motion state and a position of the mobile phone 100 when the second preset images buffered in the K consecutive periods include the same photographing area.

Figure 2:
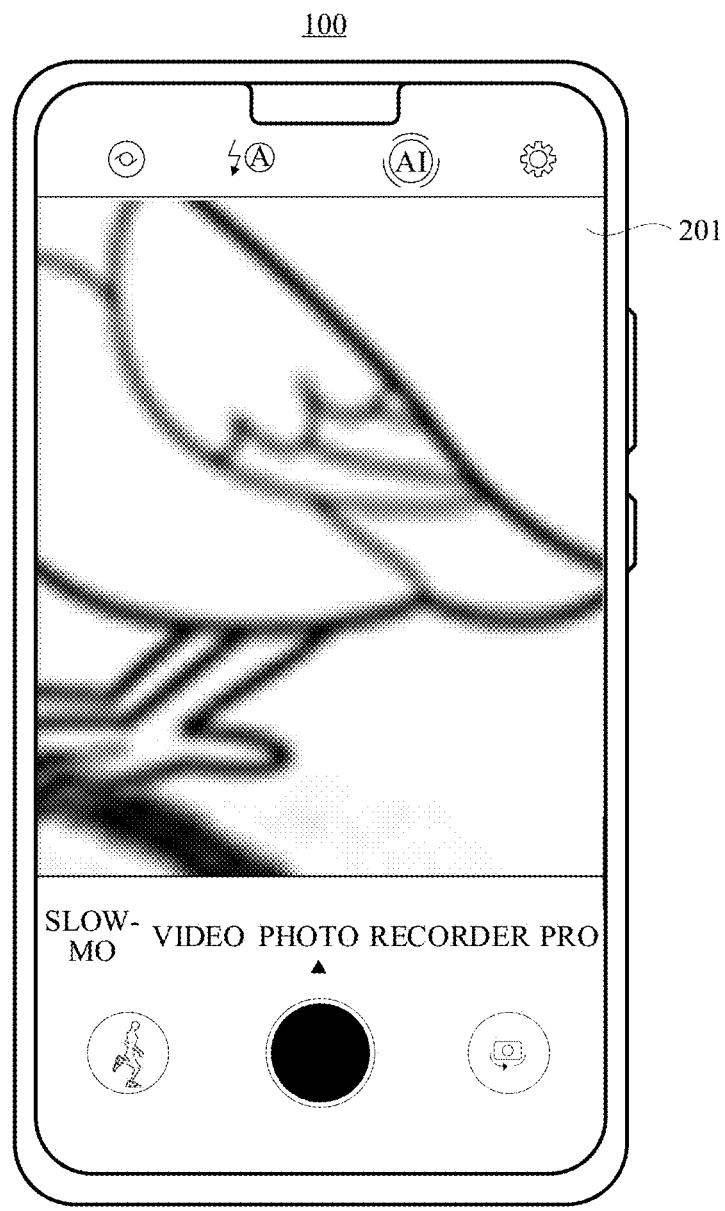
FIG. 2 is a schematic diagram of a display interface of an electronic device according to an embodiment of this application.
Figure 19C:
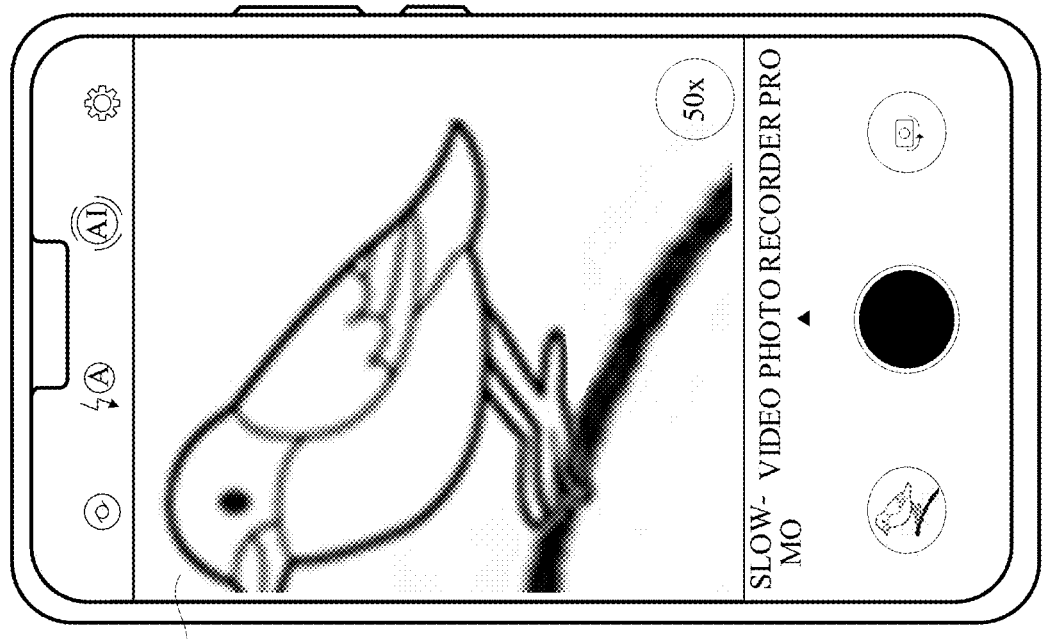
Figure 2:
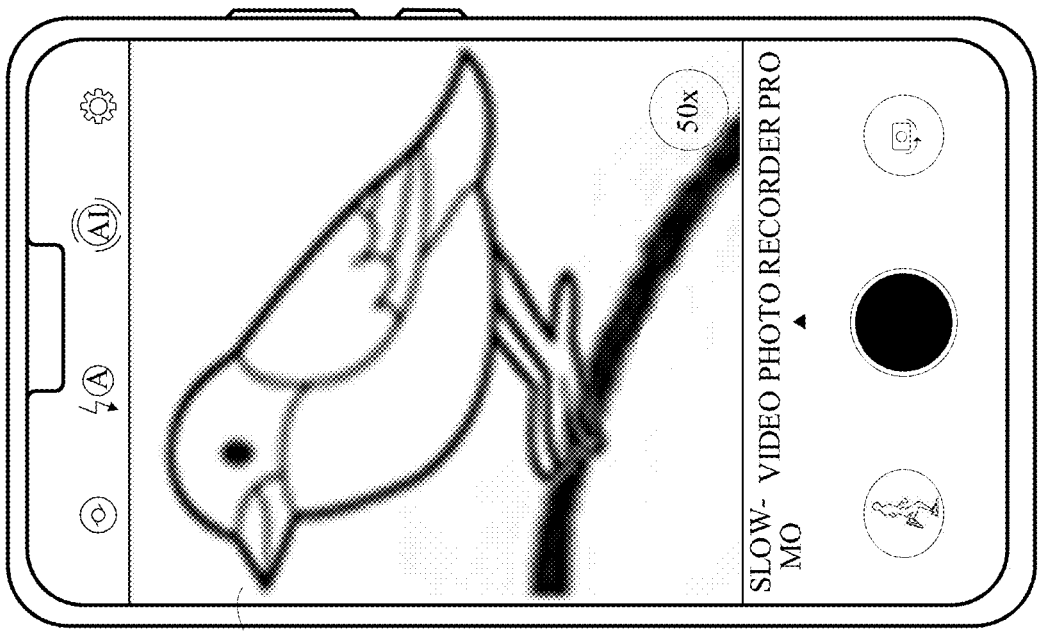

For example, as shown in (a) of FIG. 19C-1, (b) of FIG. 19C-1, (c) of FIG. 19C-2, and (d) of FIG. 19C-2, second preview images in these second interfaces change with a viewfinder range of the camera of the mobile phone 100. A second preview image 1909 shown in (a) of FIG. 19C-1, a second preview image 1910 shown in (b) of FIG. 19C-1, a second preview image 1911 shown in (c) of FIG. 19C-2, and a second preview image 1912 shown in (d) of FIG. 19C-2 are different. However, it should be noted that, to ensure that the mobile phone 100 can collect an image of the target object to be photographed by the user, when the user moves the mobile phone 100, it is ensured that a most part of the image of the target object is within the viewfinder frame of the mobile phone 100. In this way, second preset images in a plurality of consecutive periods include a same photographing area (that is, a photographing area that includes an image of the target object). For example, the second preview image 1909 shown in (a) of FIG. 19C-1, the second preview image 1910 shown in (b) of FIG. 19C-1, the second preview image 1911 shown in (c) of FIG. 19C-2, and the second preview image 1912 shown in (d) of FIG. 19C-2 all include a major part of the photographing area of the image of the target object "bird".

In response to the zoom operation, the mobile phone 100 may buffer the second preview image every a preset period (for example, a second preset period), compare a second preview image buffered at the first time with a second preview image buffered at the second time, and determine whether a same photographing area (that is, a common grid 1 described in the following embodiments) exists between the second preview image 1 buffered at the first time and the second preview image 2 buffered at the second time. If the same photographing area 1 exists between the second preview image buffered at the first time and the second preview image buffered at the second time, it is determined whether a second preview image 2 buffered at the third time and the common grid 1 have a same photographing area (that is, a common grid 2 described in the following embodiments). By analogy, it is determined whether second preset images buffered in K consecutive periods include a same photographing area. If a second preview image 1 buffered at the first time does not have a same photographing area as a second preview image 2 buffered at the second time, starting from the second preview image 2 buffered at the second time, it is determined whether second preset images buffered in K consecutive periods include a same photographing area. For example, a time length of the second preset period may be any one of 0.4 s, 0.5 s, 0.6 s, or 1s.

For example, a method for determining whether second preset images buffered in K consecutive periods include a same photographing area by the mobile phone 100 may include S1803a-S1803e.

S1803a. The mobile phone 100 compares a second preview image j buffered at a jth time with a second preview image j−1 buffered at a (j−1)th time, and determines whether the second preview image j and the second preview image j−1 include a same photographing area (referred to as a common grid j−1).

j is an integer, j is successively obtained from {1, 2, ..., K} in ascending order, and K is an integer. For example, S1803a may include S1-S3.

S1. The mobile phone 100 divides the second preview image j−1 buffered at the (j−1)th time into Q grid images, and divides the second preview image j buffered at the jth time into Q grid images, where Q≥1, and Q is an integer.

For example, the mobile phone 100 divides the second preview image j buffered at the jth time into Q grid images. The mobile phone 100 may divide the second preview image j buffered at the jth time into Q grid images according to a preset matrix. For example, assuming that the preset matrix is a 3*2 matrix, the mobile phone 100 may divide the second preview image j into six gird images in an average manner of three rows and two columns. For another example, assuming that the preset matrix is a 1*2 matrix, the mobile phone 100 may divide the second preview image j into two grid images in an average manner of one row and two columns. For another example, assuming that the preset matrix is a 2*1 matrix, the mobile phone 100 may divide the second preview image j into two grid images in an average manner of two rows and one column.

S2. The mobile phone 100 obtains an image correlation coefficient between each grid image in the Q grid images of the second preview image j−1 and each grid image in the Q grid images of the second preview image j. The image correlation coefficient is used to represent a similarity between two grid images.

A value range of the image correlation coefficient of the two grid images is [0, 1]. When the image correlation coefficient of the two grid images is closer to 1, it indicates a higher similarity between the two grid images, and a higher probability that the two grid images include a same photographing area. When the image correlation coefficient of the two grid images is closer to 0, it indicates a lower similarity between the two grid images, and a lower probability that the two grid images include a same photographing area.

For example, assuming that Q=2, the mobile phone 100 may perform S2 to obtain four image correlation coefficients shown in Table 2, such as an image correlation coefficient 1, an image correlation coefficient 2, an image correlation coefficient 3, and an image correlation coefficient 4.

For example, the mobile phone 100 may compare the first grid image of the second preview image j−1 with the first grid image of the second preview image j, to obtain the image correlation coefficient 1 of the first grid image of the second preview image j−1 and the first grid image of the second preview image j shown in Table 2. The mobile phone 100 may compare the first grid image of the second preview image j−1 with the second grid image of the second preview image j to obtain the image correlation coefficient 2 of the first grid image of the second preview image j−1 and the second grid image of the second preview image j shown in Table 2. The mobile phone 100 may compare the second grid image of the second preview image j−1 with the first grid image of the second preview image j, to obtain the image correlation coefficient 3 of the second grid image of the second preview image j−1 and the first grid image of the second preview image j shown in Table 2. The mobile phone 100 may compare the second grid image of the second preview image j−1 with the second grid image of the second preview image j, to obtain the image correlation coefficient 4 of the second grid image of the second preview image j−1 and the second preview image j shown in Table 2.

TABLE 2

| Second preview image j − 1 | Second preview image j | Image correlation coefficient | Whether a common grid j − 1 exists |
|---|---|---|---|
| First grid image | First grid image | Image correlation coefficient 1 (>R) | Yes |
| First grid image | Second grid image | Image correlation coefficient 2 (≤R) | No |
| Second grid image | First grid image | Image correlation coefficient 3 (>R) | Yes |
| Second grid image | Second grid image | Image correlation coefficient 4 (>R) | Yes |

In this embodiment of this application, an example in which the mobile phone 100 compares a first grid image with a second grid image to obtain an image correlation coefficient of the first grid image and the second grid image is used to describe a method for obtaining the image correlation coefficient by the mobile phone 100 in S2.

The first grid image may be any grid image obtained by the mobile phone 100 through division, and the second grid image may be any grid image obtained by the mobile phone 100 through division. The first grid image is different from the second grid image. Specifically, the mobile phone 100 may separately calculate histogram data of the first grid image and histogram data of the second grid image. Then, the mobile phone 100 may calculate the image correlation coefficient of the first grid image and the second grid image based on the histogram data of the first grid image and the histogram data of the second grid image.

It should be noted that a value range of the image correlation coefficient of the first grid image and the second grid image is [0, 1]. If the image correlation coefficient of the first grid image and the second grid image is closer to 1, it indicates that the similarity between the first grid image and the second grid image is higher. If the image correlation coefficient between the first grid image and the second grid image is closer to 0, it indicates that the similarity between the first grid image and the second grid image is lower.

For a method for calculating the histogram data of the first grid image and the histogram data of the second grid image by the mobile phone 100, and a method for calculating the image correlation coefficient between the first grid image and the second grid image by using the histogram data of the first grid image and the histogram data of the second grid image, refer to related descriptions in a conventional technology. Details are not described herein again in this embodiment of this application.

S3. The mobile phone 100 determines whether at least one of Q*Q image correlation coefficients of the Q grid images of the second preview image j−1 and the Q grid images of the second preview image j is greater than a preset similarity threshold.

For example, the preset similarity threshold may be a value in (0.5, 1). For example, the preset similarity threshold may be any value such as 0.7, 0.6, 0.8, or 0.75.

If at least one of the Q*Q image correlation coefficients of the Q grid image of the second preview image j−1 and the Q grid images of the second preview image j is greater than the preset similarity threshold, it indicates that the second preview image j and the second preview image j−1 include a same photographing area (referred to as a common grid j−1).

For example, when j=2, a same photographing area in the second preview image 1 and the second preview image 2 may be referred to as a common grid 1, for example, a first common grid. For example, when j=3, a same photographing area in the second preview image 2 and the second preview image 3 may be referred to as a common grid 2, for example, a second common grid.

If the Q*Q image correlation coefficients of the Q grid images of the second preview image j−1 and the Q grid images of the second preview image j are all less than or equal to the preset similarity threshold, it indicates that the second preview image j and the second preview image j−1 do not include a same photographing area.

For example, the image correlation coefficient 1, the image correlation coefficient 2, and the image correlation coefficient 4 shown in Table 2 are all greater than a preset similarity threshold R. The image correlation coefficient 3 shown in Table 2 is less than or equal to the preset similarity threshold R. It may be learned from Table 2 that the second preview image j−1 and the second preview image j include the same photographing area (that is, the common grid j−1). Specifically, the second preview image j−1 and the second preview image j include three common grids j−1.

Specifically, after S1803a, if the second preview image j and the second preview image j−1 do not include a same photographing area (that is, the common grid j−1), the mobile phone 100 may compare a second preview image j+1 buffered at a (j+1)th time with the second preview image j buffered at the jth time to determine whether the second preview image j+1 and the second preview image j include a same photographing area. That is, starting from the second preview image j buffered at the jth time, the mobile phone 100 may perform a next round of determining whether second preset images buffered in K consecutive periods include a same photographing area.

For a method in which "the mobile phone 100 compares the second preview image j+1 with the second preview image j to determine whether the second preview image j+1 and the second preview image j include a same photographing area", refer to the introduction to S1803a in the foregoing embodiment, and details are not described herein again in this embodiment of this application.

After S1803a, if the second preview image j buffered at the jth time and the second preview image j−1 buffered at the (j−1)th time include a same photographing area (that is, the common grid j−1), the mobile phone 100 may perform S1803b.

S1803b. The mobile phone 100 compares the second preview image j+1 buffered at the (j+1)th time with the common grid j−1, to determine whether the second preview image j+1 buffered at the (j+1)th time and the common grid j−1 include a same photographing area (referred to as a common grid j).

j is an integer, j is successively obtained from {1, 2, . . . , K} in ascending order, and K is an integer. For example, S1803b may include Si-Siii.

Si. The mobile phone 100 divides the second preview image j+1 buffered at the (j+1)th time into Q grid images, where Q 1, and Q is an integer.

For a method for dividing the second preview image j+1 buffered at the (j+1)th time into Q grid images by the mobile phone 100, refer to detailed description of S1 in the foregoing embodiment. Details are not described in this embodiment of this application.

Sii. The mobile phone 100 obtains an image correlation coefficient between each grid image in the Q grid images of the second preview image j+1 and each common grid j−1. The image correlation coefficient is used to represent a similarity between two grid images.

For example, it is assumed that Q=2. As shown in Table 2, the second preview image j−1 and the second preview image j include three common grids j−1. In this way, the mobile phone 100 may obtain six image correlation coefficients by performing Sii, for example, an image correlation coefficient A, an image correlation coefficient B, an image correlation coefficient C, an image correlation coefficient D, an image correlation coefficient E, and an image correlation coefficient F.

For example, the mobile phone 100 may compare the first grid image of the second preview image j+1 with the first common grid j−1 to obtain the image correlation coefficient A of the first grid image of the second preview image j+1 and the first common grid j−1 shown in Table 3. The mobile phone 100 may compare the first grid image of the second preview image j+1 with the second common grid j−1 to obtain the image correlation coefficient B of the first grid image of the second preview image j+1 and the second common grid j−1 shown in Table 3. The mobile phone 100 may compare the first grid image of the second preview image j+1 with the third common grid j−1 to obtain the image correlation coefficient C of the first grid image of the second preview image j+1 and the third common grid j−1 shown in Table 3. The mobile phone 100 may compare the second grid image of the second preview image j+1 with the first common grid j−1 to obtain the image correlation coefficient D of the second grid image of the second preview image j+1 and the first common grid j−1 shown in Table 3. The mobile phone 100 may compare the second grid image of the second preview image j+1 with the second common grid j−1, to obtain the image correlation coefficient E of the second grid image of the second preview image j+1 and the second common grid j−1 shown in Table 3. The mobile phone 100 may compare the second grid image of the second preview image j+1 with the third common grid j−1 to obtain the image correlation coefficient F of the second grid image of the second preview image j+1 and the third common grid j−1 shown in Table 3.

TABLE 3

| Second preview image j + 1 | Common grid j − 1 | Image correlation coefficient | Whether a common grid j exists |
|---|---|---|---|
| First grid image | First common grid j − 1 | Image correlation coefficient A (>R) | Yes |
| First grid image | Second common grid j − 1 | Image correlation coefficient B (≤R) | No |
| First grid image | Third common grid j − 1 | Image correlation coefficient C (≤R) | No |

TABLE 3-continued

| Second preview image j + 1 | Common grid j − 1 | Image correlation coefficient | Whether a common grid j exists |
|---|---|---|---|
| Second grid image | First common grid j − 1 | Image correlation coefficient D (≤R) | No |
| Second grid image | Second common grid j − 1 | Image correlation coefficient E (≤R) | No |
| Second grid image | Third common grid j − 1 | Image correlation coefficient F (>R) | Yes |

Siii. The mobile phone 100 determines whether at least one of image correlation coefficients of the Q grid images of the second preview image j+1 and the common grid j−1 is greater than the preset similarity threshold.

If at least one of image correlation coefficients of the Q grid images of the second preview image j+1 and the common grid j−1 is greater than the preset similarity threshold, it indicates that the second preview image j+1 and the common grid j−1 include a same photographing area (referred to as a common grid j).

For example, when j=2, a same photographing area between the second preview image 3 and the common grid 1 may be referred to as a common grid 2, for example, a second common grid. As shown in Table 3, two image correlation coefficients are greater than the preset similarity threshold R, and there are two second common grids.

If the Q*Q image correlation coefficients of the Q grid images of the second preview image j−1 and the Q grid images of the second preview image j are all less than or equal to the preset similarity threshold, it indicates that the second preview image j and the second preview image j−1 do not include a same photographing area.

Specifically, after S1803*b*, if the second preview image j+1 buffered at the (j+1)th time and the common grid j−1 do not include a same photographing area (that is, a common grid j), the mobile phone 100 may compare a second preview image buffered at a (j+2)th time with the second preview image j+1 buffered at the (j+1)th time, to determine whether the second preview image j+2 buffered at the (j+2)th time and the second preview image j+1 buffered at the (j+1)th time include a same photographing area. That is, starting from the second preview image j+1 buffered at the (j+1)th time, the mobile phone 100 may perform a next round of determining whether second preset images buffered in K consecutive periods include a same photographing area.

For a method in which "the mobile phone 100 compares the second preview image buffered at the (j+2)th time with the second preview image j+1 buffered at the (j+1)th time, to determine whether the second preview image j+2 buffered at the (j+2)th time and the second preview image j+1 buffered at the (j+1)th time include a same photographing area", refer to the description of S1803*a* in the foregoing embodiment. Details are not described herein in this embodiment of this application.

After S1803*b*, if the second preview image j+1 buffered at the (j+1)th time and the common grid j−1 include a same photographing area (that is, a common grid j), the mobile phone 100 may perform S1803*c*.

S1803*c*. The mobile phone 100 compares a second preview image j buffered at a (j+2)th time with the common grid j, to determine whether the second preview image buffered at the (j+2)th time and the common grid j includes a same photographing area (referred to as a common grid j+1).

Specifically, after S1803*c*, if the second preview image j+2 buffered at the (j+2)th time and the common grid j do not include a same photographing area (that is, a common grid j+1), the mobile phone 100 may compare a second preview image j+3 buffered at a (j+3)th time with the second preview image j+2 buffered at the (j+2)th time, to determine whether the second preview image j+3 buffered at the (j+3)th time and the second preview image j+2 buffered at the (j+2)th time include a same photographing area. That is, starting from the second preview image j+2 buffered at the (j+2)th time, the mobile phone 100 may perform a next round of determining whether second preset images buffered in K consecutive periods include a same photographing area.

For a method in which "the mobile phone 100 compares the second preview image buffered at the (j+3)th time with the second preview image j+2 buffered at the (j+2)th time, to determine whether the second preview image j+3 buffered at the (j+3)th time and the second preview image j+2 buffered at the (j+2)th time include a same photographing area", refer to the description of S1803*a* in the foregoing embodiment. Details are not described herein in this embodiment of this application.

After S1803*c*, if the second preview image j+2 buffered at the (j+2)th time and the common grid j include a same photographing area (that is, a common grid j+1), the mobile phone 100 may compare the second preview image j+3 buffered at the (j+3)th time with the common grid j+1, to determine whether the second preview image j+3 buffered at the (j+3)th time and the common grid j+1 include a same photographing area (referred to as a common grid j+2). By analogy, it is assumed that second preview images buffered in K−1 consecutive second preset periods include a same photographing area. That is, if a second preview image K−1 buffered at a (K−1)th time and a common grid K−3 include a same photographing area (that is, a common grid K−2), the mobile phone 100 may perform S1803*d*.

S1803*d*. The mobile phone 100 compares a second preview image K buffered at Kth time with a common grid K−2 to determine whether the second preview image buffered at the Kth time and the common grid K−2 include a same photographing area (referred to as a common grid K−1).

Specifically, after S1803*d*, if the second preview image K buffered at the Kth time and the common grid K−2 do not include a same photographing area (that is, a common grid K−1), the mobile phone 100 may compare a second preview image K+1 buffered at a (K+1)th time with the second preview image K buffered at the Kth time, to determine whether the second preview image K+1 buffered at the (K+1)th time and the second preview image K buffered at the Kth time include a same photographing area. That is, starting from the second preview image K buffered at the Kth time, the mobile phone 100 may perform a next round of determining whether second preset images buffered in K consecutive periods include a same photographing area.

For a method in which "the mobile phone 100 compares the second preview image K+1 buffered at the (K+1)th time with the second preview image K buffered at the Kth time, to determine whether the second preview image K+1 buffered at the (K+1)th time and the second preview image K buffered at the Kth time include a same photographing area", refer to the description of S1803*a* in the foregoing embodiment. Details are not described herein in this embodiment of this application.

After S1803*d*, if the second preview image K buffered at the Kth time and the common grid K−2 include a same photographing area (that is, a common grid K−1), the mobile phone 100 may perform S1803*e*.

S1803e. The mobile phone 100 determines that a photographing area corresponding to the common grid K–1 is a to-be-photographed area including an image of the target object, that is, locks the target object from the second preview image.

The third interface shown in S1803 includes a magnified to-be-photographed area, and the preview image in S1803 is a preview image corresponding to the to-be-photographed area. The initial pose information of the mobile phone 100 in S1803 may be used to indicate that second preset images buffered in K consecutive periods include a same photographing area, and a motion state and a position of the mobile phone 100 when integrity of the image of the target object is greater than a preset integrity threshold. It should be understood that when second preset images buffered in K consecutive periods include a same photographing area, and the integrity of the image of the target object is greater than the preset integrity threshold, there is a relatively high probability that the mobile phone 100 can collect a relatively complete image of the target area. Therefore, the pose information of the mobile phone 100 in this case is used as the initial pose information. For a method for obtaining the initial pose information by the mobile phone 100, refer to the detailed description in the foregoing embodiment. Details are not described herein again in this embodiment of this application.

In some embodiments, when determining the to-be-photographed area including the image of the target object from the second preview image, the mobile phone 100 further needs to consider integrity of the image of the target object.

S1804. The mobile phone 100 obtains real-time pose information of the mobile phone 100, where the real-time pose information is used to indicate a real-time motion state and a real-time position of the mobile phone 100.

For detailed description of S1804, refer to related description of S403 in the foregoing embodiment. Details are not described herein again in this embodiment of this application.

S1805. The mobile phone 100 sends first prompt information based on the real-time pose information and the initial pose information. The first prompt information is used to prompt the user to move the mobile phone 100, so that the mobile phone 100 is in the motion state and at the position indicated by the initial pose information.

Figure 20:
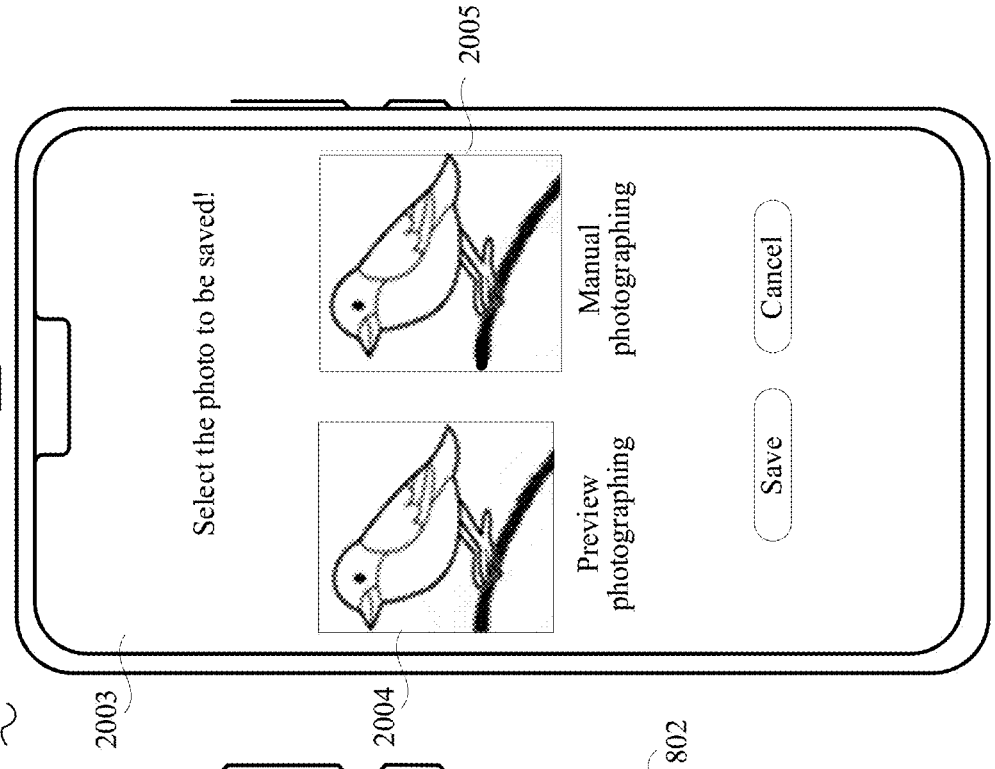
Figure 2:
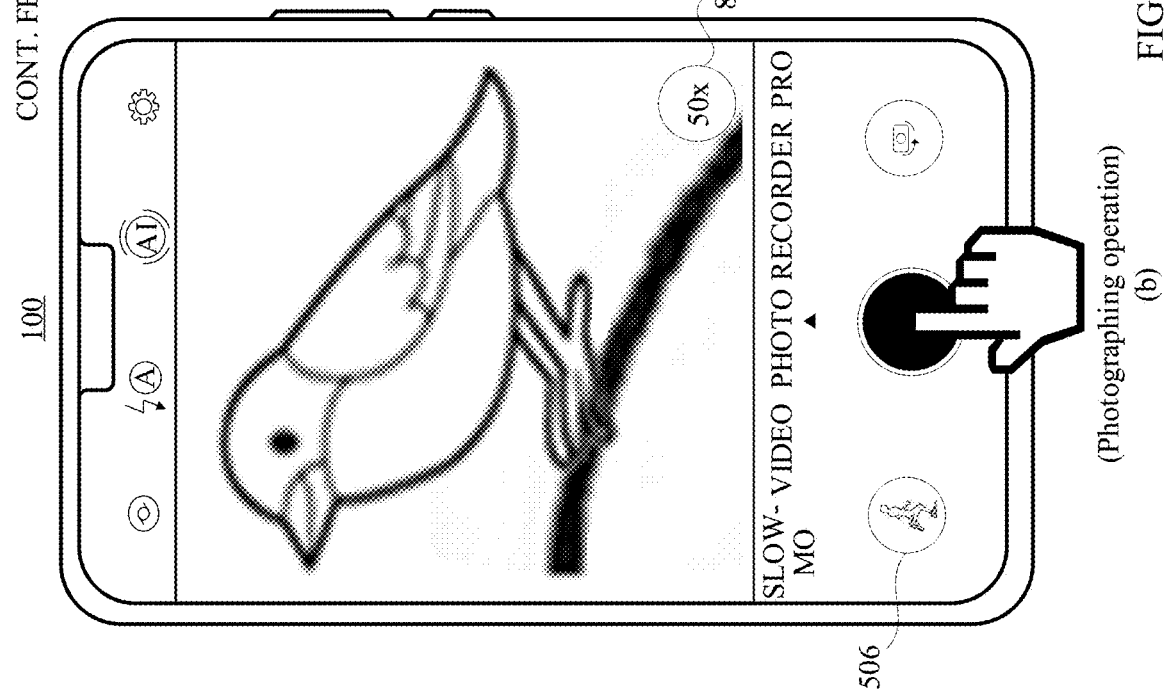

For example, the mobile phone 100 may display a third interface 2001 shown in (a) of FIG. 20-1. The third interface 2001 includes first prompt information 2002, for example, "Move the mobile phone to the left!". For the third interface of S1805, refer to the third interface of S404. For the first prompt information of S1805, refer to the first prompt information of S404. Details are not described in this embodiment of this application.

S1806. The mobile phone 100 displays, in response to a photographing operation performed by the user, a fourth interface including a third preview image and a fourth preview image. The fourth preview image is an image photographed in response to a photographing operation, and the third preview image is an image with a highest image parameter in a plurality of frames of second preview images collected by the camera.

For example, the mobile phone 100 may receive a photographing operation of the user shown in (b) of FIG. 20-2. In response to the photographing operation shown in (b) of FIG. 20-2, the mobile phone 100 may display a fourth interface 2003 shown in (c) of FIG. 20-2. The fourth interface 2003 includes a fourth preview image 2004 and a third preview image 2005.

S1807. The mobile phone 100 saves a preview image selected by the user in response to the user's selection of the fourth preview image and/or the third preview image in the fourth interface.

For example, the mobile phone 100 may receive a selection operation performed by the user on at least one of the fourth preview image 2004 and the third preview image 2005 shown in (c) of FIG. 20-2.

The fourth preview image described in S1806 and S1807 is equivalent to the fourth preview image shown in S405 and S406. For a method for obtaining the fourth preview image shown in S1806 by the mobile phone 100, refer to the method for obtaining the fourth preview image shown in S405 by the mobile phone 100. Details are not described in this embodiment of this application. The third preview image described in S1806 and S1807 is equivalent to the third preview image shown by S405 and S406, and the fourth interface described in S1806 and S1807 is equivalent to the third interface shown in S405 and S406.

An embodiment of this application provides a high-magnification photographing method. A mobile phone 100 may enter a high-magnification photographing scene in response to a zoom operation performed by a user, automatically lock a photographing object that requires high-magnification photographing, magnify display of a preview image (referred to as an initial preview image) of the photographing object, and obtain an initial state and an initial position of the mobile phone 100. In this way, it is unnecessary for the user to manually adjust the zoom ratio, so that jitter caused by the user's manual operation can be reduced.

Then, the mobile phone 100 may obtain the real-time state and the real-time position of the mobile phone 100, and prompt, based on the real-time state and the real-time position, the user to correct the position and pose of the mobile phone 100, so that the mobile phone 100 can be maintained in the initial state and at the initial position or in a state near the initial state and initial position. In this case, the photographing object locked by the mobile phone 100 is an object to be photographed by the user. That is, when the photographing area of the camera deviates from the photographing area corresponding to the initial preview image, the mobile phone 100 may prompt the user to correct the position and the pose of the mobile phone 100, so that the mobile phone 100 can maintain the position and the pose indicated by the initial state and the initial position, thereby ensuring that the mobile phone 100 can photograph a photographing object desired by the user.

Finally, the mobile phone 100 simultaneously displays, in response to the photographing operation performed by the user, the initial preview image and a preview image manually photographed by the user, and the user selects a desired photo to save. In this way, the mobile phone 100 may take a photo that is satisfactory to the user according to a requirement of the user.

Some other embodiments of this application provide an electronic device, and the electronic device may include a memory, one or more cameras, and one or more processors. The memory, the camera, and the processor are coupled. The memory stores computer program code, and the computer program code includes computer instructions. When the computer instructions are executed by the processor, the electronic device performs all functions or steps performed by the mobile phone in the foregoing method embodiments. For a structure of the electronic device, refer to the structure of the electronic device 300 shown in FIG. 3.

Figure 21:
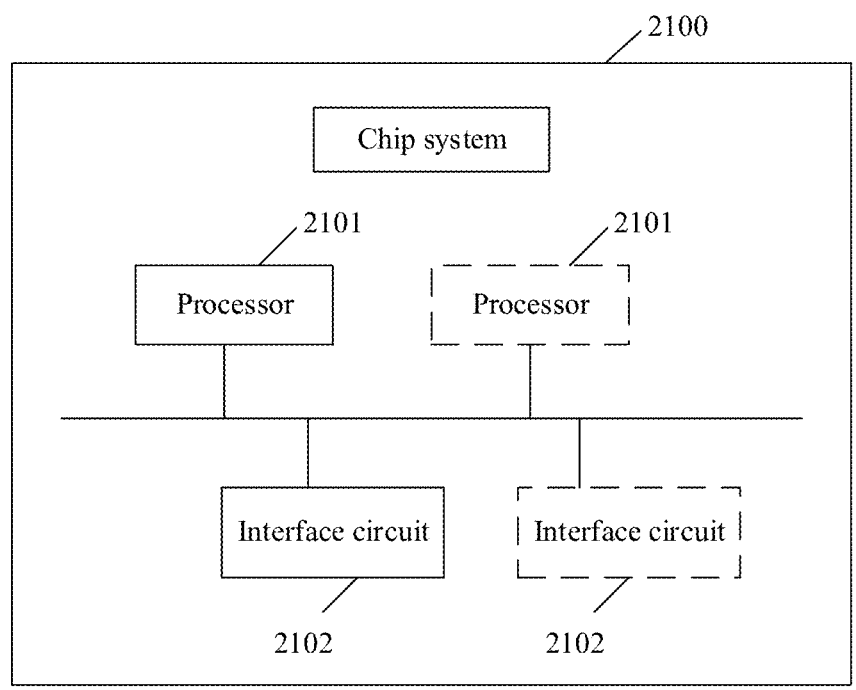
FIG. 21 is a schematic diagram of a chip system according to an embodiment of this application.

An embodiment of this application further provides a chip system. As shown in FIG. 21, a chip system 2100 includes at least one processor 2101 and at least one interface circuit 2102.

The processor 2101 and the interface circuit 2102 may be interconnected by lines. For example, the interface circuit 2102 may be configured to receive a signal from another apparatus (for example, a memory of the electronic device). In another example, the interface circuit 2102 may be configured to send a signal to another apparatus (for example, the processor 2101). For example, the interface circuit 2102 may read instructions stored in the memory and send the instructions to the processor 2101. The instructions, when executed by the processor 2101, may cause the electronic device to perform the steps performed by the mobile phone 210 in the foregoing embodiments. Certainly, the chip system may further include other discrete devices. This is not specifically limited in this embodiment of this application.

An embodiment of this application further provides a computer storage medium, the computer storage medium including computer instructions, the computer instructions, when run on the electronic device, causing the electronic device to perform various functions and steps performed by the mobile phone 100 in the foregoing method embodiments.

An embodiment of this application further provides a computer program product, the computer program product, when run on a computer, causing the computer to perform various functions and steps performed by the mobile phone 100 in the foregoing method embodiments. For example, the computer may be the mobile phone 100.

Through the descriptions of the foregoing implementations, a person skilled in the art may clearly understand that, for the purpose of convenient and brief description, only division of the foregoing functional modules is used as an example for description. In actual application, the foregoing functions may be allocated to and completed by different functional modules according to requirements. That is, an internal structure of an apparatus is divided into different functional modules to complete all or some of the functions described above. For specific work processes of the system, the apparatus and the unit described above, reference may be made to the corresponding processes in the foregoing method embodiments. Details are not described herein again.

In this embodiment of this application, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the related art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but the protection scope of the embodiments of this application is not limited thereto. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A photographing method, wherein the method is applied to an electronic device, the electronic device comprises a camera, and the method comprises:

displaying a first interface, wherein the first interface is a viewfinder interface for photographing by the electronic device, the first interface comprises a first preview image collected by the camera when a zoom ratio is m, the first preview image comprises an image of a target object, and the image of the target object is at a central position of the first preview image;

displaying a second interface in response to a first operation performed by a user on the image of the target object in the first interface, and obtaining and saving initial pose information of the electronic device, wherein the second interface comprises an initial second preview image of a plurality of second preview images collected by the camera when the zoom ratio is n, the initial second preview image comprises an image of the target object, and n>m; and the initial pose information is used to indicate a motion state and a position of the electronic device when receiving the first operation;

obtaining real-time pose information of the electronic device, wherein the real-time pose information is used to indicate a real-time motion state and a real-time position of the electronic device;

sending first prompt information based on the real-time pose information and the initial pose information, wherein the first prompt information is used to prompt the user to move the electronic device, so that the electronic device is in the motion state and at the position indicated by the initial pose information;

displaying a third interface in response to a photographing operation of the user, wherein the third interface comprises a third preview image and a fourth preview image, the third preview image is an image with a highest image parameter in the plurality of second preview images collected by the camera, the highest image parameter comprises a highest definition in the plurality of second preview images collected by the camera or a highest integrity in the plurality of second preview images collected by the camera, and the fourth preview image is an image photographed in response to the photographing operation; and saving a preview image selected by the user in response to a selection operation performed by the user on the third preview image or the fourth preview image.

2. The method according to claim 1, wherein before the displaying a first interface, the method further comprises:

displaying a fourth interface, wherein the fourth interface is a viewfinder interface for photographing by the electronic device, the fourth interface comprises a fifth preview image collected by the camera when the zoom ratio is m, and the fifth preview image comprises an image of the target object; and sending second prompt information on the fourth interface in response to a second operation performed by the user on the fourth interface, wherein the second operation is a selection operation performed by the user on the image of the target object, and the second prompt information is used to indicate the user to move the electronic device, so that the image of the target object is at a central position of the fifth preview image.

3. The method according to claim 2, wherein the second prompt information comprises a direction icon.

4. The method according to claim 1, wherein the displaying a second interface in response to a first operation performed by a user on the image of the target object in the first interface, and obtaining and saving initial pose information of the electronic device comprises:
   determining a to-be-photographed area comprising the image of the target object from the first preview image in response to the first operation, so as to lock the target object from the first preview image; and
   automatically adjusting the zoom ratio to n, displaying the second interface that comprises a magnified to-be-photographed area, and obtaining and saving the initial pose information of the electronic device.

5. The method according to claim 4, wherein the to-be-photographed area is a rectangular area formed by a preset length and width by using a contact area between the first operation and a touchscreen of the electronic device as a center of a rectangle.

6. The method according to claim 4, further comprising:
   adapting a size of a viewfinder frame of a touchscreen;
   automatically adjusting the zoom ratio to n, and
   magnifying the image of the target object in the to-be-photographed area, so that the image of the target object fully occupies the viewfinder frame of the touchscreen.

7. The method according to claim 1, wherein the electronic device comprises a gyroscope sensor and an acceleration sensor, and the gyroscope sensor and the acceleration sensor are configured to collect the initial pose information and the real-time pose information of the electronic device.

8. The method according to claim 1, wherein the displaying a second interface in response to a first operation performed by a user on the image of the target object in the first interface comprises:
   displaying fifth prompt information in response to a third operation performed by the user on the first interface, wherein the fifth prompt information is used to indicate the user to select the zoom ratio of the camera;
   displaying a sixth interface in response to a selection operation performed by the user on the zoom ratio n, wherein the sixth interface comprises a sixth preview image collected by the camera of the electronic device when the zoom ratio is n, and the sixth preview image comprises an image of the target object; and
   displaying the second interface in response to the first operation performed by the user on the sixth interface.

9. The method according to claim 8, wherein the sixth interface further comprises a preset adjustment control, the preset adjustment control is configured to adjust a zoom ratio of the camera.

10. A photographing method, wherein the method is applied to an electronic device, the electronic device comprises a camera, and the method comprises:
    displaying a first interface, wherein the first interface is a viewfinder interface for photographing by the electronic device, the first interface comprises a first preview image collected by the camera when a zoom ratio is m, and the first preview image comprises an image of a target object;
    displaying a second interface in response to a zoom operation performed by a user on the first interface, wherein the second interface comprises an initial second preview image of a plurality of second preview images collected by the camera when the zoom ratio is n, and n>m; and the zoom operation is used to trigger the electronic device to adjust the zoom ratio of the camera to n;
    periodically buffering each of the plurality of second preview images in real time;
    displaying a third interface, and obtaining and saving initial pose information of the electronic device if the plurality of second preview images buffered in consecutive K periods comprise a same photographing area and at least one of the plurality of second preview images includes an image of the target object in the same photographing area with an integrity that is greater than a preset integrity threshold, wherein the third interface comprises an image that comprises the target object and that is collected by the camera when the zoom ratio is m; and the initial pose information is used to indicate that the plurality of second preview images buffered in consecutive K periods comprise a same photographing area, and a motion state and a position of the electronic device when the integrity of the image of the target object is greater than the preset integrity threshold, wherein K≥2, and K is an integer;
    obtaining real-time pose information of the electronic device, wherein the real-time pose information is used to indicate a real-time motion state and a real-time position of the electronic device;
    sending first prompt information based on the real-time pose information and the initial pose information, wherein the first prompt information is used to prompt the user to move the electronic device, so that the electronic device is in the motion state and at the position indicated by the initial pose information;
    displaying a fourth interface comprising a third preview image and a fourth preview image in response to a photographing operation of the user, wherein the fourth preview image is an image photographed in response to the photographing operation, the third preview image is an image with a highest image parameter in the plurality of second preview images collected by the camera, and the highest image parameter comprises a highest definition in the plurality of second preview images collected by the camera or a highest integrity in the plurality of second preview images collected by the camera; and
    saving a preview image selected by the user in response to the user's selection of the third preview image or the fourth preview image in the fourth interface.

11. The method according to claim 10, wherein the displaying a third interface if the plurality of second preview images buffered in consecutive K periods comprise a same photographing area comprises:
    comparing a second preview image j buffered at a jth time with a second preview image j−1 buffered at a (j−1)th time, and determining whether a common grid j−1 exists between the second preview image j and the second preview image j−1, wherein the common grid j−1 is a same photographing area in the second preview image j and the second preview image j−1; and j is an integer, and j is successively obtained from {2, ..., K} in ascending order;

if the common grid j−1 exists between the second preview image j and the second preview image j−1, comparing a second preview image j+1 buffered at a (j+1)th time with the common grid j−1, and determining whether a common grid j exists between the second preview image j+1 buffered at the (j+1)th time and the common grid j−1, wherein the common grid j is a same photographing area in the second preview image j+1 and the common grid j−1;

if the common grid j exists between the second preview image j+1 buffered at the (j+1)th time and the common grid j−1, comparing a second preview image j+2 buffered at the (j+2)th time with the common grid j, determining whether a common grid j+1 exists between the second preview image j+2 buffered at the (j+2)th time and the common grid j, wherein the common grid j+1 is a same photographing area in the second preview image j+2 and the common grid j;

by analogy, if a common grid K−2 exists between a second preview image K−1 buffered at a (K−1)th time and a common grid K−3, comparing, a second preview image K buffered at a Kth time with the common grid K−2, and determining whether a common grid K−1 exists between the second preview image K and the common grid K−2, wherein the common grid K−1 is a same photographing area in the second preview image K and the common grid K−2; and if the common grid K−1 exists between the second preview image K and the common grid K−2, determining a photographing area corresponding to the common grid K−1 as a to-be-photographed area that comprises an image of the target object, and displaying the third interface, wherein the third interface comprises a preview image corresponding to the to-be-photographed area.

12. The method according to claim 10, wherein the comparing a second preview image j buffered at a jth time with a second preview image j−1 buffered at a (j−1)th time, and determining whether a common grid j−1 exists between the second preview image j and the second preview image j−1 comprises:

dividing the second preview image j−1 buffered at the (j−1)th time into Q grid images, and dividing the second preview image j buffered at the jth time into Q grid images, wherein Q≥1, and Q is an integer;

obtaining an image correlation coefficient between each grid image in the Q grid images of the second preview image j−1 and each grid image in the Q grid images of the second preview image j, wherein the image correlation coefficient is used to represent a similarity of two grid images, a value range of the image correlation coefficient is [0, 1], a larger image correlation coefficient of the two grid images indicates a higher similarity of the two grid images, and a smaller image correlation coefficient of the two grid images indicates a lower similarity of the two grid images; and determining whether at least one of a plurality of image correlation coefficients of the Q grid images of the second preview image j−1 and the Q grid images of the second preview image j is greater than a preset similarity threshold;

wherein if at least one of the plurality of image correlation coefficients of the Q grid images of the second preview image j−1 and the Q grid images of the second preview image j is greater than the preset similarity threshold, it indicates that the common grid j−1 exists between the second preview image j and the second preview image j−1; and if the plurality of image correlation coefficients of the Q grid images of the second preview image j−1 and the Q grid images of the second preview image j are all less than or equal to the preset similarity threshold, it indicates that the common grid j−1 does not exist between the second preview image j and the second preview image j−1.

13. The method according to claim 11, wherein the obtaining an image correlation coefficient between each grid image in the Q grid images of the second preview image j−1 and each grid image in the Q grid images of the second preview image j comprises:

obtaining histogram data of a first grid image and histogram data of a second grid image, wherein the first grid image is a grid image in the Q grid images of the second preview image j−1, and the second grid image is a grid image in the Q grid images of the second preview image j; and calculating an image correlation coefficient between the first grid image and the second grid image based on the histogram data of the first grid image and the histogram data of the second grid image.

14. An electronic device, comprising:
a camera;
a non-transitory memory comprising instructions; and
a processor coupled to the non-transitory memory, the instructions being executed by the processor to cause the electronic device to:

display a first interface, wherein the first interface is a viewfinder interface for photographing by the electronic device, the first interface comprises a first preview image collected by the camera when a zoom ratio is m, the first preview image comprises an image of a target object, and the image of the target object is at a central position of the first preview image;

display a second interface in response to a first operation performed by a user on the image of the target object in the first interface, and obtaining and saving initial pose information of the electronic device, wherein the second interface comprises an initial second preview image of a plurality of second preview images collected by the camera when the zoom ratio is n, the initial second preview image comprises an image of the target object, and n>m; and the initial pose information is used to indicate a motion state and a position of the electronic device when receiving the first operation;

obtain real-time pose information of the electronic device, wherein the real-time pose information is used to indicate a real-time motion state and a real-time position of the electronic device;

send first prompt information based on the real-time pose information and the initial pose information, wherein the first prompt information is used to prompt the user to move the electronic device, so that the electronic device is in the motion state and at the position indicated by the initial pose information;

display a third interface in response to a photographing operation of the user, wherein the third interface comprises a third preview image and a fourth preview image, the third preview image is an image with a highest image parameter in the plurality of second preview images collected by the camera, the image parameter comprises a highest definition in the plurality of second preview images collected by the camera or a highest integrity in the plurality of second preview images collected by the camera, and the fourth preview image is an image photographed in response to the photographing operation; and save a preview image selected by the user in response to a selection operation performed by the user on the third preview image or the fourth preview image.

15. The electronic device according to claim 14, the instructions further cause the electronic device to:

display a fourth interface, wherein the fourth interface is a viewfinder interface for photographing by the electronic device, the fourth interface comprises a fifth preview image collected by the camera when the zoom ratio is m, and the fifth preview image comprises an image of the target object; and send second prompt information on the fourth interface in response to a second operation performed by the user on the fourth interface, wherein the second operation is a selection operation performed by the user on the image of the target object, and the second prompt information is used to indicate the user to move the electronic device, so that the image of the target object is at a central position of the fifth preview image.

16. The electronic device according to claim 15, wherein the second prompt information comprises a direction icon.

17. The electronic device according to claim 14, the instructions further cause the electronic device to:

determine a to-be-photographed area comprising the image of the target object from the first preview image in response to the first operation, so as to lock the target object from the first preview image; and automatically adjust the zoom ratio to n, displaying the second interface that comprises a magnified to-be-photographed area, and obtaining and saving the initial pose information of the electronic device.

18. The electronic device according to claim 17, wherein the to-be-photographed area is a rectangular area formed by a preset length and width by using a contact area between the first operation and a touchscreen of the electronic device as a center of a rectangle.

19. The electronic device according to claim 17, wherein the instructions further cause the electronic device to:

adapt a size of a viewfinder frame of a touchscreen;

automatically adjust the zoom ratio to n, and magnify the image of the target object in the to-be-photographed area, so that the image of the target object fully occupies the viewfinder frame of the touchscreen.

20. The electronic device according to claim 14, wherein the electronic device comprises a gyroscope sensor and an acceleration sensor, and the gyroscope sensor and the acceleration sensor are configured to collect the initial pose information and the real-time pose information of the electronic device.

* * * * *